(12) United States Patent
Detsi et al.

(10) Patent No.: US 12,224,466 B2
(45) Date of Patent: Feb. 11, 2025

(54) BULK NANOPOROUS MATERIALS FOR ON-SITE AND ON-BOARD GENERATION OF HYDROGEN AND OTHER PRODUCTS

(71) Applicant: THE TRUSTEES OF THE UNIVERSITY OF PENNSYLVANIA, Philadelphia, PA (US)

(72) Inventors: Eric Detsi, Swarthmore, PA (US); John S. Corsi, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 999 days.

(21) Appl. No.: 16/978,927

(22) PCT Filed: Mar. 19, 2019

(86) PCT No.: PCT/US2019/022954
§ 371 (c)(1),
(2) Date: Sep. 8, 2020

(87) PCT Pub. No.: WO2019/183083
PCT Pub. Date: Sep. 26, 2019

(65) Prior Publication Data
US 2021/0050609 A1   Feb. 18, 2021

Related U.S. Application Data

(60) Provisional application No. 62/644,972, filed on Mar. 19, 2018.

(51) Int. Cl.
*H01M 8/0656*    (2016.01)
*C25B 1/04*    (2021.01)
*C25B 11/03*    (2021.01)
*C25B 11/031*    (2021.01)
(Continued)

(52) U.S. Cl.
CPC .............. *H01M 8/0656* (2013.01); *C25B 1/04* (2013.01); *C25B 11/031* (2021.01); *C25B 11/057* (2021.01); *H01M 2250/10* (2013.01); *H01M 2250/20* (2013.01)

(58) Field of Classification Search
CPC .............. H01M 8/0606; H01M 8/0656; H01M 4/8605; H01M 4/861; H01M 4/8621; H01M 4/8626; C25B 11/057; C25B 11/042; C25B 11/031; C25B 11/032
See application file for complete search history.

(56) References Cited

U.S. PATENT DOCUMENTS 8,968,961 B2   3/2015   Peled et al.
9,365,939 B2   6/2016   Anderson et al.
(Continued)

OTHER PUBLICATIONS

Ahluwalia, R. K., et al, "Automotive storage of hydrogen in alane," Int. J. Hydrogen Energy, vol. 34, 2009, pp. 7731-7740.
(Continued)

*Primary Examiner* — Christopher P Domone
(74) *Attorney, Agent, or Firm* — BakerHostetler

(57) ABSTRACT

Provided are nanoporous materials (including nanoporous metals) and related methods of fabricating the disclosed materials. The disclosed materials are useful in supporting chemical reactions, including the on-board production of hydrogen from water by way of contacting the water to the disclosed materials.

5 Claims, 32 Drawing Sheets

High magnification SEM image of a Nanoporous Si grain after air-free dealloying

(51) Int. Cl.
  *C25B 11/04*     (2021.01)
  *C25B 11/057*    (2021.01)

(56) References Cited

U.S. PATENT DOCUMENTS

| | | | | |
|---|---|---|---|---|
| 2010/0151318 | A1* | 6/2010 | Lopatin | H01M 4/13 427/78 |
| 2011/0209990 | A1 | 9/2011 | Ha et al. | |
| 2016/0118653 | A1 | 4/2016 | Brener et al. | |
| 2017/0110717 | A1* | 4/2017 | Tolbert | H01M 4/622 |
| 2018/0016139 | A1* | 1/2018 | Tolbert | C01B 3/0031 |

OTHER PUBLICATIONS

Alinejad, B. et al, "Novel Method for Generating Hydrogen by Hydrolysis of Highly Activated Aluminum Nanoparticles in Pure Water," Int. J. Hydrogen Energy, vol. 34, Issue 19, 2009, pp. 7934-7938.

Andreeva, R. et al, "Influence of the Surface Pre-Treatment of Aluminum on the Processes of Formation of Cerium Oxides Protective Films," In Journal of Physics, Conference Series, 2016, pp. 1-6.

Bartels, J. R. et al, "An Economic Survey of Hydrogen Production from Conventional and Alternative Energy Sources," Int. J. Hydrogen Energy, vol. 35, Issue 16, 2010, pp. 8371-8384.

Biener, J. et al. "Surface-chemistry-driven actuation in nanoporous gold," Nat. Mater, vol. 8, (2009), pp. 47-51.

Chen, Q. et al, "Nanoporous Metal by Dealloying for Electrochemical Energy Conversion and Storage," MRS Bull, vol. 43, Issue 1, 2018, pp. 43-48.

Chen, Y. C. K. et al. Morphological and topological analysis of coarsened nanoporous gold by x-ray nanotomography. Appl. Phys. Lett. 96, (2010), pp. 1-3.

Chen, Y. K. et al, "Rapid hydrogen generation from aluminum-water system by adjusting water ratio to various aluminum/aluminum hydroxide," Int. J. Energy Environ Eng, vol. 5, 2014, pp. 1-6.

Chen-Wiegart, Y. C. K. et al, "Structural evolution of nanoporous gold during thermal coarsening," Acta Mater, vol. 60, 2012, pp. 4972-4981.

Cheng F., et al, "Metal-air batteries: from oxygen reduction electrochemistry to cathode catalysts," Chem. Soc. Rev, vol. 41, 2012, pp. 2172-2192.

Cook, J. B. et al, "Nanoporous Tin with a Granular Hierarchical Ligament Morphology as a Highly Stable Li-Ion Battery Anode," ACS Appl. Mater. Interfaces, vol. 9, Issue (1),2017, pp. 293-303.

Corsi J.S. et al, "Hierarchical Bulk Nanoporous Aluminum for On-Site Generation of Hydrogen by Hydrolysis in Pure Water and Combustion of Solid Fuels," ACS Sustainable Chem. Eng, vol. 7, Issue 13, 2019, pp. 11194-11204.

Cortie, M. B. et al, "Electrochemical Capacitance of Mesoporous Gold," Gold Bull, vol. 38, Issue 1, 2005, pp. 14-22.

Dash R. et al., "Titanium carbide derived nanoporous carbon for energy-related applications," Carbon N. Y, vol. 44, 2006, pp. 2489-2497.

David, W. I. F. "Effective Hydrogen Storage: A Strategic Chemistry Challenge," Faraday Discussions, 2011, pp. 399-414.

Deng, Z. Y. et al, "Effect of different modification agents on hydrogen-generation by the reaction of Al with water," Int. J. Hydrogen Energy, vol. 35, 2010, pp. 9561-9568.

Deng, Z. et al, "Enhancing the free corrosion dealloying rate with a catalytically driven reaction," Nanoscale, vol. 9, (2017), pp. 11858-11853.

Detsi E. et al., "Mesoporous Ni60Fe30Mn10-alloy based metal/metal oxide composite thick films as highly active and robust oxygen evolution catalysts," Energy Environ. Sci, vol. 9, 2016, pp. 540-549.

Detsi, E. et al, "Bulk Nanoporous Materials for On-Board Generation of Hydrogen and Other Products," U.S. Appl. No. 62/644,972, 2018.

Detsi, E. et al, "Fine-tuning the feature size of nanoporous silver," CrystEngComm, vol. 14, 2012, pp. 5402-5406.

Detsi, E. et al, "Direct synthesis of metal nanoparticles with tunable porosity," J. Mater. Chem, vol. 22, 2012, pp. 4588-4591.

Detsi, E. et al, "Enhanced strain in functional nanoporous gold with a dual microscopic length scale structure," ACS Nano, vol. 6, 2012, pp. 3734-3744.

Detsi, E. et al, "On tuning the morphology of nanoporous gold," Scr. Mater, vol. 64, (2011). pp. 319-322.

Detsi, E. et al, "Tuning Ligament Shape in Dealloyed Nanoporous Tin and the Impact of Nanoscale Morphology on Its Applications in Na—Ion Alloy Battery Anodes," Under-Review Phys. Rev. Mater, vol. 2, 2018.

Ding, Y. et al, "Nanoporous gold leaf: 'Ancient technology '/advanced material," Adv. Mater, vol. 16, 2004, pp. 1897-1900.

Dinga, G. P, "Hydrogen: The ultimate fuel and energy carrier," Int. J. Hydrogen Energy, vol. 14, (1989), pp. 777-784.

Dorofeeva, T. S. et al, "Electrically Tunable Pore Morphology in Nanoporous Gold Thin Films," Nano Res. vol. 8, Issue (7), 2015, pp. 2188-2198.

Dupiano, P. et al, "Hydrogen production by reacting water with mechanically milled composite aluminum-metal oxide powders,". Int. J. Hydrogen Energy, vol. 36, (2011), pp. 4781-4791.

Durbin, D. J et al, Review of hydrogen storage techniques for on board vehicle applications, International Journal of Hydrogen Energy, vol. 38, (2013), pp. 14595-14617.

Elam, C. et al, "Realizing the Hydrogen Future: The International Energy Agency's Efforts to Advance Hydrogen Energy Technologies," Int. J. Hydrogen Energy, vol. 28, Issue 6, 2003, pp. 601-607.

Elitzur, S. et al, "A. Study of hydrogen production and storage based on aluminum-water reaction," Int. J. Hydrogen Energy, vol. 39, 2014, pp. 6328-6334.

Erlebacher, J. et al, "Evolution of nanoporosity in dealloying," Nature, vol. 410, 2001, pp. 450-453.

Erogbogbo, F. et al, "On-demand hydrogen generation using nanosilicon: Splitting water without light, heat, or electricity," Nano Lett, vol. 13, 2013, pp. 451-456.

Fan, M. Q. et al, "Hydrogen production for micro-fuel-cell from activated Al—Sn—Zn—X (X: Hydride or halide) mixture in water," Renew. Energy, vol. 36, 2011, pp. 519-524.

Fauvet P. et al, "Corrosion mechanisms of austenitic stainless steels in nitric media used in reprocessing plants," J. Nucl. Mater, vol. 375, 2008, pp. 52-64.

Fu J. et al, "Integrated Metal-Air Battery and Selective Electrolytic Leaching Cell for the Preparation of Nanoporous Metals," ACS Appl. Nano Mater, vol. 1, Issue 8, 2018, pp. 4164-4169.

Fu, J. et al, "PH-Controlled Dealloying Route to Hierarchical Bulk Nanoporous Zn Derived from Metastable Alloy Precursors for Hydrogen Generation by Water Hydrolysis," ACS Appl. Energy Mater, vol. 1, Issue 7, 2018, pp. 3198-3205.

Funke, H. H. et al, "Hydrogen generation by hydrolysis of zinc powder aerosol," Int. J. Hydrogen Energy, vol. 33, 2008, pp. 1127-1134.

Geslin, P. et al, "Topology-generating interfacial pattern formation during liquid metal dealloying," Nat. Commun, vol. 6, 2015, pp. 1-19.

Gogotsi Y. et al., "Nanoporous carbide-derived carbon with tunable pore size," Nat. Mater, vol. 2, (2003), pp. 591-594.

Gong K. et al, "Nitrogen-doped carbon nanotube arrays with high electrocatalytic activity for oxygen reduction," Science, vol. 323, 2009, pp. 760-764.

Graf M. et al, "Electrocatalytic Methanol Oxidation with Nanoporous Gold: Microstructure and Selectivity," Nanoscale, vol. 9, 2017, pp. 17839-17848.

Grew, K. N. et al, "Assessment of Alane as a hydrogen storage media for portable fuel cell power sources," J. Power Sources, vol. 217, 2012, pp. 417-430.

Habashi, F, "A Hundred Years of the Bayer Process for Alumina Production," In Essential Readings in Light Metals, vol. 1, 2017, pp. 85-93.

(56) References Cited

OTHER PUBLICATIONS

Hakamada, M. et al, "Fabrication of Nanoporous Palladium by Dealloying and Its Thermal Coarsening," J. Alloys Compd, vol. 479, Issue (1-2), 2009, pp. 326-329.

Hang B. T. et al., "The effect of additives on the electrochemical properties of Fe/C composite for Fe/air battery anode," J. Power Sources, vol. 155, (2006), pp. 461-469.

Hayes, J. R. et al, "Monolithic nanoporous copper by dealloying Mn-Cu," J. Mater. Res, vol. 21, 2006, pp. 2611-2616.

He, Z. et al, "Preparation of nanoporous molybdenum film by dealloying an immiscible Mo—Zn system for hydrogen evolution reaction," RSC Adv, vol. 6, 2016, pp. 15390-15393.

Hench, L. L. et al., "The Sol-Gel Process," Chem. Rev, vol. 90, 1990, pp. 33-72.

Herricks, T. et al, "Polyol synthesis of platinum nanoparticles: Control of morphology with sodium nitrate," Nano Lett, vol. 4, 2004, pp. 2367-2371.

Hodge, a. M et al, "Scaling equation for yield strength of nanoporous open-cell foams," Acta Mater, vol. 55, 2007, pp. 1343-1349.

Hua, T. Q. et al. "Technical assessment of compressed hydrogen storage tank systems for automotive applications," Int. J. Hydrogen Energy, vol. 36, 2011, pp. 3037-3049.

Huang, X. N. et al, "Effects of amalgam on hydrogen generation by hydrolysis of aluminum with water, " Int. J. Hydrogen Energy, vol. 36, 2011, pp. 15119-15124.

Ilyukhina, A. V. et al, "Hydrogen generation from water by means of activated aluminum," in International Journal of Hydrogen Energy, vol. 37, 2012, pp. 16382-16387.

Inoishi A. et al, "A rechargeable Si-air solid state oxygen shuttle battery incorporating an oxide ion conductor," J. Mater. Chem. A, vol. 1, 2013, pp. 15212-15215.

Inoishi A. et al, "High capacity of an Fe-air rechargeable battery using LaGaO3-based oxide ion conductor as an electrolyte," Phys. Chem. Chem. Phys, vol. 14, 2012, pp. 12818-12822.

Jin, H. J. et al., "Nanoporous au-pt alloys as large strain electrochemical actuators," Nano Lett, vol. 10, 2010, pp. 187-194.

Jorgensen, S. W, "Hydrogen Storage Tanks for Vehicles: Recent Progress and Current Status," Curr. Opin. Solid State Mater Sci, vol. 15, Issue 2, 2011, pp. 39-43.

Kale, S. N. et al, "Emulsion Micro Emulsion and Nano Emulsion: A Review," Syst. Rev. Pharm, vol. 8, 2016, pp. 39-47.

Kanda, Y. et al, "Green hydrogen production by mechanical mixing of aluminum with water," J. Chem. Eng. Japan, vol. 44, 2011, pp. 803-808.

Kim, J. W. et al, "Sub-micron porous niobium solid electrolytic capacitor prepared by dealloying in a metallic melt," Mater. Lett, vol. 116, 2014, pp. 223-226.

Kim, M. et al, "Synthesis of nanoparticles by laser ablation: A review," KONA Powder and Particle Journal, 2017, pp. 80-90.

Kim, T. et al., "Size-Controlled Pd Nanoparticle Catalysts Prepared by Galvanic Displacement into a Porous Si-Iron Oxide Nanoparticle Host," ACS Nano, vol. 11, 2017, pp. 2773-2784.

Kothari, R. et al, "Comparison of Environmental and Economic Aspects of Various Hydrogen Production Methods," Renew. Sustain. Energy Rev, vol. 12, Issue 2, 2008, pp. 553-563.

Kraytsberg A. et al, "Review on Li-air batteries—Opportunities, limitations and perspective," J. Power Sources, vol. 196, 2011, pp. 886-893.

Krishnan, G. et al., "Shape and Structural Motifs Control of MgTi Bimetallic Nanoparticles Using Hydrogen and Methane as Trace Impurities," Nanoscale, vol. 10, Issue 3, 2018, pp. 1297-1307.

Krishnan, G. et al, "Strategies to Initiate and Control the Nucleation Behavior of Bimetallic Nanoparticles," Nanoscale, vol. 9, Issue 24, 2017, pp. 8149-8156.

Kucheyev S. O. et al., "Surface-enhanced Raman scattering on nanoporous Au," Appl. Phys. Lett, vol. 89, (2006).

Lang, X. et al, "Nanoporous Metal/Oxide Hybrid Electrodes for Electrochemical Supercapacitors," Nat. Nanotechnol, vol. 6, Issue 4, 2011, pp. 232-236.

Lang, X. et al, "Three-dimensional bicontinuous nanoporous Au/polyaniline hybrid films for high-performance electrochemical supercapacitors," J. Power Sources, vol. 197, 2012, pp. 325-329.

Lee J. S. et al., "Metal-air batteries with high energy density: Li-air versus Zn-air," Adv. Energy Mater, vol. 1, (2011), pp. 34-50.

Li W. et al., "Metallic magnesium nano/mesoscale structures: Their shape-controlled preparation and Mg/air battery applications,"Angew. Chemie—Int. Ed, vol. 45, 2006, pp. 6009-6012.

Lilleodden, E. T et al., "On the Topological, Morphological, and Microstructural Characterization of Nanoporous Metals," MRS Bull, vol. 43, Issue 1, 2018, pp. 20-26.

Lim, K. L., et al., "Solid-state materials and methods for hydrogen storage: A critical review," Chemical Engineering and Technology, vol. 33, 2010, pp. 213-226.

Litvinenko, S et al., "Hydrogen production from nano-porous Si powder formed by stain etching," Int. J. Hydrogen Energy, vol. 35, 2010, pp. 6773-6778.

Liu W et al., "An enhanced electrochemical performance of a sodium-air battery with graphene nanosheets as air electrode catalysts," Chem. Commun, vol. 49, 2013, pp. 1951-1953.

Liu, S et al., "The Morphology-Controlled Synthesis of a Nanoporous-Antimony Anode for High-Performance Sodium-Ion Batteries," Energy Environ. Sci, vol. 9, Issue (4), 2016, pp. 1229-1236.

Lu, X et al., "Galvanic replacement reaction: A simple and powerful route to hollow and porous metal nanostructures," Proc. Inst. Mech. Eng. Part N J. Nanoeng. Nanosyst, vol. 221, 2007, pp. 1-16.

Lukatskaya M. R et al., "Room-temperature carbide-derived carbon synthesis by electrochemical etching of MAX phases," Angew. Chemie - Int. Ed, vol. 126, 2014, pp. 4977-4980.

Ma, G. L et al., "Controlled hydrogen generation by reaction of aluminum/sodium hydroxide/sodium stannate solid mixture with water," Int. J. Hydrogen Energy, vol. 37, 2012, pp. 5811-5816.

Ma, K et al., "Origin of the vol. Contraction during Nanoporous Gold Formation by Dealloying for High-Performance Electrochemical Applications," ACS Appl. Nano Mater, 2018, C, acsanm.7b00055.

Ma, W et al., "A Mesoporous Antimony- Based Nanocomposite for Advanced Sodium Ion Batteries," Energy Storage Mater, vol. 13, 2018, pp. 247-256.

Maggi, F et al., "Activated Aluminum Powders for Space Propulsion," Powder Technol, vol. 270, 2015, pp. 46-52.

Mahmoodi, K et al., "Enhancement of hydrogen generation rate in reaction of aluminum with water," Int. J. Hydrogen Energy, vol. 35, 2010, pp. 5227-5232.

Maxwell, T. L et al., "The Fabrication and Characterization of Bimodal Nanoporous Si with Retained Mg through Dealloying," Adv. Eng. Mater, vol. 20, 1700519, 1-9 (2017).

Mazloomi, K et al., "Hydrogen as an energy carrier: Prospects and challenges," Renewable and Sustainable Energy Reviews, vol. 16, 2012, pp. 3024-3033.

Meng, F et al., "Sub-Micrometer-Thick All-Solid-State Supercapacitors with High Power and Energy Densities," Adv. Mater, vol. 23, Issue (35),2011, pp. 4098-4102.

Midilli, A., et al., "On hydrogen and hydrogen energy strategies I : Current status and needs," Renew. Sustain Energy Rev, vol. 9, 2005, pp. 255-271.

Miguel, N De et al., "Compressed hydrogen tanks for on-board application: Thermal behaviour during cycling," Int. J. Hydrogen Energy, vol. 40, (2015), pp. 6449-6458.

Misra, C. "Aluminum Oxide (Alumina), Hydrated. Kirk-Othmer Encycl," Chem. Technol, vol. 2, 2003, pp. 421-433.

Oh, M. H et al., "Galvanic Replacement Reactions in Metal Oxide Nanocrystals," Science, vol. 340, 2013, pp. 964-968.

Özmetin C et al., "Kinetic investigation of reaction between metallic silver and nitric acid solutions," Chem. Eng. Technol, vol. 23, 2000, pp. 707-711.

Park, B. K et al., "Synthesis and size control of monodisperse copper nanoparticles by polyol method," J. Colloid Interface Sci, vol. 311, 2007, pp. 417-424.

Pasini, J. M et al. "Metal hydride material requirements for automotive hydrogen storage systems," Int. J. Hydrogen Energy, vol. 38, 2013, pp. 9755-9765.

(56) References Cited

OTHER PUBLICATIONS

Petrovic, J. et al, "Reaction of Aluminum with Water to Produce Hydrogen," US Dep. Energy, 2008, pp. 1-26.
Phambu, N, "Characterization of Aluminum Hydroxide Thin Film on Metallic Aluminum Powder," Mater. Lett, vol. 57, Issue 19, 2003, pp. 2907-2913.
Presser V., et al, Effect of pore size on carbon dioxide sorption by carbide derived carbon, Energy Environ Sci, vol. 4. 2011, pp. 3059-3066.
Qian, L. H. et al, "Ultrafine nanoporous gold by low-temperature dealloying and kinetics of nanopore formation," Appl. Phys Lett, vol. 91, 2007, pp. 89-92.
Rahman M. A. et al, "High Energy Density Metal-Air Batteries: A Review," J. Electrochem. Soc, vol. 160, 2013, pp. A1759-A1771.
Razavi-Tousi, S. S. et al, "Effect of structural evolution of aluminum powder during ball milling on hydrogen generation in aluminum-water reaction," Int. J. Hydrogen Energy, vol. 38, 2013, pp. 795-806.
Rosenband, V. et al, "Application of activated aluminum powder for generation of hydrogen from water," Int. J. Hydrogen Energy, vol. 35, 2010, pp. 10898-10904.
Ruffato G. et al, "Nanoporous gold plasmonic structures for sensing applications, " Opt. Express, vol. 19, 2011, pp. 13164-13170.
Rusman, N. A. A. et al, "Review on the Current Progress of Metal Hydrides Material for Solid-State Hydrogen Storage Applications," Int. J. Hydrogen Energy, vol. 41, Issue 28, 2016, pp. 12108-12126.
Russo, R. E. et al, "Laser ablation in analytical chemistry—a review," Talanta, vol. 57, 2002, pp. 425-451.
Sakintuna, B.,et al, "Metal hydride materials for solid hydrogen storage: A review?," Int. J. Hydrogen Energy, vol. 32, 2007, pp. 1121-1140.
Seker, E. et al, "Nanoporous gold: Fabrication, characterization, and applications, " Materials, vol. 2, 2009, pp. 2188-2215.
Semaltianos, N. G, "Nanoparticles by laser ablation," Crit. Rev. Solid State Mater. Sci, vol. 35, 2010, pp. 105-124.
Seo, Y. I. et al, "Do. Mechanism of Aluminum Hydroxide Layer Formation by Surface Modification of Aluminum," Appl. Surf. Sci, vol. 256, Issue 14, 2010, pp. 4434-4437.
Shkolnikov, E. I. et al, "Aluminum as Energy Carrier: Feasibility Analysis and Current Technologies Overview," Renewable and Sustainable Energy Reviews, vol. 15, 2011, pp. 4611-4623.
Snyder J., et al, "Dealloying Silver/Gold Alloys in Neutral Silver Nitrate Solution: Porosity Evolution, Surface Composition, and Surface Oxides," J. Electrochem. Soc, vol. 155, 2008, pp. C464-C473.
Snyder, J. et al, "Structure/Processing/Properties relationships in nanoporous nanoparticles as applied to catalysis of the cathodic oxygen reduction reaction," J. Am. Chem. Soc, vol. 134, 2012, pp. 8633-8645.
Soler, L. et al, "Hydrogen generation from water and aluminum promoted by sodium stannate," Int. J. Hydrogen Energy, vol. 35, 2010, pp. 1038-1048.
Soler, L. et al, "In situ generation of hydrogen from water by aluminum corrosion in solutions of sodium aluminate," J. Power Sources , vol. 192, 2009, pp. 21-26.
Somiya, S. et al., "Hydrothermal synthesis of fine oxide powders," Bull. Mater. Sci, vol. 23, 2000, pp. 453-460.
Stenner C., et al., "Piezoelectric Gold : Strong Charge-Load Response in a Metal-Based Hybrid Nanomaterial," Adv. Funct. Mater., 2016, pp. 5174-5181.
Sundaram, D. S. et al, "Combustion of nano aluminum particles," (Review). Combust. Explos. Shock Waves, vol. 51, 2015, pp. 173-196.
Tabereaux, A. T. et al, "Aluminum Production," In Treatise on Process Metallurgy, vol. 3, 2014, pp. 839-917.

Tai, M. C. et al, "Optical in Situ Study of De-Alloying Kinetics in Nanoporous Gold Sponges, " RSC Adv, vol. 6, Issue 89, 2016, pp. 85773-85778.
Tilley, R. D. et al, "Micro-emulsion synthesis of monodisperse surface stabilized silicon nanocrystals," Chem. Commun, 2005, pp. 1833-1835.
Utgikar, V. P. et al, "Safety of compressed hydrogen fuel tanks: Leakage from stationary vehicles," Technol. Soc, vol. 27, 2005, pp. 315-320.
Wada T. et al, "Preparation of three-dimensional nanoporous Si using dealloying by metallic melt and application as a lithium-ion rechargeable battery negative electrode," J. Power Sources, vol. 306, 2016, pp. 8-16.
Wada, T. et al, "Dealloying by metallic melt. Mater," Lett, vol. 65, (2011), pp. 1076-1078.
Wada, T. et al, "Nano- to submicro-porous ß-Ti alloy prepared from dealloying in a metallic melt," Scr. Mater, vol. 65, 2011, pp. 532-535.
Walter, M. G. et al, "Solar Water Splitting Cells," Chem. Rev, vol. 110, 2010, pp. 6446-6473.
Wang, H. Z, "A Review on Hydrogen Production Using Aluminum and Aluminum Alloys," Renew. Sustain. Energy Rev, vol. 13, Issue 4, 2009, pp. 845-853.
Weissmuller J. et al, "Charge-Induced Reversible Strain in a Metal," Science, vol. 300, 2003, pp. 312-315.
Weissmuller, J. et al, "Dealloyed Nanoporous Materials with Interface-Controlled Behavior," MRS Bull, vol. 43, Issue 1, 2018, pp. 14-19.
Wittstock A. et al, "Nanoporous gold catalysts for selective gas-phase oxidative coupling of methanol at low temperature," Science , vol. 327, 2010, pp. 319-322.
Xia, X. et al, "A silver nanocube on a gold microplate as a well-defined and highly active substrate for SERS detection," J. Mater. Chem. C, vol. 1, 2013, 6145.
Xu C. et al, "A general corrosion route to nanostructured metal oxides," Nanoscale, vol. 2, 2010, pp. 906-909.
Yaghoobnejad Asl, H. et al, "In Situ Dealloying of Bulk Mg2Sn in Mg-Ion Half Cell as an Effective Route to Nanostructured Sn for High Performance Mg-Ion Battery Anodes," Chem. Mater, 2018, acs.chemmater.7b04124.
Yang S. et al., "Design and analysis of aluminum/air battery system for electric vehicles," J. Power Sources, vol. 112, 2002, pp. 162-173.
Yang, W. et al, "Nanoporous Aluminum by Galvanic Replacement : Dealloying and Inward-Growth Plating," vol. 165, Issue 9, 2018, pp. C492-C496.
Zeng, K. et al, "Recent Progress in Alkaline Water Electrolysis for Hydrogen Production and Applications," Progress in Energy and Combustion Science, 2010, pp. 307-326.
Zhang Q. et al, "A benign route to fabricate nanoporous gold through electrochemical dealloying of Al—Au alloys in a neutral solution," Electrochim. Acta, vol. 54, 2009, pp. 6190-6198.
Zhang, H. et al, "Synthesis of Pd-Pt bimetallic nanocrystals with a concave structure through a bromide-induced galvanic replacement reaction," J. Am. Chem. Soc, vol. 133, 2011, pp. 6078-6089.
Zhang, Z. M et al, "Microstructure of Binary Mg—Al Eutectic Alloy Wires Produced by the Ohno Continuous Casting Process," Acta Metall. Sin, (English Lett, vol. 21, Issue 4, 2008, pp. 275-281.
Zhang, Z. et al, "Generalized Fabrication of Nanoporous Metals (Au, Pd, Pt, Ag, and Cu) through Chemical Dealloying," J. Phys. Chem. C, vol. 113, Issue (29), 2009, pp. 12629-12636.
Zhao, Z. et al, "Hydrogen generation by splitting water with Al—Ca alloy," Energy, vol. 36, 2011, pp. 2782-2787.
Züttel, A. et al, "Hydrogen: the future energy carrier," Philos. Trans. A. Math. Phys. Eng. Sci, vol. 368, 2010, pp. 3329-3342.

* cited by examiner

EDX before dealloying (the composition before dealloying gives approximately $Si_{35}Mg_{65}$)

| Mg (Atomic %) | Si (Atomic %) |
|---|---|
| 63.07 | 36.93 |
| 65.43 | 34.57 |
| 63.28 | 36.72 |

EDX after dealloying (the composition after dealloying gives approximately $Si_{88}Mg_{12}$)

| Mg (Atomic %) | Si (Atomic %) |
|---|---|
| 12.80 | 87.20 |
| 10.48 | 89.52 |
| 13.97 | 86.03 |

FIG. 4

High magnification SEM image of a Nanoporous Si grain after air-free dealloying

Solid Mg2Ga5 parent alloy before dealloying (The grain is composed of Mg and Ga)

Liquid Ga is obtained after air-free dealloying in APC (Although the Ga grain is obviously not porous because it is liquid near room temperature, we were able to remove Mg from the starting Ga-Mg alloy)

BULK NANOPOROUS MATERIALS FOR ON-SITE AND ON-BOARD GENERATION OF HYDROGEN AND OTHER PRODUCTS

CROSS-REFERENCE TO RELATED APPLICATIONS

This application is the National Stage Application of International Patent Application No. PCT/US2019/022954, filed Mar. 19, 2019, which claims the benefit of and priority to U.S. application 62/644,972, "Bulk Nanoporous Materials For On-Board Generation Of Hydrogen And Other Products" (filed Mar. 19, 2018), the entireties of which applications are incorporated herein by reference for any and all purposes.

GOVERNMENT RIGHTS

This invention was made with government support under CMMI-1840672 awarded by the National Science Foundation. The government has certain rights in the invention.

TECHNICAL FIELD

The present disclosure relates to the field of nanoporous materials to the field of hydrogen gas production, production of nanostructured metal oxide, and production of heat.

BACKGROUND

At present, $H_2$ is not yet widely used as sustainable energy carrier. This is primarily because of the absence of a sustainable method to produce hydrogen through a carbon-free process; over 95% of hydrogen used worldwide is made by steam reforming, which is not a carbon-free processing method. Further, produced $H_2$ needs to be stored prior to usage because $H_2$ is a gas at room temperature and takes up a lot of space. In fact, $H_2$ exhibits the lowest volumetric energy density of all common energy carriers (0.0108 MJ/L versus 34 MJ/L for petroleum). Consequently, the effective storage of $H_2$ remains a challenge and the common approach to store $H_2$ for on-board applications is by compression in tanks.

There are, however, safety concerns with storing highly pressurized flammable gas cylinders. Accordingly, there is a long-felt need in the art for technologies that can provide useful quantities of $H_2$, both "on demand" and also "on-site".

SUMMARY

The present disclosure provides, inter alia, bulk nanoporous materials (e.g., bulk nanoporous aluminum, BNP-Al), along with methods of fabricating such materials.

By illustrative, non-limiting, reference to BNP-Al, BNP-Al made according to the present disclosure can be a bicontinuous network of randomly interconnected solid nanostructures (called ligaments) and open nanochannels (called pores). The average characteristic size of these ligaments and pores can be in the range of from about 10 to about 30 nm.

BNP-Al can be fabricated by selective electrolytic removal of Mg from Al—Mg parent materials with composition $Al_{30}Mg_{70}$ at. % under inert environment. During this process, the 70 at. % magnesium removed from the starting parent material can be fully recovered as pure Mg metal, and can be directly re-used to make new Al—Mg parent materials.

The disclosed materials have a variety of uses. As one example, one can use BNP-Al for on-board $H_2$ production from water (e.g., in liquid form, in steam/vapor form) to power portable devices and $H_2$ fuel cell vehicles for on-board applications. One can also use BNP-Al (as one example) for $H_2$ production from water (in liquid and/or vapor form) on-site at hydrogen refueling stations, petroleum refineries, ammonia production facilities, and the like. One can also use BNP-Al as a catalyst for combustion (i.e., an ignition aid) or even as an active ingredient in water-powered rocket engines, such as ALICE (Aluminum ICE rocket propellant).

In one aspect, the present disclosure provides a composition, comprising a nanoporous material, the nanoporous material comprising interconnected ligaments defining pores therebetween, the pores being open to the environment exterior to the nanoporous material, the nanoporous material optionally comprising a metal having a standard reduction potential less than the standard hydrogen electrode (SHE) at 0 V vs SHE, and the pores being characterized as having an average cross-section in the range of from about 3 to about 100 nm.

Also provided is a power cell, comprising: the composition according to the present disclosure, the composition optionally being disposed in a removable cartridge; an amount of water, the power cell being configured to effect contact between the composition and the water; and a collector disposed to collect hydrogen evolved from contact between the water and the composition.

Further provided is a method, comprising: applying a voltage or a current to a first parent mixture comprising (a) a first material and (b) a second material, the first material optionally comprising a metal, metalloid or semiconductor material, having a standard reduction potential less than the standard hydrogen electrode (SHE) at 0 V vs SHE, the applying being performed in the presence of a counter and reference electrodes that comprises the second material, the first parent mixture and the counter and reference electrodes contacting an electrolyte, the applying being performed under such conditions that the second material is selectively removed from the first parent mixture so as to leave behind a nanoporous portion of the first material, the nanoporous portion of the first material comprising interconnected ligaments defining pores therebetween, the pores being open to the environment exterior to the nanoporous portion of the first material, the pores being characterized as having an average cross-section in the range of from about 3 to about 100 nm, the applying optionally being performed in an inert environment.

Also disclosed are systems, comprising: a supply of a first parent mixture that comprises a first material and a second material; a counter and reference electrodes that comprises the second material; an electrolyte contacting the first parent mixture and the counter and reference electrodes, the electrode comprising ions of the second material; and a voltage or current source configured to apply a voltage or current under such conditions that the second material is selectively removed from the first parent mixture so as to leave behind a nanoporous portion of the first material, the nanoporous portion of the first material comprising interconnected ligaments defining pores therebetween, the pores being open to the environment exterior to the nanoporous portion, the pores being characterized as having an average cross-section in the range of from about 3 to about 100 nm.

Further provided is a vehicle, the vehicle comprising: a composition according to the present disclosure; optionally a supply of water (e.g., liquid and/or vapor form); a fuel cell configured to generate electricity from hydrogen evolved from contact between the composition and the supply of water; and a drive system, the vehicle being configured to communicate electricity from the fuel cell to the drive system so as to propel the vehicle.

Also provided is a generator unit, the generator unit comprising: a composition according to the present disclosure; a supply of water (e.g., liquid and/or vapor form); a fuel cell configured to generate electricity from hydrogen evolved from contact between the composition and the supply of water; and the generator unit comprising an outlet configured to communicate electricity from the fuel cell to device in electronic communication with the outlet.

The present disclosure also provides a vehicle, the vehicle comprising: a composition according to the present disclosure; the composition in communication with an amount of water, the vehicle being configured for propulsion by combustion of hydrogen evolved by reaction of the water and the composition.

Also provided are methods, comprising: contacting a composition comprising a water-reactive nanoporous material and water so as to effect evolution of hydrogen, a heat, and one or both of an oxide or a hydroxide of the material, the material optionally comprising a metal having a standard reduction potential less than the standard hydrogen electrode (SHE) at 0 V vs SHE.

Further provided are systems, a reaction chamber configured to contact water and a water-reactive material under conditions sufficient to effect evolution of (i) hydrogen, (ii) a heat, and (iii) one or both of an oxide of or a hydroxide of the water-reactive material, the material optionally being nanoporous, and the material optionally comprising a metal having a standard reduction potential less than the standard hydrogen electrode (SHE) at 0 V vs SHE.

Additionally provided are methods, comprising contacting a composition according to the present disclosure with water under conditions sufficient to effect evolution of (i) hydrogen, (ii) heat, and (iii) one or both of an oxide of or a hydroxide of the nanoporous material.

Also provided are methods, comprising combusting a composition according to the present disclosure.

Further provided are compositions, comprising: (i) an oxide of a material, the oxide of the material being formed by contacting the material with water under conditions sufficient to evolve hydrogen and the oxide of the material; (ii) a hydroxide of a material, the hydroxide of the material being formed by contacting the material with water under conditions sufficient to evolve hydrogen and the hydroxide of the material; or (iii) both (i) and (iii).

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown. Elements shown in the figures are not necessarily to scale.

FIG. 4 provides quantitative EDX data associated with the Si—Mg grains from FIG. 1 before and after air-free dealloying in APC. These data also confirm that Mg has been removed from the starting Si—Mg alloyed. The starting Mg content before dealloying is 65 at %, and after dealloying the residual Mg content is ~10 at %.

DETAILED DESCRIPTION OF ILLUSTRATIVE EMBODIMENTS

Figure 1:
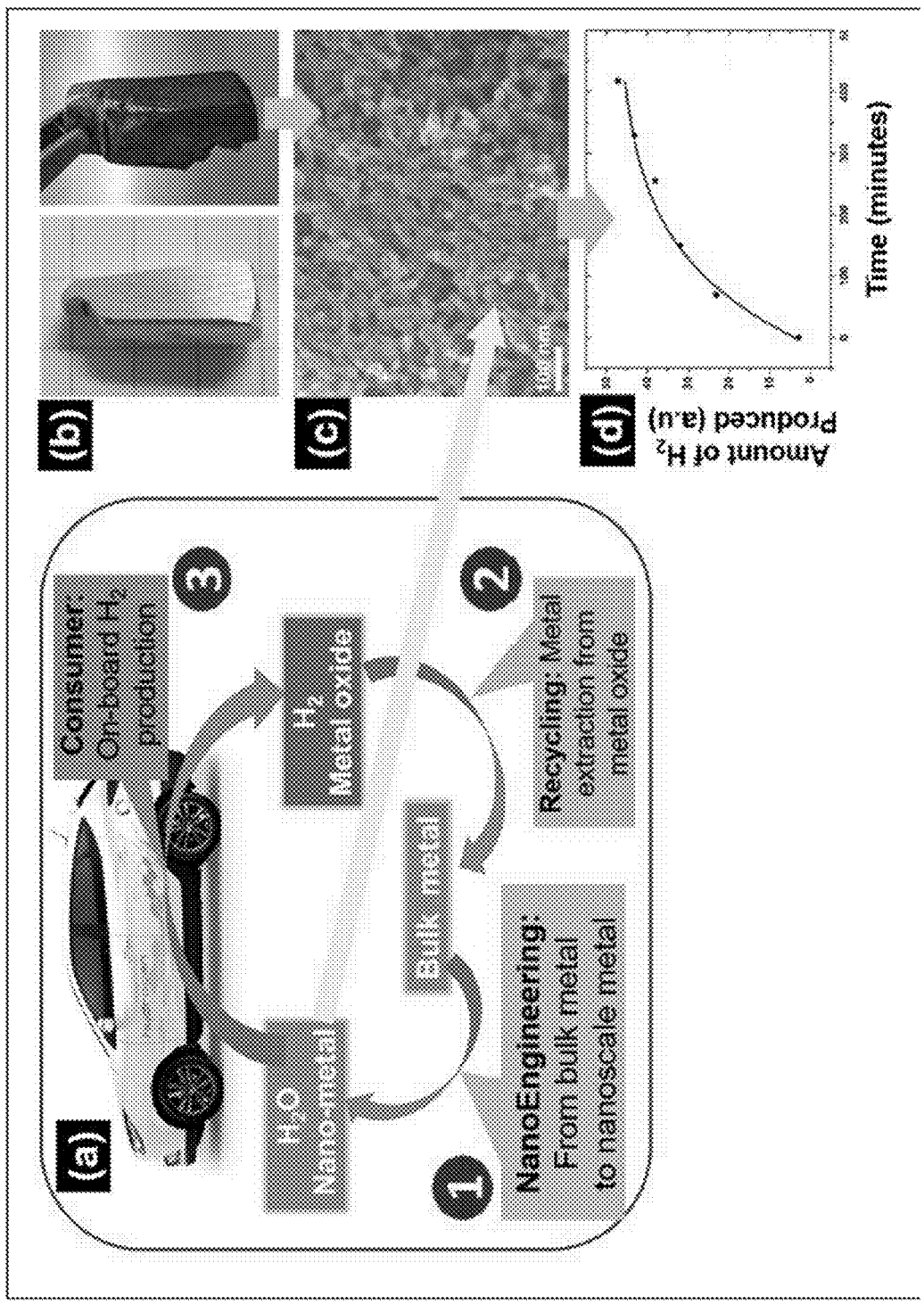
FIG. 1 provides (panel a) a suggested application for on-board hydrogen production, wherein hydrogen is generated on-board using only water and BNL-Al. After usage, the BNP-Al can be converted into its oxide, from which bulk metal can be extracted and re-used to make new BNL-Al; (panel b) shows fabricated materials, wherein the left-hand image shows an exemplary $Al_{30}Mg_{70}$ at % parent alloy (left-hand image) used to make bulk BNP-Al (right-hand image); (panel c) an electron micrograph showing the microstructure of bulk nanoporous Al. The ligament size is this exemplary embodiment was the range of 10-30 nm, which is suitable for full reaction of Al with water to make hydrogen; and (panel d) hydrogen produced over 7 hours from the bulk nanoporous Al and water.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order. Any documents cited herein are incorporated by reference in their entireties for any and all purposes.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range. In addition, the term "comprising" should be understood as having its standard, open-ended meaning, but also as encompassing "consisting" as well. For example, a device that comprises Part A and Part B can include parts in addition to Part A and Part B, but can also be formed only from Part A and Part B.

Illustrative Disclosure

The present disclosure addresses the long-felt needs in the art for sustainable hydrogen generation without $CO_2$ emissions, and effective storage of this hydrogen for specific applications. Provided here is, inter alia, fabrication of hierarchical bulk nanoporous material (e.g., aluminum) with the coexistence of macroscopic and mesoscopic ligament/pore structures, with the mesoscopic ligaments being, e.g., in the range of 10-20 nm. Also provided is the use of such nanoporous material (e.g., nanoporous aluminum) to produce hydrogen on-board. Hydrogen yields can be, e.g., ~52-85% by hydrolysis with "pure" water, without incorporation of any catalyst or reaction promoter in the aluminum-water system. The nanoporous material (e.g., aluminum) can be combusted in air under ambient conditions, demonstrating that the material can be used as a combustion fuel catalyst, e.g., to enhance the ignition and combustion of solid propellants. One can also include a carbon-free pathway to extract aluminum by electrolysis of $Al_2O_3$ without CO2 emissions. Thus enables one to produce hydrogen from nanoporous material (e.g., aluminum) and pure water without greenhouse gas emissions.

Hydrogen, a highly abundant substance on Earth in the form of water is a very promising energy carrier for producing electricity with zero-emissions upon reaction with oxygen for various applications including the transportation sector. Of common energy carrier media, hydrogen a gravimetric energy density of 142 $MJ \cdot kg^{-1}$, compared to 47 2 $MJ \cdot kg^{-1}$ for petroleum used in combustion engines.

At present, however, over 95% of hydrogen used worldwide is produced through steam reforming of natural gas, in which process $CO_2$ (a greenhouse gas) is co-produced during steam reforming.

Hydrogen can also be produced in a sustainable manner by electrolysis of water. The efficiency of such an approach is low, however, as the electrical energy used to produce hydrogen is much higher than the energy that one can get back from this hydrogen. Therefore, scalable routes to generate hydrogen without any CO2 footprint are still desirable.

Assuming hydrogen can be produced successfully in a sustainable manner, proper storage of this hydrogen prior to usage poses another challenge. This is because hydrogen is a low density gas at room temperature and takes up a lot of space. Solid-state hydrogen storage has been proposed, but materials for practical and reversible solid-state hydrogen storage are still under development. The common approach to store hydrogen for on-board applications is through the use of pressurized gas cylinders. The storage capacity of compressed hydrogen tanks is, however, restricted due to safety considerations associated with high-pressure flammable gases. Accordingly, methods to generate hydrogen for on-site applications are desirable.

To overcome the two issues presented, one can utilize hydrogen generation by hydrolysis of water-reactive materials for on-board applications (i.e. without the need of storing this hydrogen). For example, upon contact with water, reactive metals such as Al and Zn can produce hydrogen, heat and the corresponding metal hydroxide through the following equations:

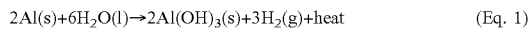
$$2Al(s)+6H_2O(l) \rightarrow 2Al(OH)_3(s)+3H_2(g)+heat \qquad (Eq. 1)$$

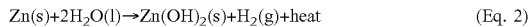
$$Zn(s)+2H_2O(l) \rightarrow Zn(OH)_2(s)+H_2(g)+heat \qquad (Eq. 2)$$

The reaction of water with these class of metals is much safer than with alkali metals. Even though the reactions in Eqs. 1 and 2 are thermodynamically favorable, they are self-limiting and do not continually proceed because the metal hydroxide layer (or "oxide" layer depending on the specific reaction conditions) co-produced during the process forms an envelope around the metal surface at the beginning of the reaction. This hydroxide envelope prevents water from coming into direct contact with the metal underneath.

Several methods have been proposed to overcome the water-blocking hydroxide layer in order to allow the metal to fully react. These methods include:
(a) Disruption of the hydroxide envelope through incorporation of catalysts and reaction promoters such as salts, Ga, Li, In and Sn in the metal to make aluminum-salts mixtures or alloys with a high water-reactivity.
(b) Disruption of the hydroxide envelope through addition in water of catalysts and reaction promoters such as NaCl, NaOH and various metal oxides in the powder form These methods, however, have not resulted in breakthrough in the field. This is partly because the use of catalysts and reaction promoters significantly lowers the theoretical gravimetric hydrogen generation capacity of the metal-water system, since additional materials that are inactive towards hydrogen generation are considered as "dead" mass. Besides lowering the theoretical capacity, in terms of recyclability, foreign substances (i.e. catalysts and reaction promoters) added to the metal-water system will be present as impurities in the aluminum hydroxide co-produced during hydrogen generation. These impurities are undesirable because they need to be removed through a complex purification process (i.e. Bayer process) prior to aluminum recovery from aluminum hydroxide.

The present disclosure modifies the microstructure of the metal through nanoengineering. Indeed, the reactions in Eqs. 1 and 2 are self-limiting only in bulk materials. In other words, these reactions will fully proceed if the size of the metal is "small" enough. Without being bound to any particular theory, one can hypothesize that the ideal size of the metal should be comparable to the thickness of the metal hydroxide envelope formed during the process, which in the case of aluminum hydroxide has been reported to be around ~3.5 nm.

Based on this hypothesis, nanostructured aluminum with particles size around ~7 nm (i.e. twice the thickness of the hydroxide envelope) can fully react with water to produce aluminum hydroxide and hydrogen gas with a yield of 100%. One can introduce hierarchical nanoporosity in the bulk of aluminum. This hierarchical porosity is characterized by the coexistence of both macroscopic and mesoscopic ligament/pore structures.

The mesoscopic ligaments in the range of 10-20 nm were found to actively react with water to produce hydrogen with a yield of ~52-85%, without incorporation of any catalyst or reaction promoter in an exemplary aluminum-water system.

In this hierarchical architecture, the macroscopic pores facilitate the flow of water through the bulk of aluminum, allowing the mesoscopic ligaments to react with water. Aluminum is an exemplary (but not limiting) candidate material for this application, as aluminum is the most abundant metal on earth's crust. Furthermore, aluminum exhibits the highest hydrogen generation capacity of 3.7 wt. %. Presented here is hydrogen generation for on-board applications using the hierarchical nanoporous aluminum-water system without the need of storing this hydrogen. The disclosed technology presents several aspects, which can be illustrated (by reference to an exemplary, non-limiting Al—Mg system) as:

Fabrication of oxide-free hierarchical bulk nanoporous material (e.g., Al) with ultrafine ligaments in the range of 10-20 nm by electrolytic removal of sacrificial material. This is exemplified by removing Mg from Al—Mg parent alloys; such alloys can have a near-eutectic composition.

Recovery of the sacrificial Mg simultaneously during the electrolytic leaching process. Recovered Mg can be re-used to make new Al—Mg parent alloys.

Use of the fabricated hierarchical nanoporous Al with water to produce hydrogen with a yield in the range of ~52-85% through Eq.1.

Combustion of this bulk nanoporous aluminum in air and under ambient conditions is demonstrated, which makes this material attractive as a catalyst for solid fuel combustion.

One application of the disclosed technology is hydrogen fuel cell vehicles. While such vehicles are becoming very popular, their wide use is partly impeded by the very limited number of hydrogen refueling stations worldwide. For instance, the US owns less than 40 refueling stations, much of which are in California. On-board hydrogen generation is a promising solution to this lack of infrastructure, and thanks to recent progress in carbon-free aluminum smelting (e.g., by the Elysis™ company), bulk nanoporous aluminum reported in this work can be used for on-site large-scale production of hydrogen from water in a sustainable manner for transportation applications.

Example Results

Preparation of Parent Alloy

An Al—Mg parent alloy with near-eutectic composition was used for the fabrication of hierarchical nanoporous Al. The parent alloy, was made by melting pure Al and pure Mg.

Figure 10A:
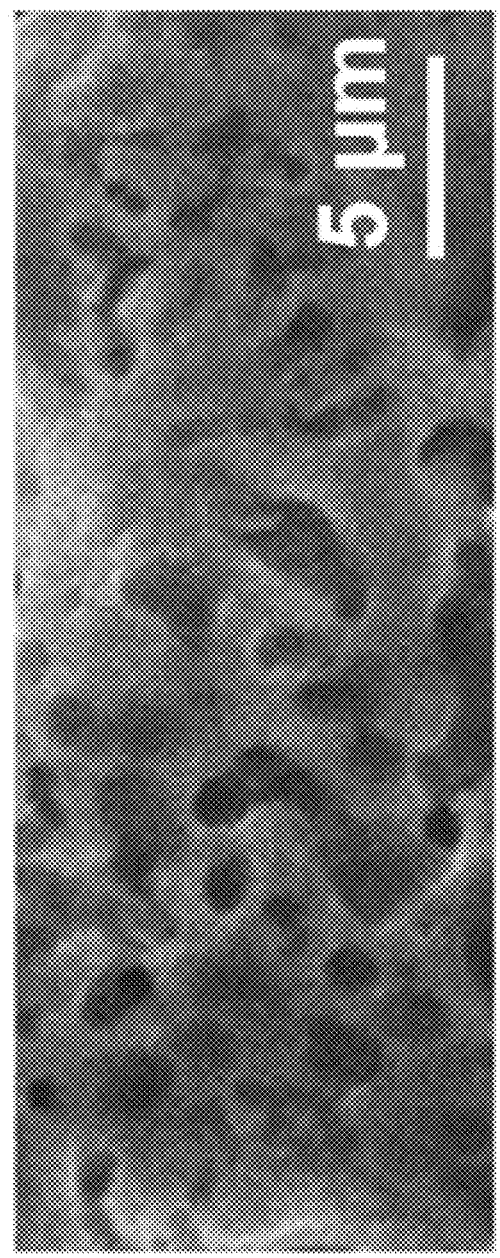
FIG. 10 provides (panel a) SEM of the starting Al—Mg parent alloy with the surface pre-treated to enhance the contrast between the α-Mg phase (dark) and β-Al12Mg17 phase (light), (panel b) XRD data for the Al—Mg parent alloy before (green) and after (orange) dealloying, together with crystallography data of Al (red), $Al_{12}Mg_{17}$ (purple), and Mg (blue), and (panel c) EDS data of the Al—Mg parent alloy before (upper image) and after (lower image) dealloying.

Two microstructural phases were present in the fabricated near-eutectic Al—Mg alloy, as expected from the Al—Mg equilibrium phase diagram. These phases can be distinguished from the low-magnification scanning electron micrograph in FIG. 10A, where the dark area corresponds to α-Mg solid solution, and the light area represents β-$Al_{12}Mg_{17}$ intermetallic (the alloy surface was pretreated by etching to enhance the phase contrast). One can identify these two phases from low-magnification imaging because the alloy surface was pre-treated with acid (which is not a rule or requirement) to initiate the corrosion process; since the α-Mg dissolves faster than the β-$Al_{12}Mg_{17}$ intermetallic phase after surface treatment, the two phases can be dissociated from low-magnification electron micrographs.

Figure 10B:
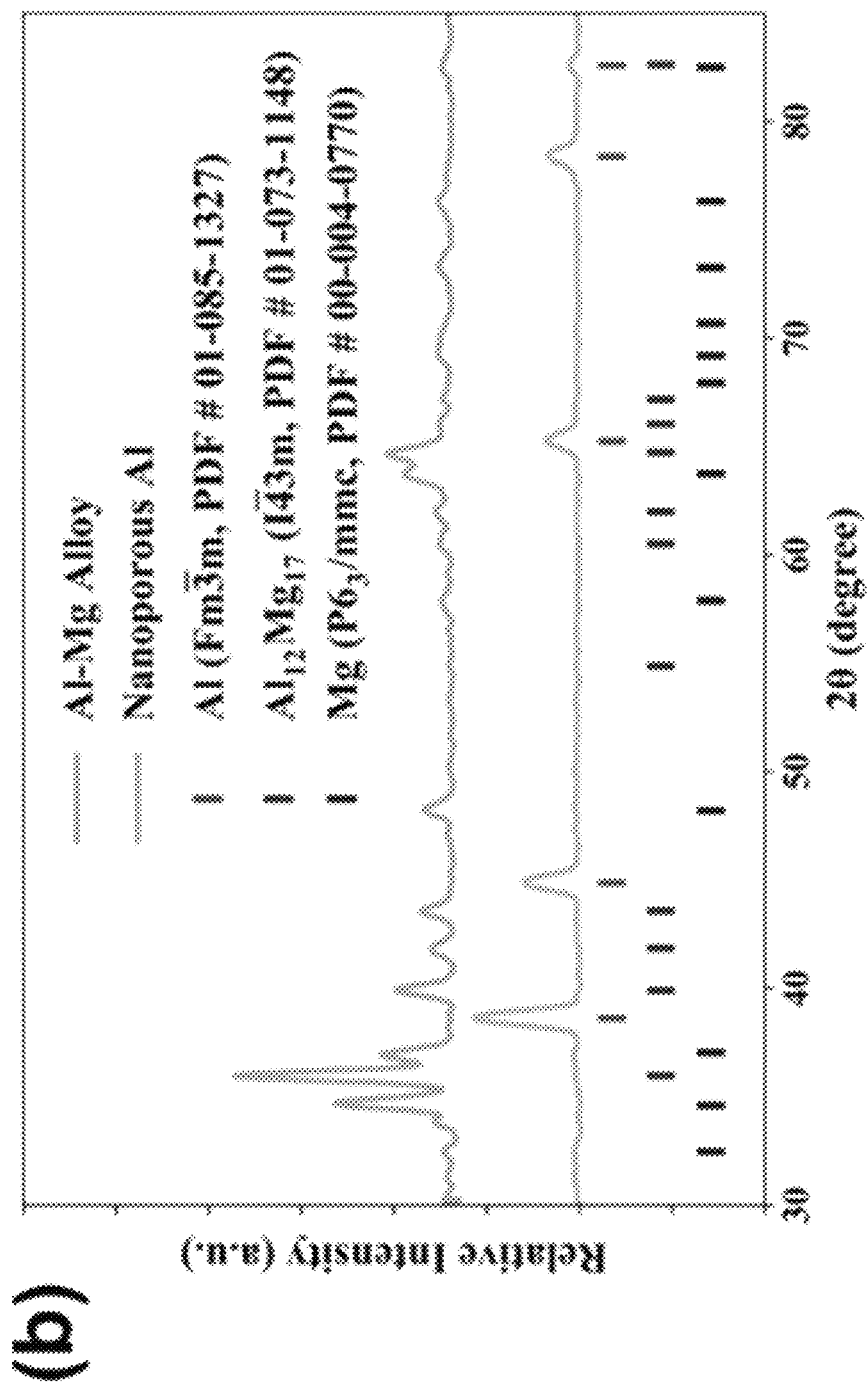
Figure 10C:
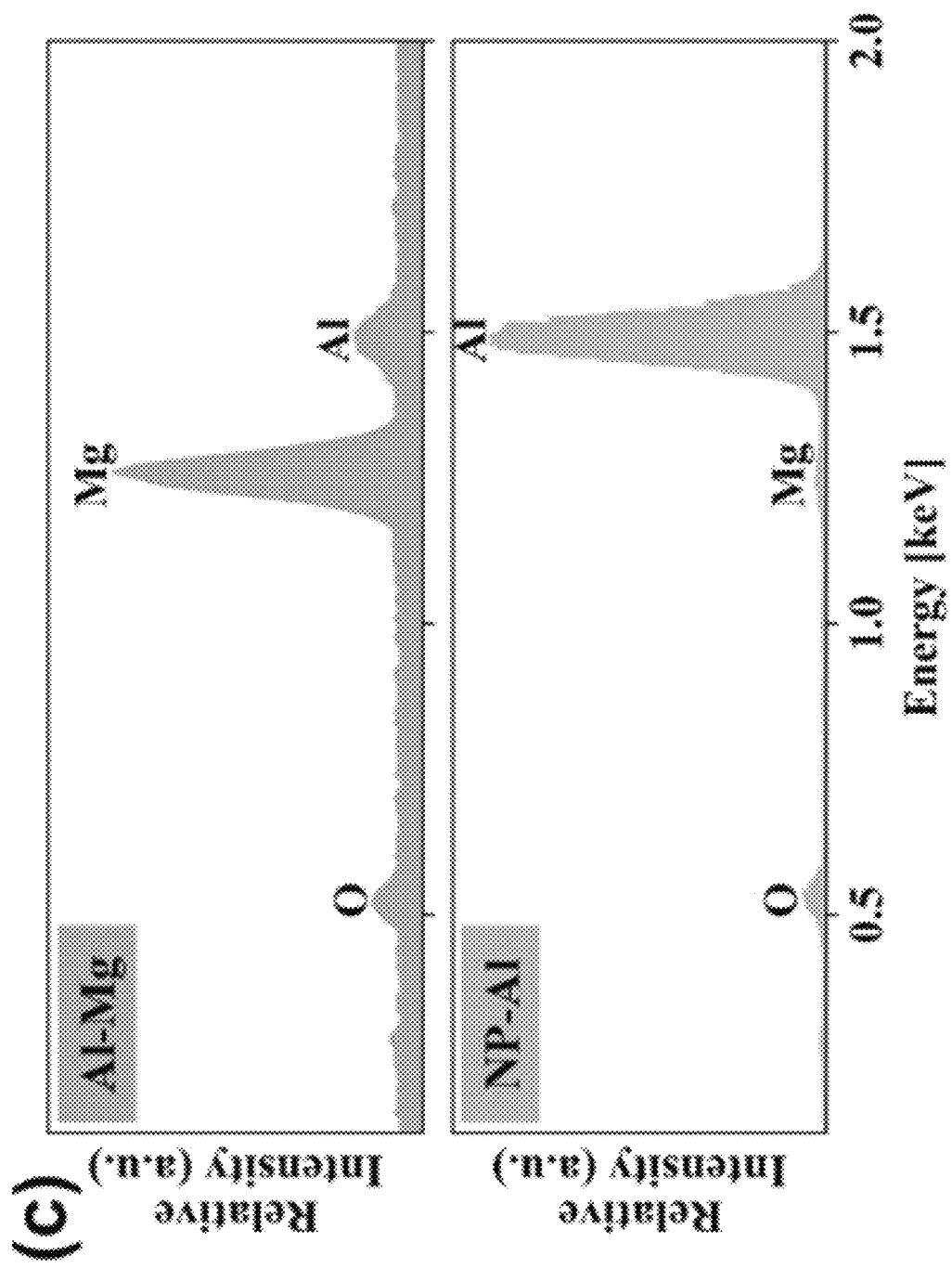

The fabricated parent alloy was further characterized by XRD to confirm the presence of these two phases. The green curve in FIG. 10B represents the typical XRD pattern of the Al—Mg parent alloy. All the diffraction peaks from this pattern match the hexagonal Mg metal (P63/mmc) with PDF reference card number 00-004-0770 as depicted by the blue stick pattern in FIG. 10B, and the cubic $Al_{12}Mg_{17}$ (I-43m) with PDF reference card number 01-073-1148 as depicted by the purple stick pattern in FIG. 10B. Finally, the real chemical composition of the fabricated Al—Mg parent alloy with nominal composition $Al_{30}Mg_{70}$ at. % was investigated by EDS and ICP. The green EDS spectrum in FIG. 1C shows the typical elemental composition of this alloy. Al and Mg signals are observed as expected. Quantitatively, EDS data suggests that the alloy composition is $Al_{24}Mg_{76}$ at. %, which corresponds to a hypoeutectic composition.

The small oxygen signal observed on the EDS spectrum of the parent alloy can be attributed to the native oxide formed upon reaction of Mg and Al with air. Because the interaction volume sampled by the electron beam is relatively shallow in EDS, the chemical composition obtained from EDS is more a representation of the near-surface composition. Therefore, ICP was used to determine the bulk composition of the alloy, which was found to be ~$Al_{37}Mg_{63}$ at. % (i.e. hypereutectic composition). Both EDS and ICP data are summarized in Table 1 below.

TABLE 1

ICP and EDS elemental composition analysis of the Al—Mg parent alloy before and after dealloying; the samples before and after dealloying were dissolved in a mixture of $HNO_3$ and HCl for ICP analysis.

| | | Al (at. %) | Mg (at. %) |
|---|---|---|---|
| Before dealloying | ICP* | 36.6 | 63.4 |
| | EDS | 24 | 76 |
| After dealloying | ICP* | 94.3 | 5.7 |
| | EDS | 98 | 2 |

Hierarchical Nanoporous Al

This section describes fabrication of hierarchical nanoporous Al with ultrafine ligament/pore structures using a novel air-free electrolytic dealloying route in non-aqueous electrolytes. Although a wide range of nanoporous metals and nanoporous metalloids have been fabricated using the conventional chemical and electrolytic dealloying route in "aqueous" electrolytes, these aqueous electrolytes are not suitable for the fabrication reactive nanoporous metals (such as nanoporous Al) because ionic species including H+ and OH– present in aqueous electrolytes will spontaneously react with Al.

To overcome the limitations of existing approaches, provided here is a novel air-free non-aqueous electrolytic dealloying method. In this approach, the working ion in the non-aqueous electrolyte (e.g., $Mg^{2+}$) is the same nature as the sacrificial element (e.g., Mg) in the parent alloy (e.g., Al—Mg). In such a configuration, one can electrochemically remove Mg from the starting Al—Mg alloy and plate it onto the counter electrode, resulting in the recovery of the sacrificial element during selective leaching. Such a recovery of the sacrificial material is not possible during dealloying by galvanic replacement, or during conventional dealloying in aqueous electrolyte where the sacrificial element is not the same nature as the working ion.

As an exemplary embodiment, an electrolytic cell configuration comprises a float cell with the Al—Mg parent alloy used as the working electrode, a pure Mg foil used as the counter and reference electrodes, and a 0.4 M all-phenyl complex (APC) electrolyte used as Mg-ion conducting electrolyte.

The selective leaching process was carried out under inert atmosphere in an argon-filled MBraun™ glovebox with $H_2O$ and $O_2$ content below 0.1 ppm. All the experiments were performed at room temperature under ambient pressure in the glovebox. (The use of argon as inert gas in the glovebox is not critical; other environments, e.g., nitrogen) could be used as well. Furthermore, a glovebox itself is not required to carry out this electrolytic dealloying, as a cell (e.g., FIG. 8E) can also be used.

Figure 11A:
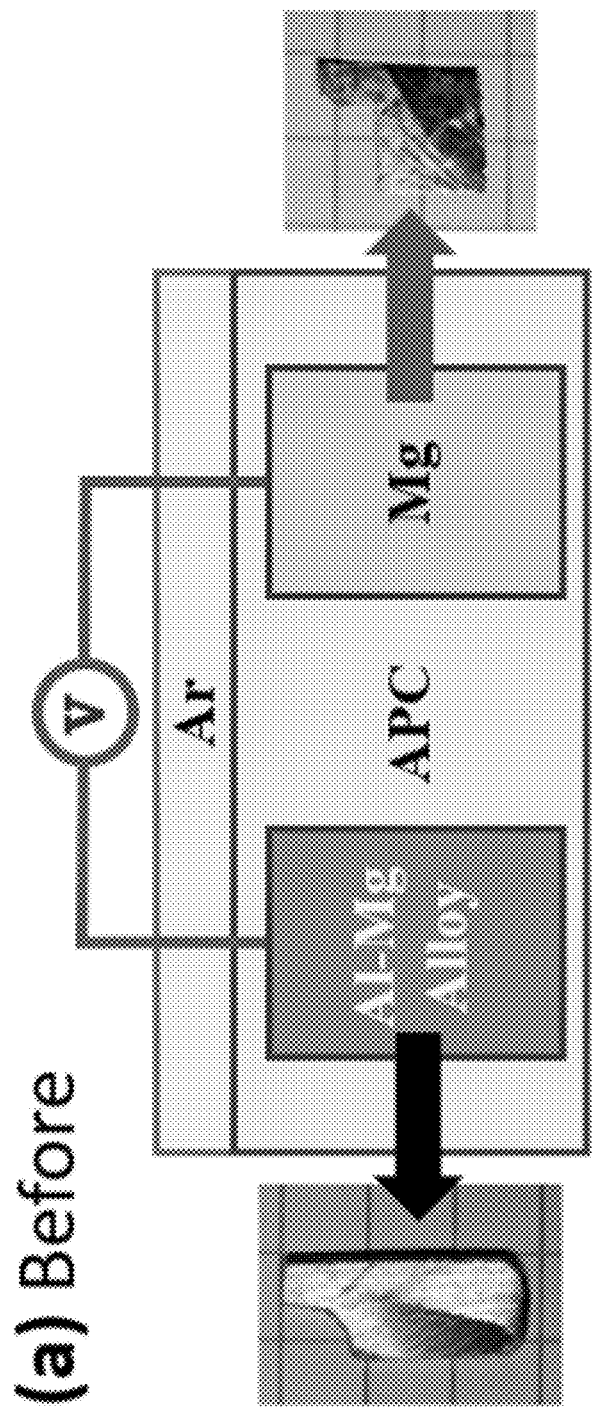
FIG. 11 provides (panel a) a schematic of the electrolytic cell setup before dealloying. The cell contains an Al—Mg parent alloy used as the working electrode and Mg foil used as counter and reference electrodes in APC electrolyte. The cell operates is an argon environment, and (panel b) corresponding schematic of the electrolytic cell after dealloying. The starting Al—Mg working electrode is converted into nanoporous Al. Meanwhile Mg removed from this parent alloy is plated onto the Mg foil counter electrode, and (panel c) exemplary XRD data of stripped Mg recovered on the counter electrode after dealloying.

Mg was selectively removed from the Al—Mg parent alloy using electrolytic dealloying under potentiostatic control. During potentiostatic controlled electrolytic dealloying, a constant voltage is maintained between the working and reference electrodes in order to dissolve Mg, and the corresponding Mg dissolution current between the working and counter electrodes is measured. FIG. 11A shows the typical electrolytic cell configuration before dealloying. A starting bulk piece of Al—Mg alloy with geometrical size in the centimeter range was used as working electrode and a Mg foil of similar size was used as counter and reference electrodes.

Figure 11B:
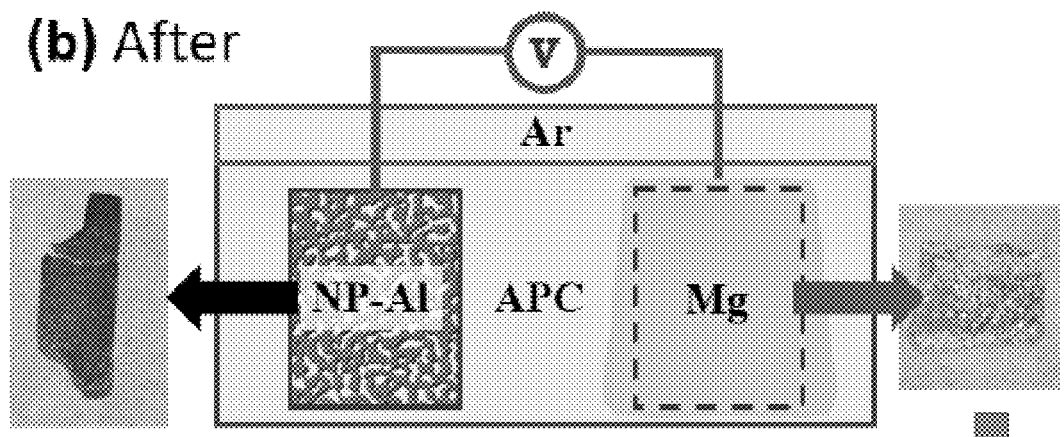

FIG. 11B shows the cell configuration after dealloying, as well as the fabricated bulk piece of nanoporous Al. The dealloyed nanoporous Al was broken into two pieces to demonstrate its brittleness, which is a common property of dealloyed nanoporous metals. The Mg foil counter electrode after dealloying is also shown in FIG. 11B.

It can be seen that the surface of this Mg foil, which was initially smooth and dull before dealloying (see FIG. 11A) has become rough and shiny after dealloying. This is a result of the Mg plating process which occurs during selective leaching. To verify the chemical nature of the plated Mg, it was scraped from the counter electrode, collected in the powder form and melted into a monolithic piece for characterization by XRD (FIG. 11C) and EDS. Both characterization methods confirm the formation of high purity Mg.

Figure 12:
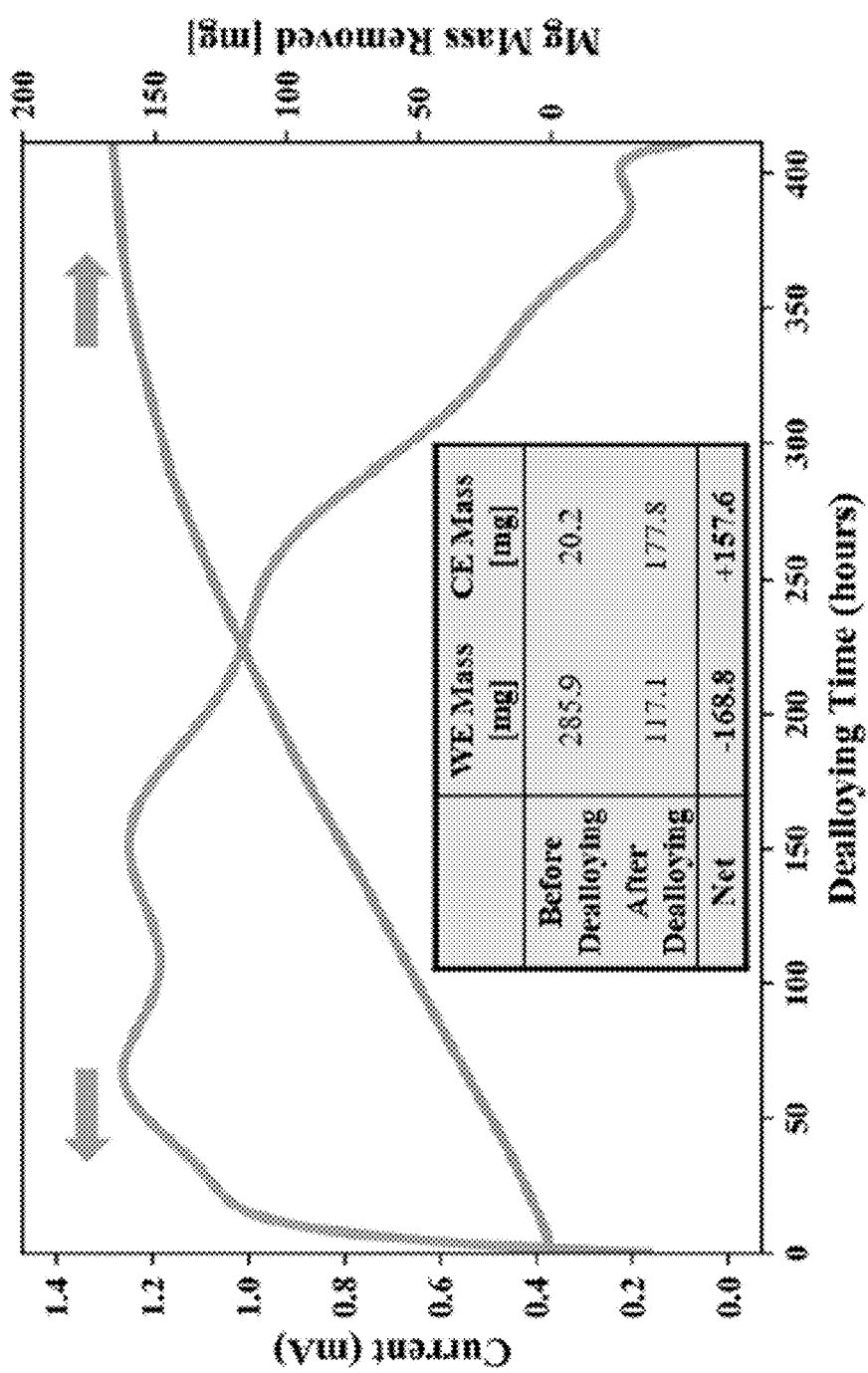
FIG. 12 provides an exemplary cell current profile associated with electrolytic dealloying at a constant potential of 450 mV vs Mg/Mg2+ (green, left-pointing arrow); and corresponding mass of Mg removed during dealloying (red, right-pointing arrow). Summary of gravimetric electrode data (inset table).

The green (left-hand arrow) line in FIG. 12 represents a typical current profile as a function of time associated with Mg removal from the Al—Mg working electrode and plating it onto the Mg foil counter electrode with a constant potential of 450 mV versus $Mg/Mg^{2+}$. By integrating this current with respect to time, the total (cumulative) electric charge transferred during dealloying can be calculated. Faraday's laws of electrolysis were then used to convert this cumulative charge into the mass of Mg removed from the starting Al—Mg working electrode, and plated on the Mg counter electrode during dealloying as shown by the red (right-hand arrow) curve in FIG. 12. The electrolytic dealloying process was finished when the mass of Mg from the starting Al—Mg alloy was comparable to the mass of Mg calculated using the Faraday's laws of electrolysis. The inset table in FIG. 12 contains these gravimetric data for the working and counter electrodes before and after dealloying.

It can be seen that the decrease in mass of the starting Al—Mg working electrode after dealloying is comparable to the increase in mass of the Mg foil counter electrode. These gravimetric data further shows that Mg removed from the working electrode can be efficiently collected on the counter electrode. This Mg could be re-used to fabricate new Al—Mg parent alloy, which makes this novel dealloying process sustainable. Note that while a thick (~4 mm) working electrode was used in FIG. 12 to demonstrate how robust nanostructured bulk materials can be produced using this method, thinner electrodes can be used to significantly decrease dealloying time. Typically, samples with thickness in the range of few micrometers can be dealloyed in about 45 hours irrespective of the lateral dimensions of these samples. The lateral dimension dimensions of the sample does not affect the dealloying time. In some embodiments, at least one dimension of the sample can be in the range of a few micrometers.

Figure 8A:
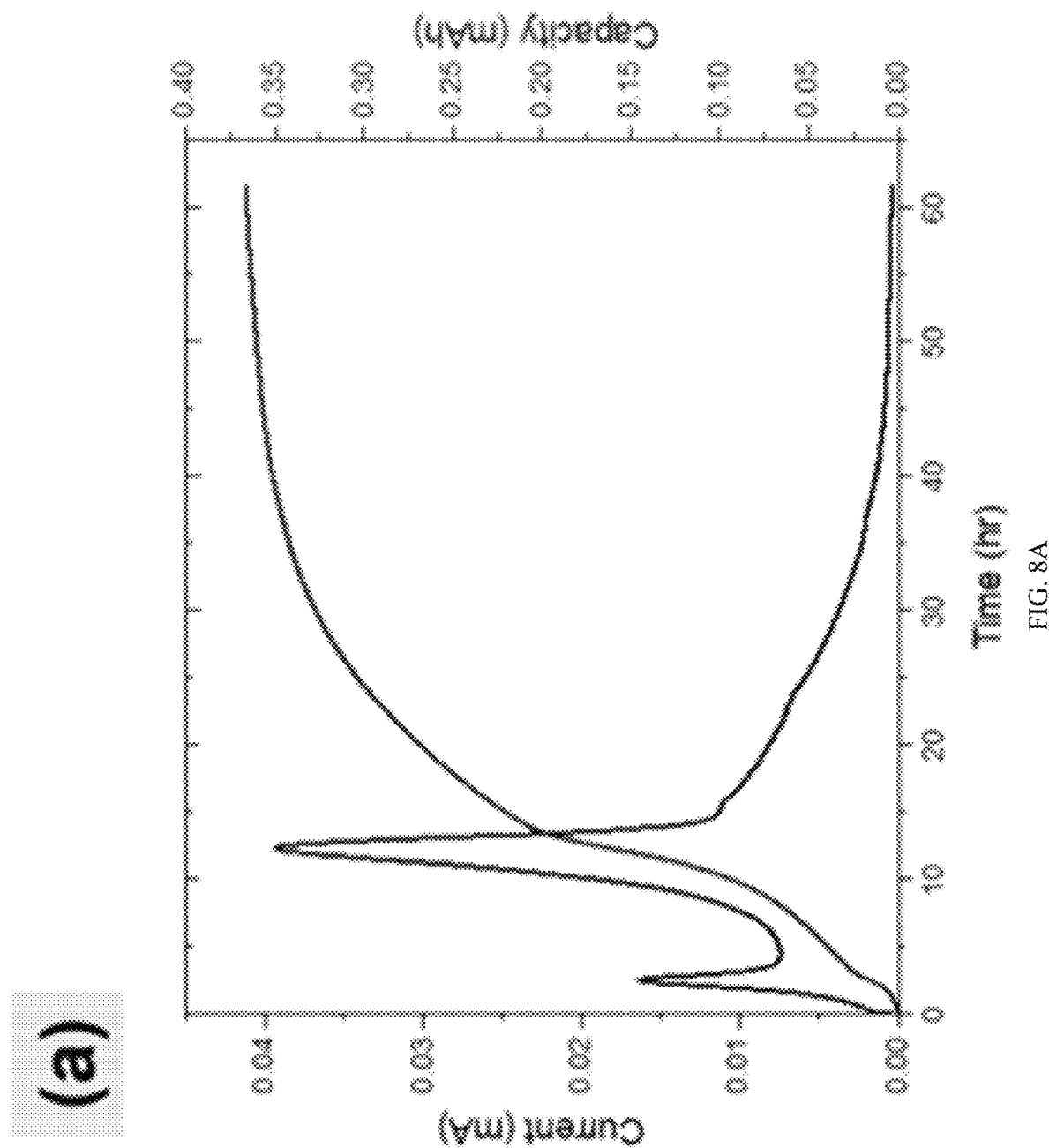
FIG. 8 provides (panel a) electrochemical data showing that thinner samples are dealloying in about 45 hours, (panel b) illustrations showing that the electrode thickness can influence dealloying. Typically, the two working electrodes in panel b and panel c will be dealloyed in about the same time because they have the same thickness, although they do not have the same lateral dimensions. Panel d and panel e provide a setup used to scale up the dealloying process. Al—Mg parent materials in the powder form is used as the working electrode in increase the dealloying rate.
Figure 8B:
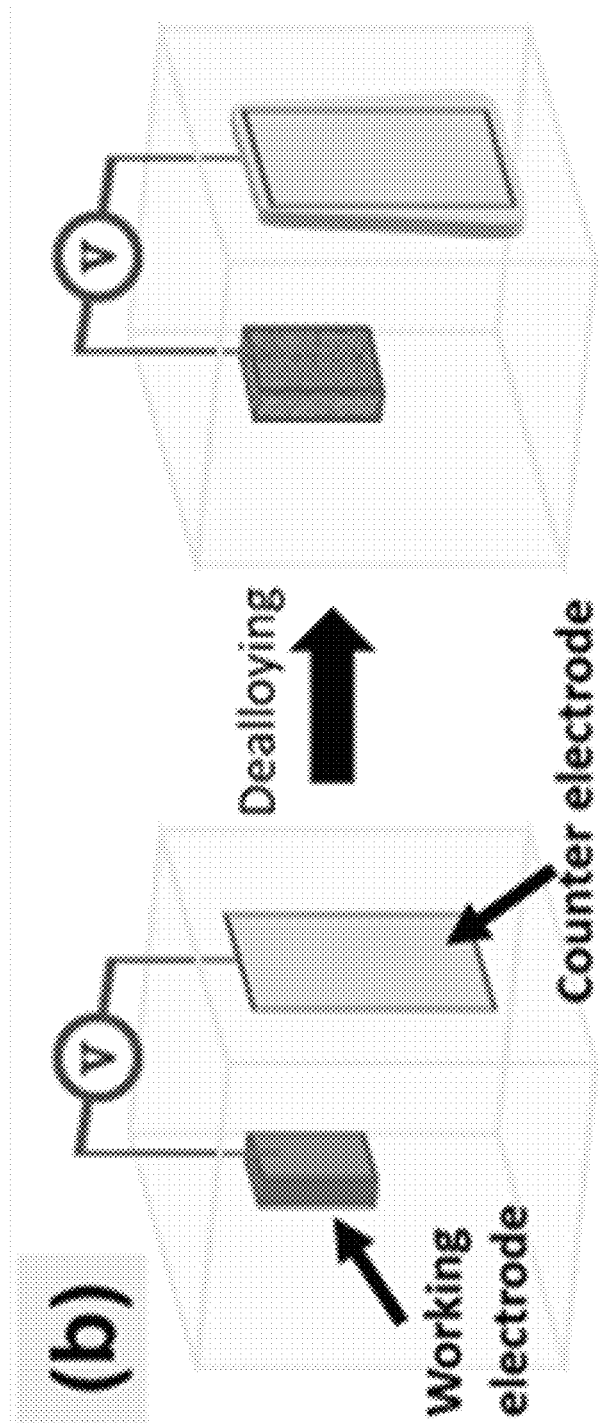
Figure 8C:
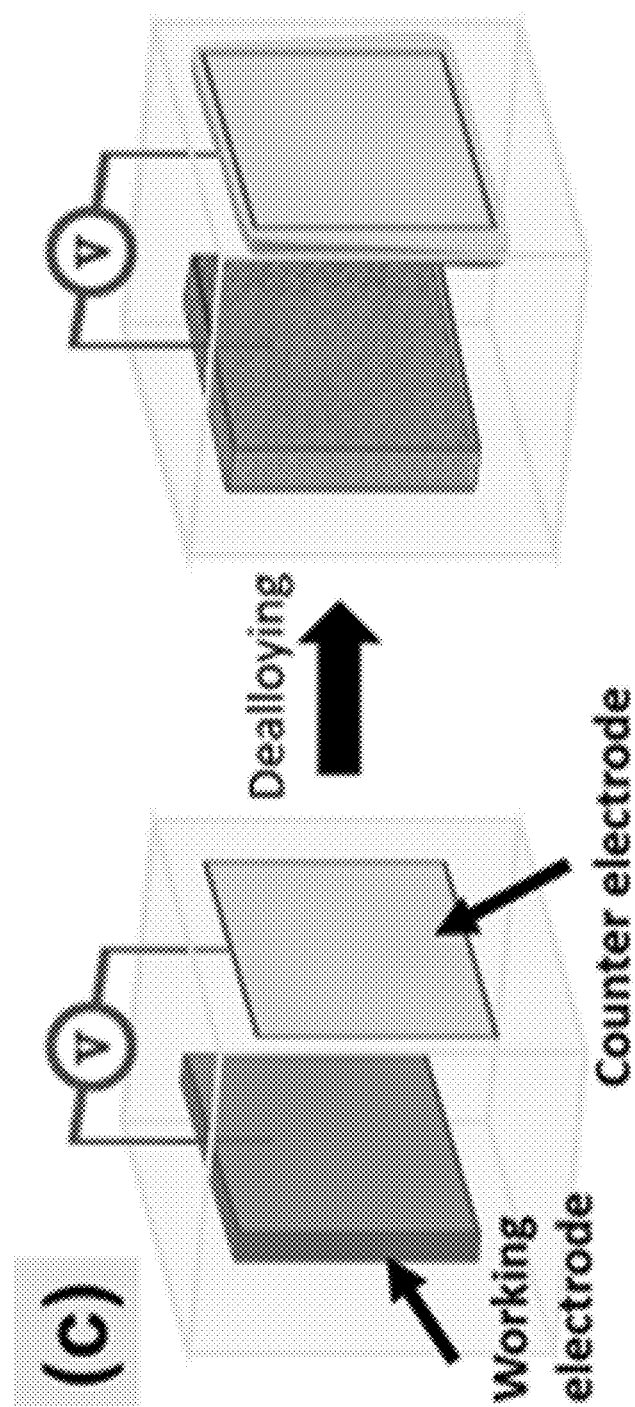
Figures 8D, 8E:
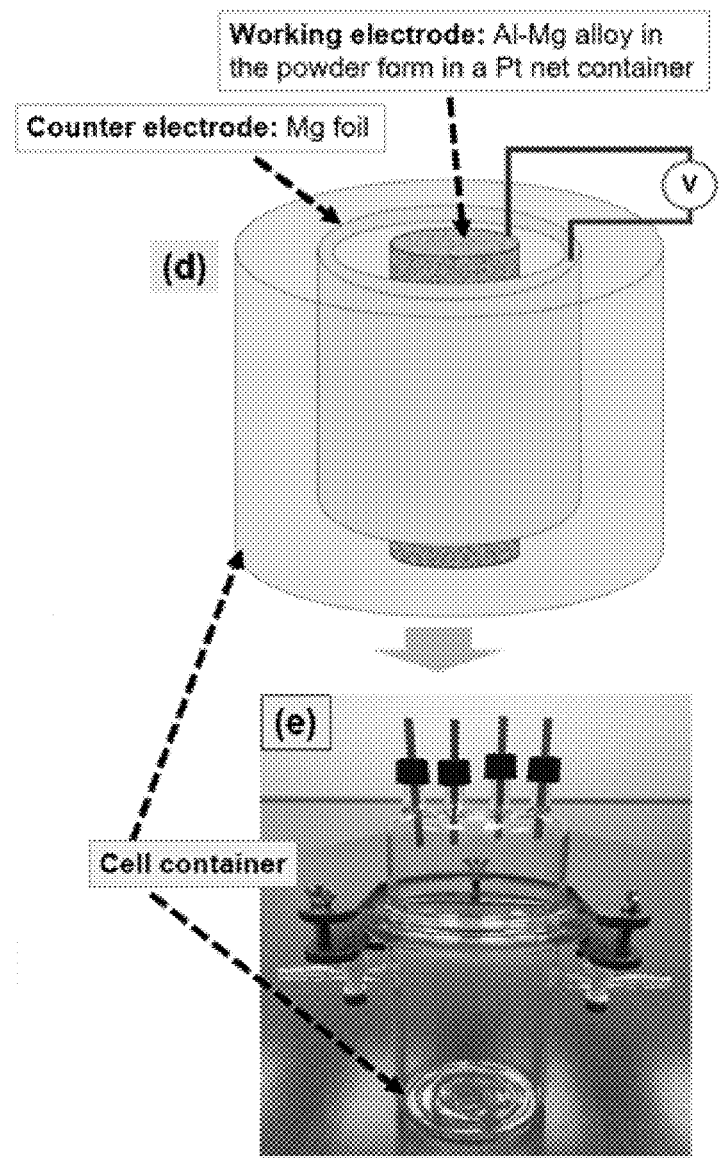
Figure 9A:
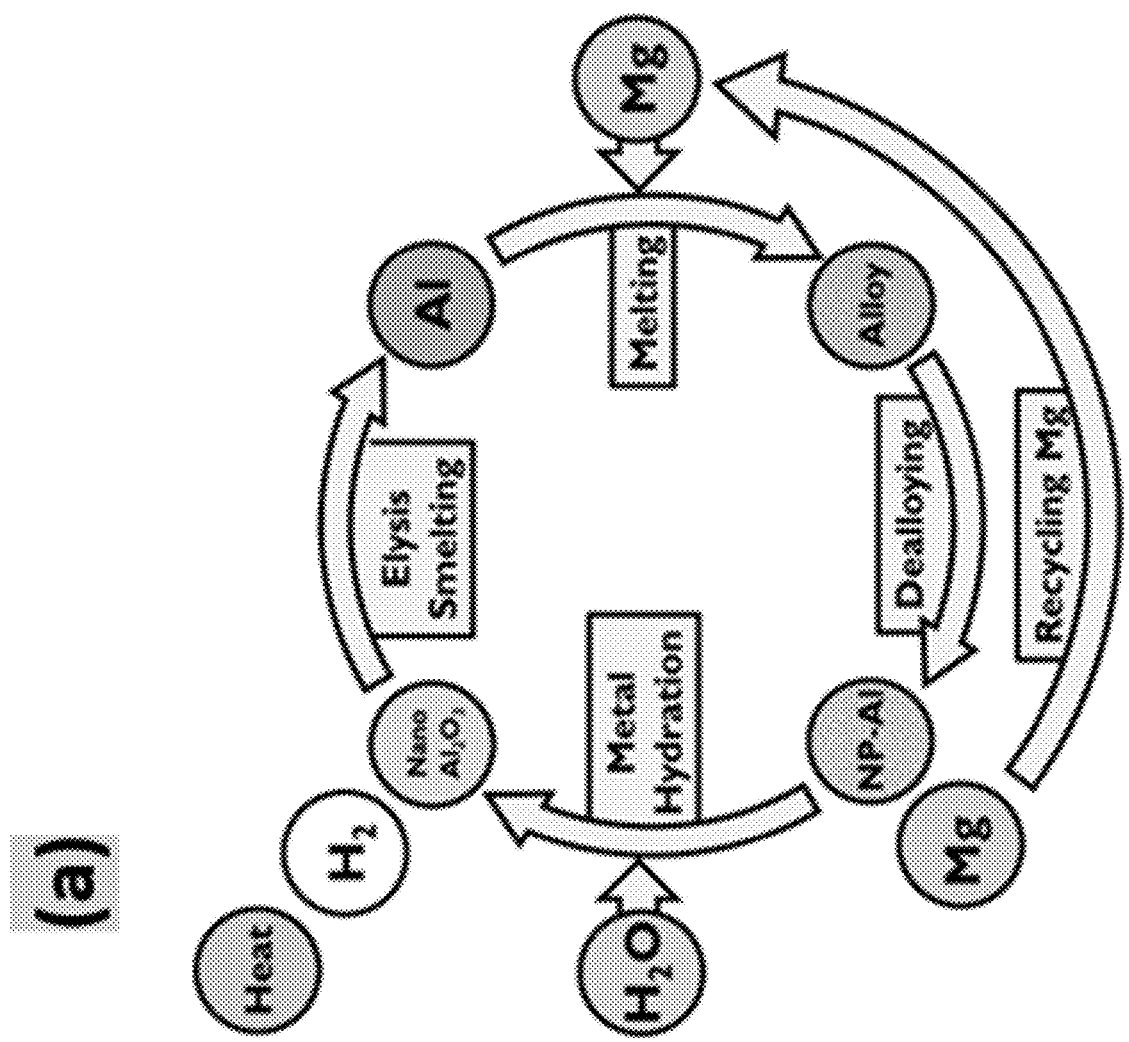
FIG. 9 provides (panel a) a diagram of the disclosed melting, dealloying and hydrolysis processes, and (panel b) a schematic of electrochemical cell before (upper image) and after (lower image) dealloying with images of electrodes.
Figure 9B:
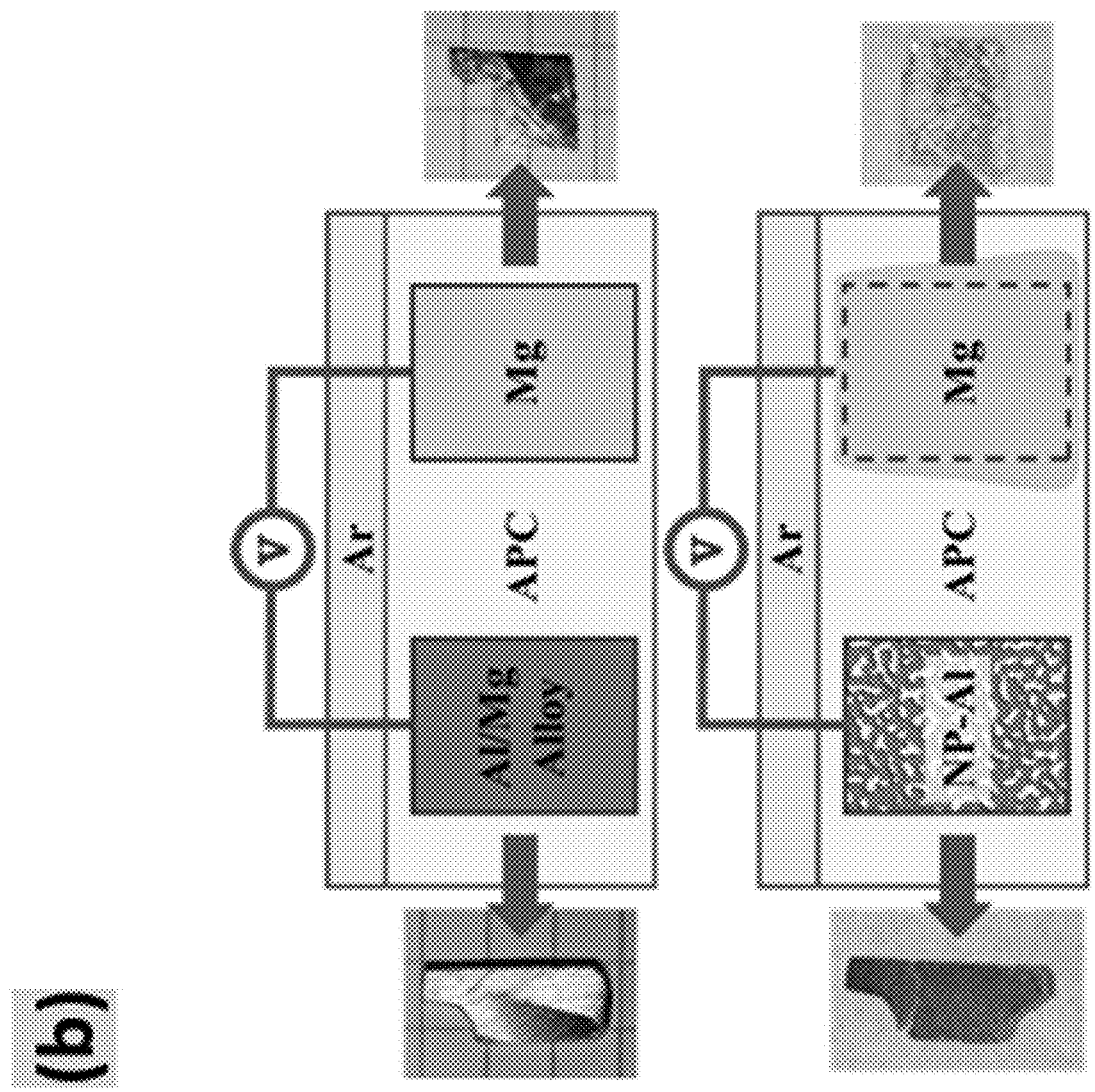

One can use Al—Mg parent materials in powder form in combination with the setup schematized in FIG. 8D and FIG. 8E to scale up this synthesis. Dealloyed nanoporous Al was characterized by XRD, EDS, ICP, SEM and TEM. The material was sealed in Kapton tape prior to XRD characterization in order to prevent it from reacting with air.

Figure 11C:
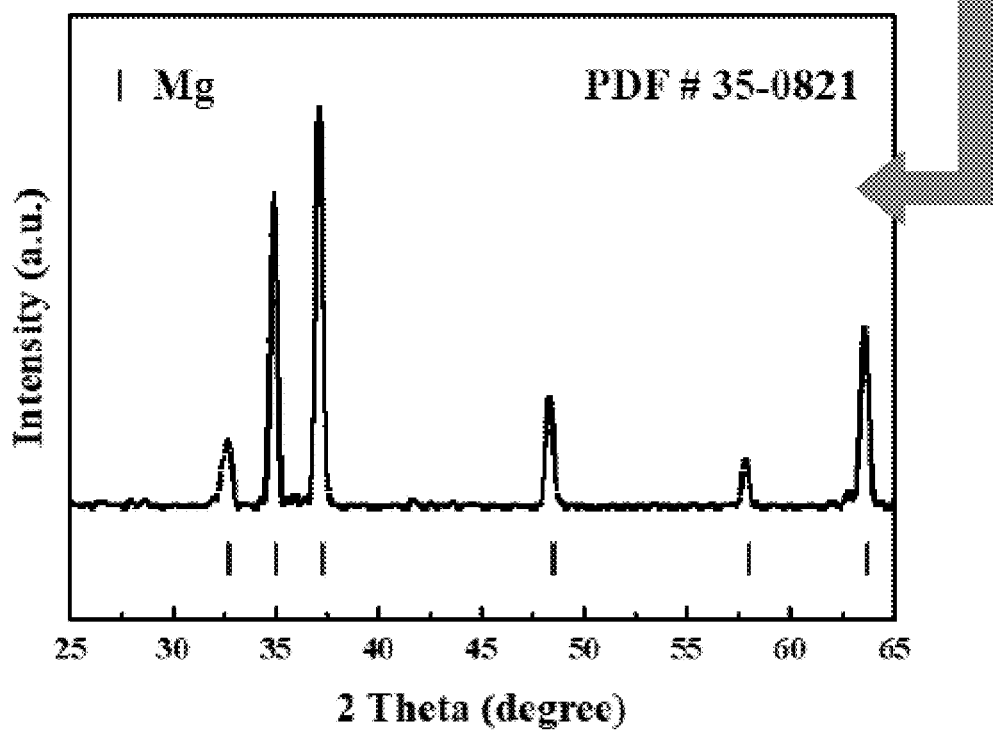

The orange pattern in FIG. 10B represents the typical XRD pattern of the nanoporous Al after dealloying. All the diffraction peaks in this pattern match with Al metal (PDF reference card number 01-085-1327) as depicted by the red stick pattern in FIG. 10B. Also, the orange (lower) EDS spectrum in FIG. 11C shows the typical elemental composition of the nanoporous Al after dealloying. It is seen that the dominant Mg peak in the Al—Mg parent alloy before dealloying (upper, green EDS spectrum in FIG. 11C) almost entirely vanishes after dealloying (upper ,orange EDS spectrum in FIG. 11C). The content of residual Mg in nanoporous Al after dealloying was found to be 2 at. % from EDS data and 5.7 at. % from ICP data. Detailed EDS and ICP data are summarized in Table 1.

Figures 13A, 13B, 13C, 13D, 13E:
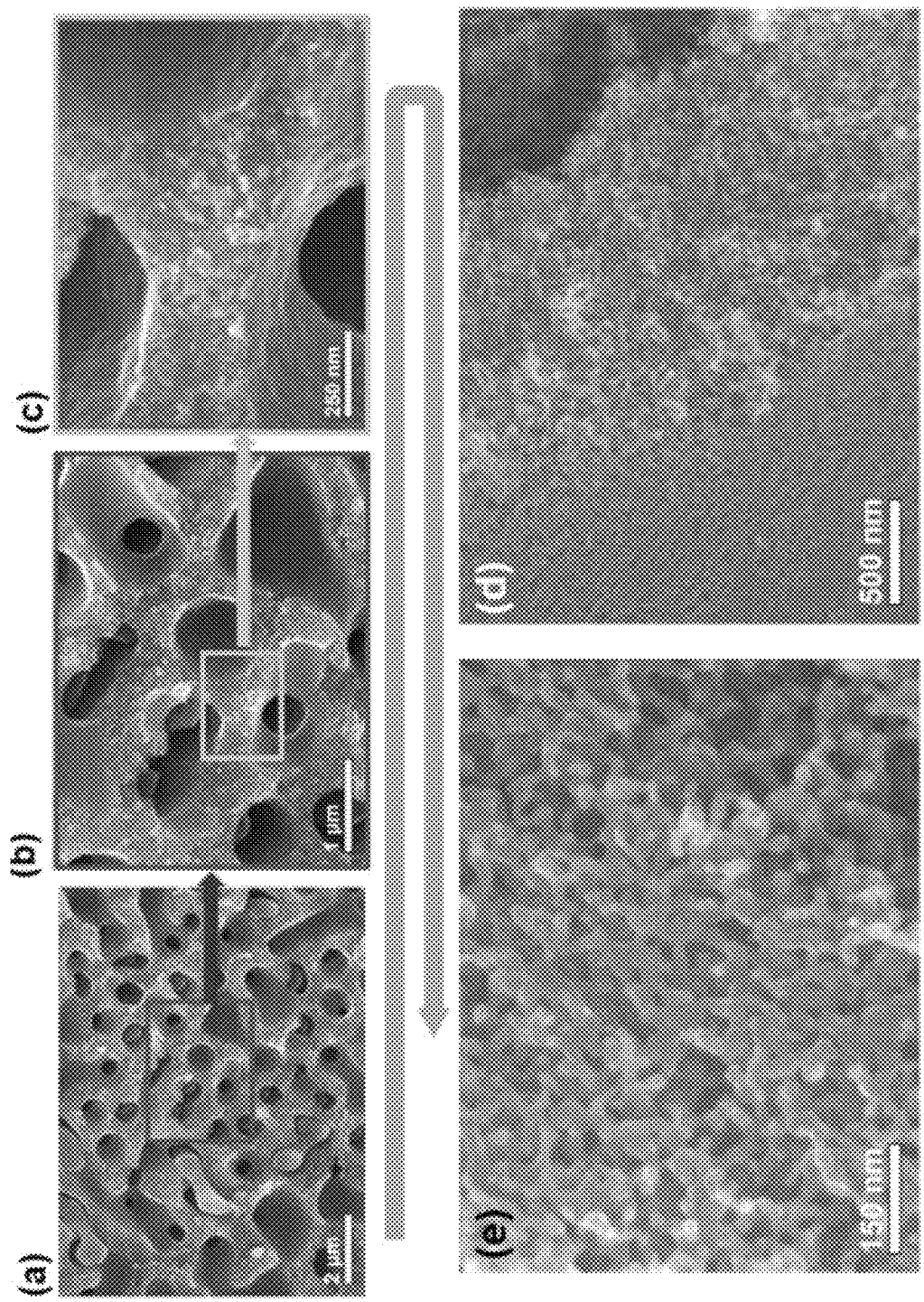
FIG. 13 provides SEM data from exemplary fabricated hierarchical nanoporous Al at various magnifications. Large macropores and macroligaments with average feature size in the range of ~0.5-1 μm are observed at low magnifications (panel a and panel b). At intermediate magnifications (panel c) and at high magnifications (panel d and panel e) it is seen that the macroligaments are made of ultrafine mesoscopic ligament/pore structures.
Figure 14A:
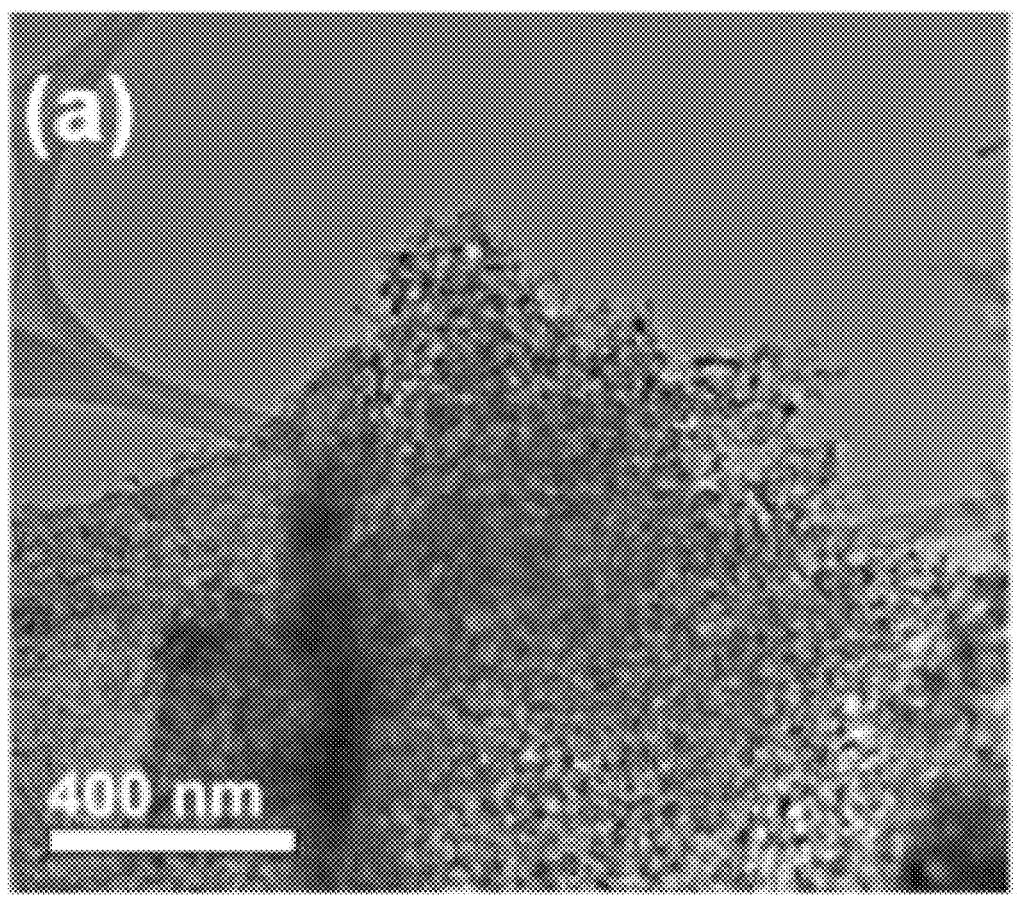
FIG. 14 TEM of nanoporous Al at various magnifications (panel a, panel b, and panel c) At low and intermediate magnifications (panel a and panel b) the material is composed of a dense network of ligaments; at high magnification (panel c), the characteristic ligaments size is in the rage of 10-20 nm.

Scanning and transmission electron micrographs of the dealloyed nanoporous Al are displayed at different magnifications in FIGS. 13 and 14, respectively.

Large macropores and macroligaments with average feature size in the range of ~0.5-1 μm are observed from SEM images at low magnifications as depicted in FIG. 13A and FIG. 13B. The large macropores come from the full dissolution of the α-Mg solid solution phase from the Al—Mg parent alloy. According to the Al—Mg equilibrium phase diagram, the maximum solubility of Al in the α-Mg phase near room temperatures is less than 2 at. %. Consequently, such a small amount of Al is etched away together with the α-Mg matrix, resulting in the large macropores and macroligaments. At intermediate (FIG. 13C) magnifications and high magnifications (FIG. 15D and FIG. 15E), it can be seen that the macroligaments are composed of ultrafine mesoscopic ligament/pore structures.

Figure 14B:
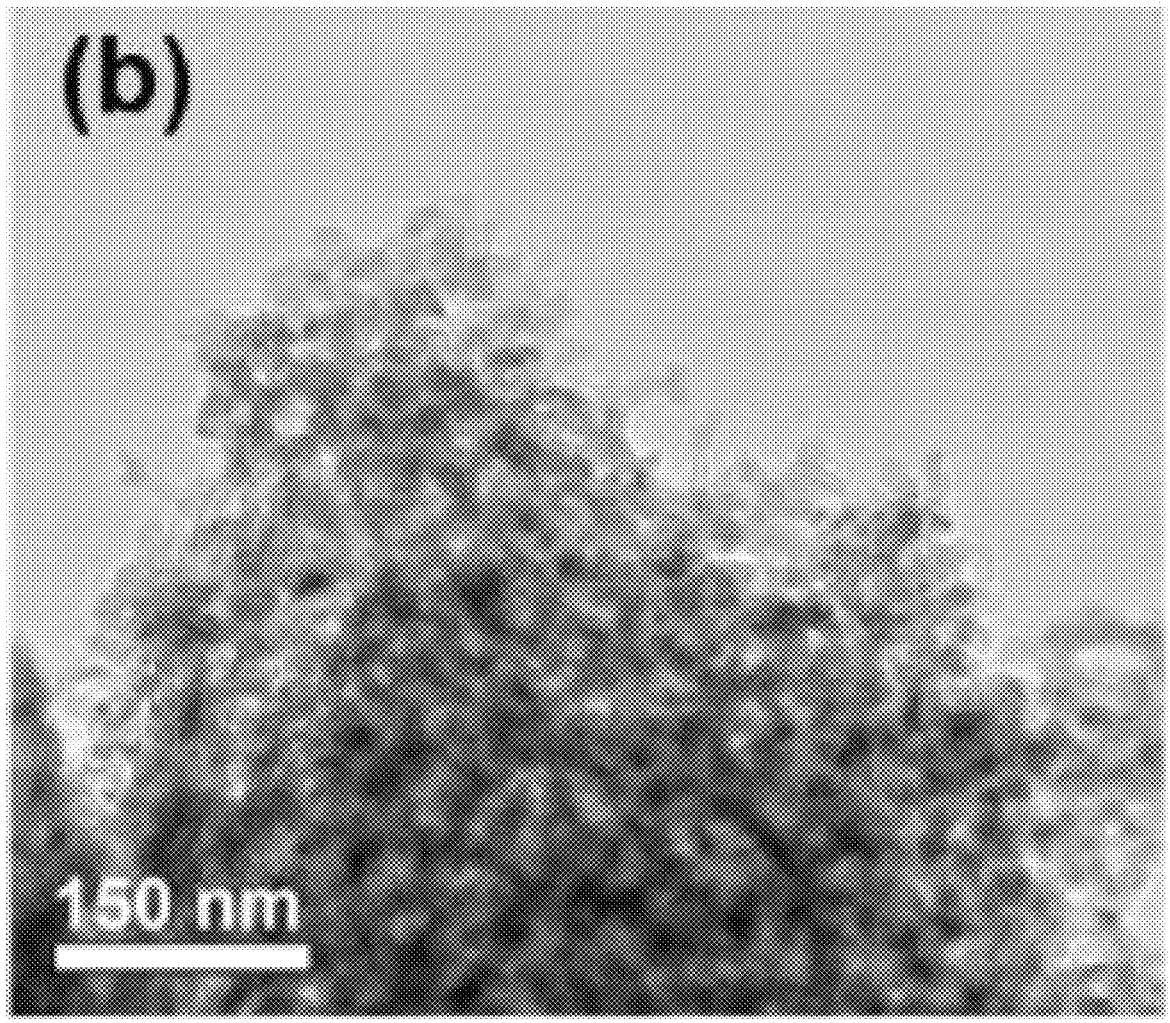
Figure 14C:
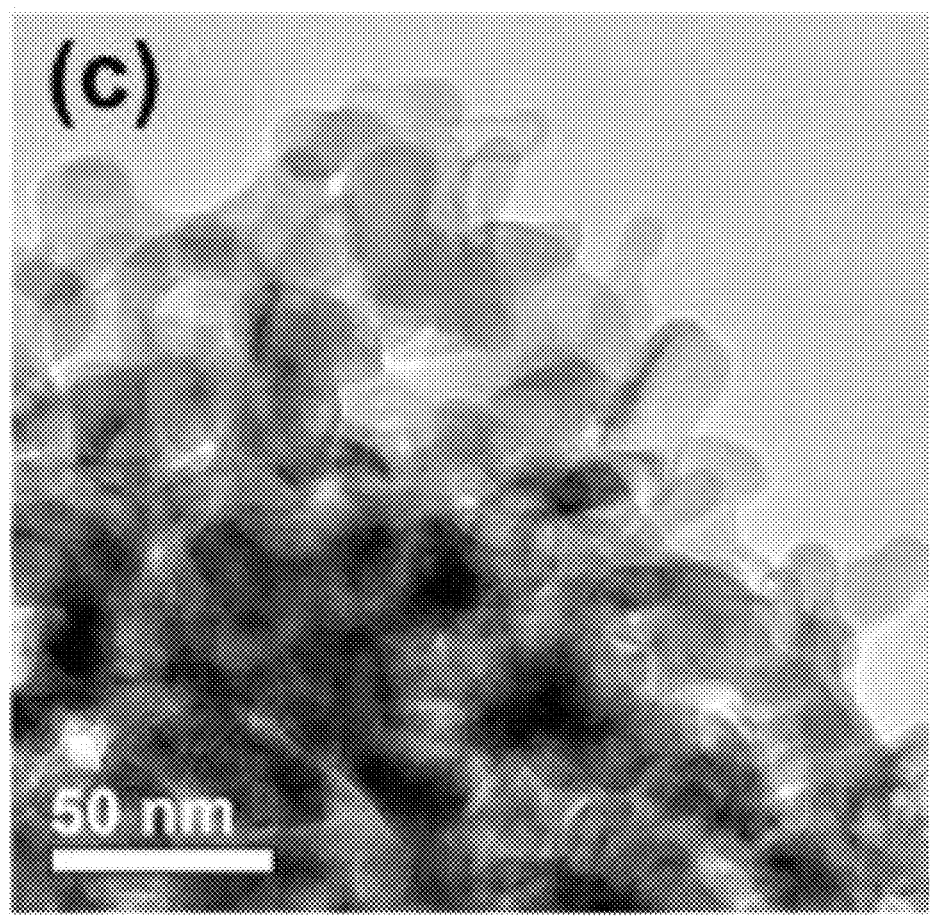

These mesoscopic structures were characterized using TEM as seen in FIGS. 14B and 14C; the average ligament size was found to be in the range 10-20 nm. The small nanoscale pores come from the selective dissolution of Mg from the $\beta$-$Al_{12}Mg_{17}$ phase.

Figure 15A:
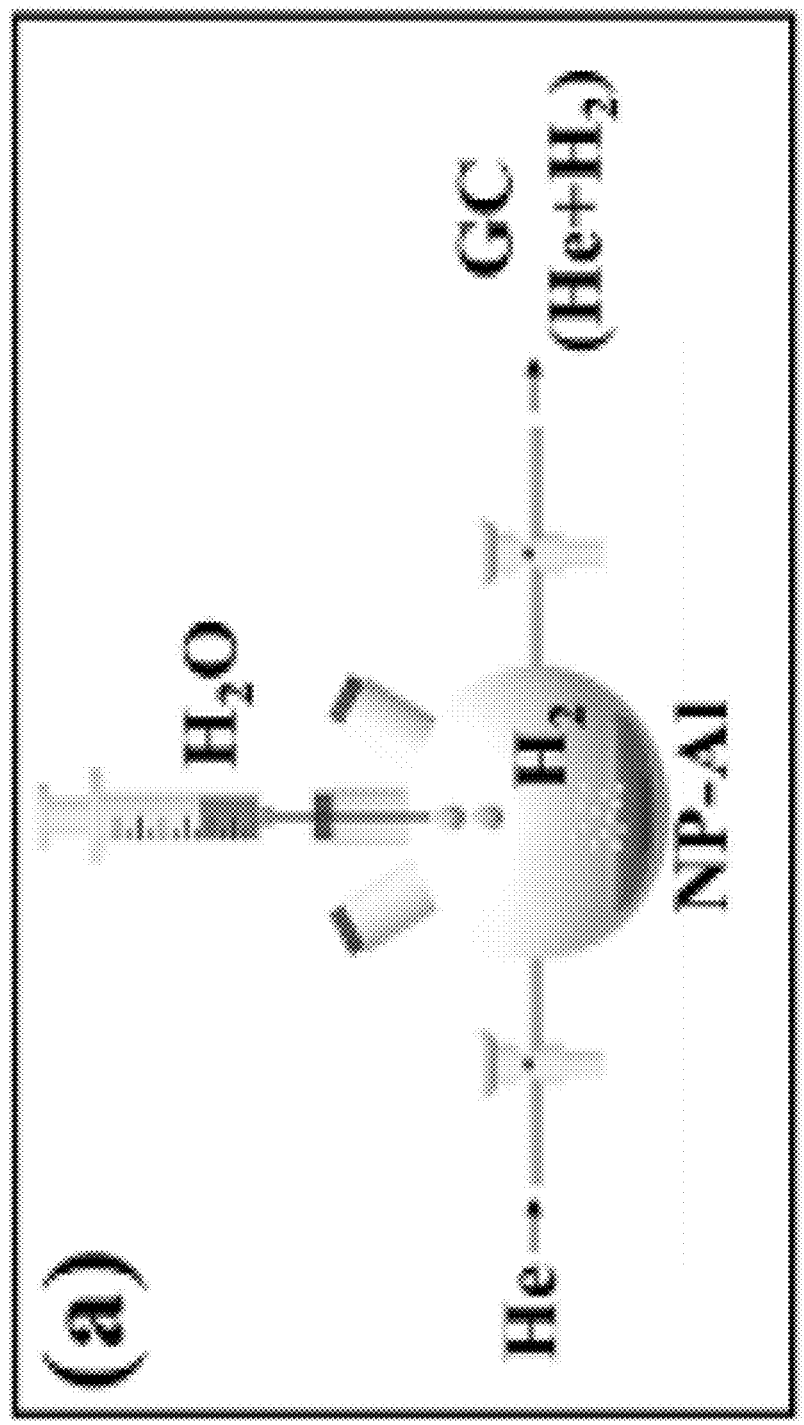
FIG. 15 provides (panel a) a schematic of the setup for hydrogen measurement during GC experiments; (panel b) exemplary raw GC data associated with the amount of hydrogen produced 30, 185, and 380 minutes after injection of water, respectively; and (panel c) cumulative amount of hydrogen produced after 22 hours.

Hydrogen Generation by Hydrolysis of Hierarchical Nanoporous Al in Water for On-Board Applications
In Situ Gas Chromatography Study of Hydrogen Generation by Hydrolysis of Hierarchical Nanoporous Al in Water The amount and rate of hydrogen generation through Eq. 1 involving the reaction of the fabricated hierarchical bulk nanoporous Al with deionized water was quantitatively investigated using a customized Scion 456 gas chromatography (GC) system. The schematic setup for hydrogen measurement is shown in FIG. 15A. In order to prevent rapid oxidation in air, the piece of bulk nanoporous Al used for hydrogen generation was brought in the reaction flask inside an argon-filled glovebox, and the flask was sealed before taking it outside the glovebox for GC measurements. Deionized water was then injected in the reaction flask using a syringe (FIG. 15A); deionized water was used to show that the disclosed Al-water system can produce hydrogen without any additives in water.

Figure 15B:
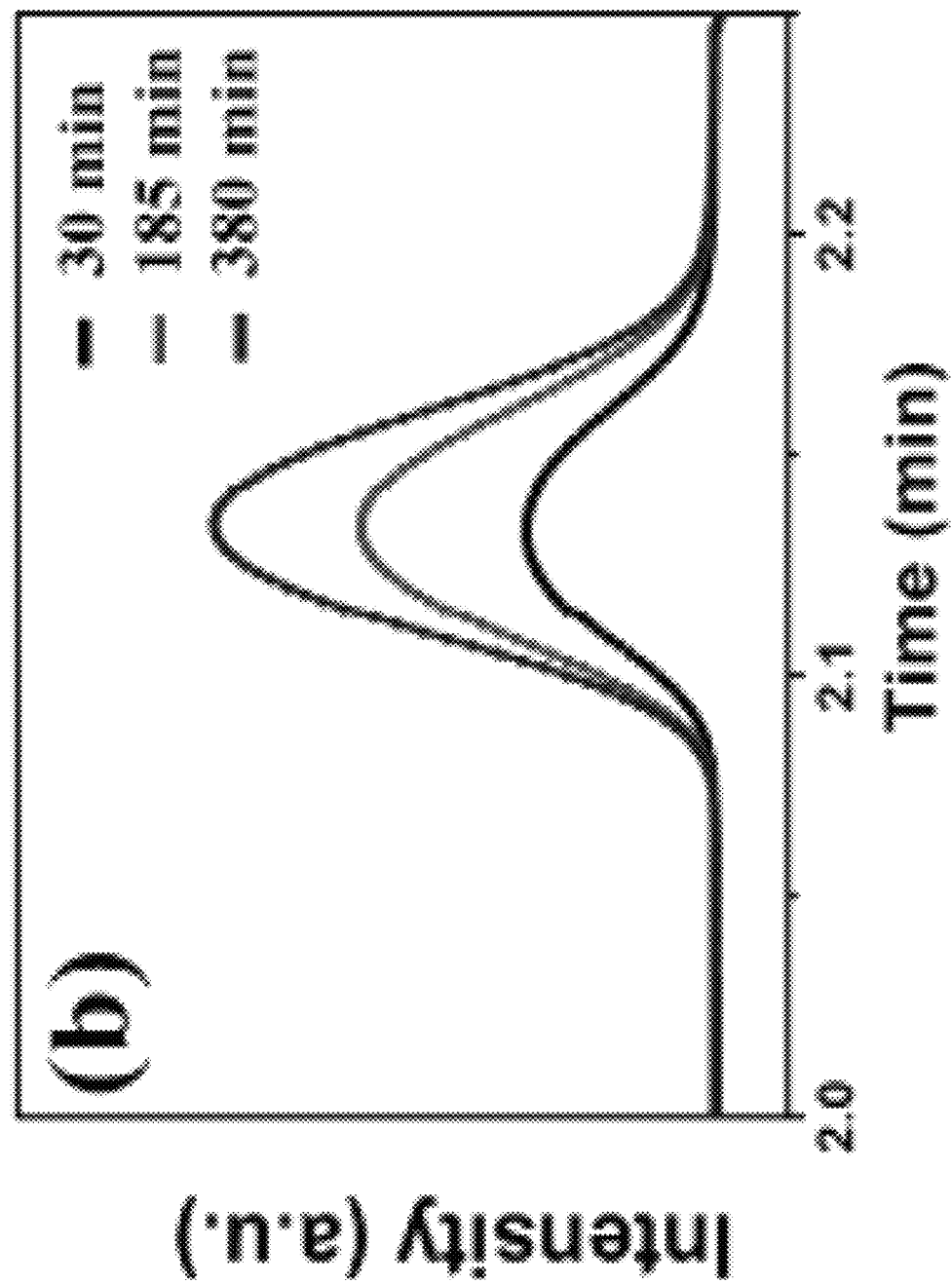

Helium was used as a carrier gas to transfer hydrogen produced from the reaction flask to the GC. The blue curves in FIG. 15B show typical raw GC data associated with the amount of hydrogen produced 30, 185, and 380 minutes after injection of water, respectively. As time increases, the cumulative amount of hydrogen generated also increases. A similar trend was previously observed during hydrolysis of hierarchical nanoporous Zn in distilled water.

Figure 15C:
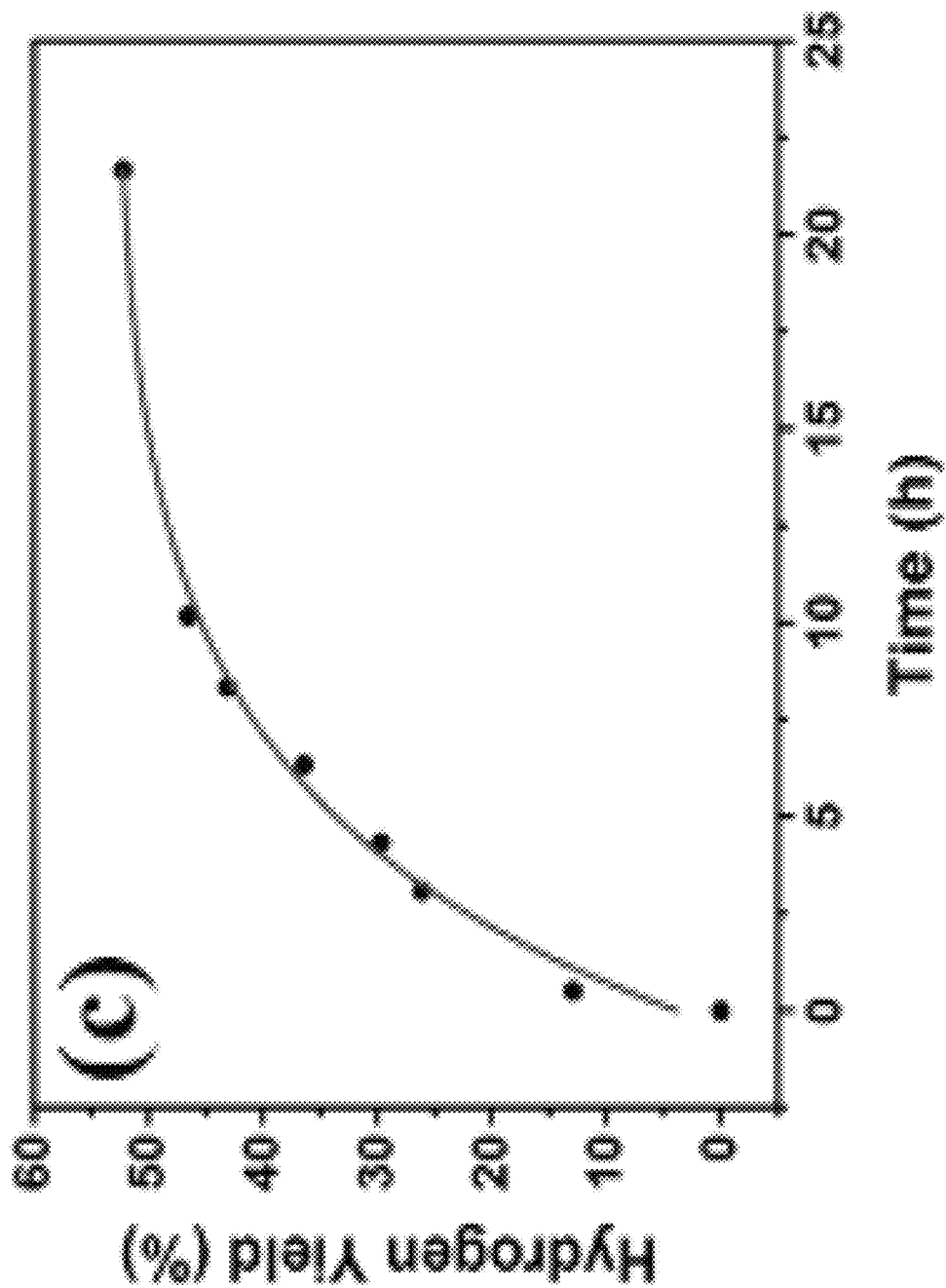

FIG. 15C shows the cumulative amount of hydrogen produced as a function of total reaction time. In the first 30 minutes, hydrogen generation rate was found to be ~0.5 mg/min per gram of nanoporous Al, which corresponds to ~5.3 mL/min per gram of Al. The average hydrogen generation rate after 10 hours was about ~1 mL/min per gram of Al. For the sake of comparison, the average hydrogen generation rate from hierarchical bulk nanoporous Zn was reported to be ~7.3 μg/min per gram of Zn, corresponding to 0.08 mL/min per gram of Zn.[22] Therefore, it can be concluded that in the first 30 minutes, hydrogen generation rate by hydrolysis of hierarchical nanoporous Al is more than 66 times faster than generating hydrogen by hydrolysis of hierarchical nanoporous Zn. After significant drop in the hydrogen generation rate of the Al-water system after ~22 hours, the hydrogen generation yield deduced from the total amount of hydrogen gas collected was found to be ~52% of the theoretical gravimetric capacity of this Al-water system (i.e. ~1.92 wt. % compared to 3.7 wt. %).

For comparison, a yield of 20% of the theoretical gravimetric capacity of the Zn-water system was achieved during hydrogen generation by hydrolysis of hierarchical nanoporous Zn in distilled water (i.e. 0.39 wt.% compared to 1.97 wt. %). This performance (i.e. faster rate, higher capacity) of hierarchical nanoporous Al can be attributed to the nearly oxide-free nature of the surface of fabricated nanoporous Al (i.e. absence of $Al_2O_3$), as clarified in the next section using XPS analysis.

Next, the reaction rate of bulk nanoporous aluminum with water to produce hydrogen was further compared with the reaction rate of other reported Al-based materials systems in literature.

Producing hydrogen from aluminum and water without any additives presents several advantages for practical applications. Data on hydrogen generation rate are shown in Table 2.

TABLE 2

Data on hydrogen generation rates.

| Material | Additive | Rate g $H_2$/s/g Material |
|---|---|---|
| Bulk nanoporous aluminum | None | $8.33 \times 10^{-6}$ |
| Ball milled and quenched activated aluminum | None | $8 \times 10^{-7}$ |
| Aluminum | $\gamma$-$Al_2O_3$ | $4 \times 10^{-6}$ |
| Aluminum at 55° C. | KCl, NaCl | $2 \times 10^{-4}$ |
| Aluminum | $Al(OH)_3$ | $3.4 \times 10^{-8}$ |
| Aluminum | 0.10M $Na_2SnO_3$ | No mass given |
| Aluminum | Ga—In. gallam (70:30), 7 wt %) | $1.9 \times 10^{-3}$ |
| Bulk nanoporous Zn | None | $1.2 \times 10^{-7}$ |

Ex Situ X-Ray Photoelectron Spectroscopy of Study of Hydrolyzed Nanoporous Al

Figure 16A:
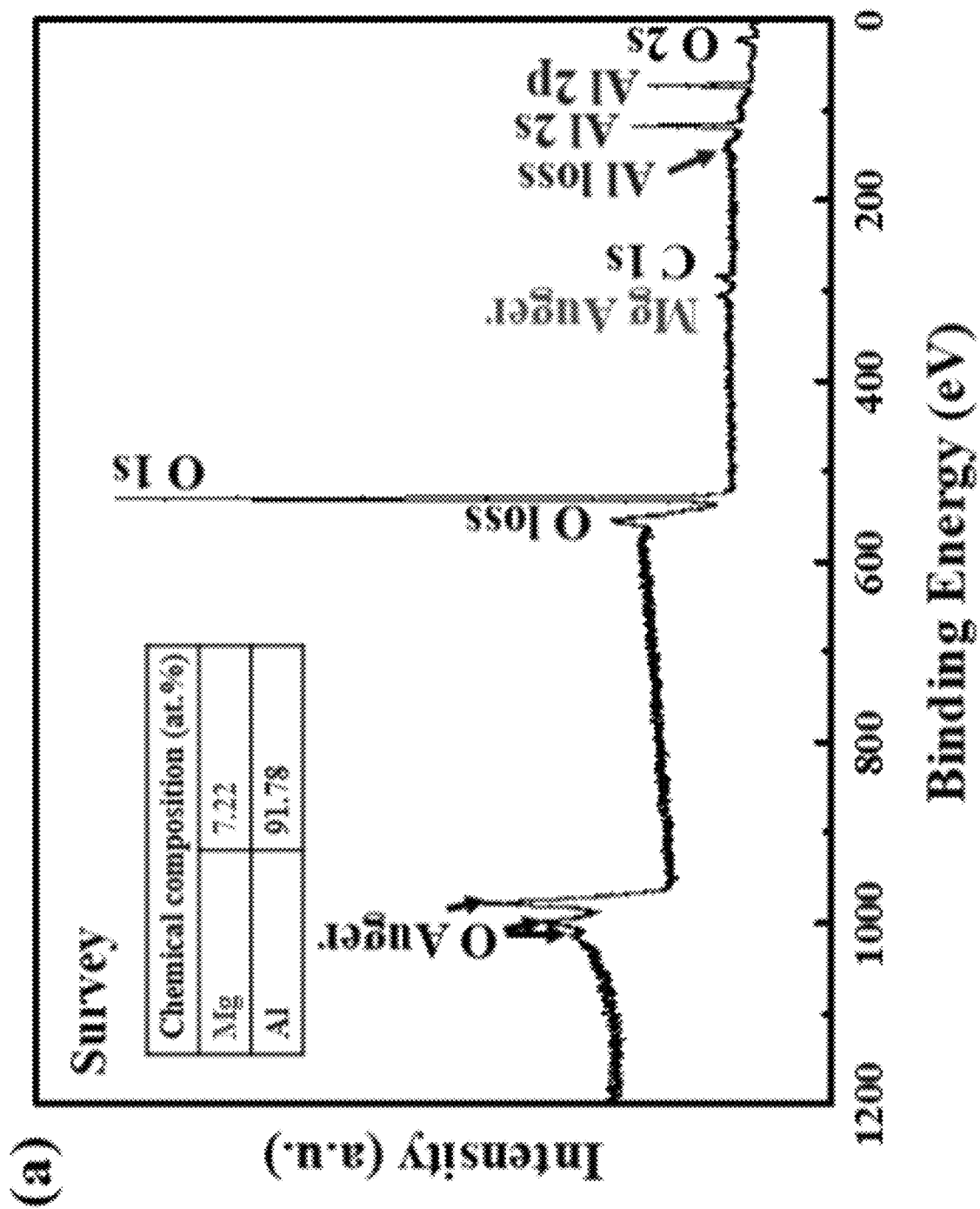
FIG. 16 provides (panel a) XPS survey spectrum of the Al(OH)3 solid by-product formed during the reaction of hierarchical nanoporous Al with water; (panel b) XPS high resolution core level spectrum of the Al 2p. The corresponding chemical composition given in the inset table.
Figure 16B:
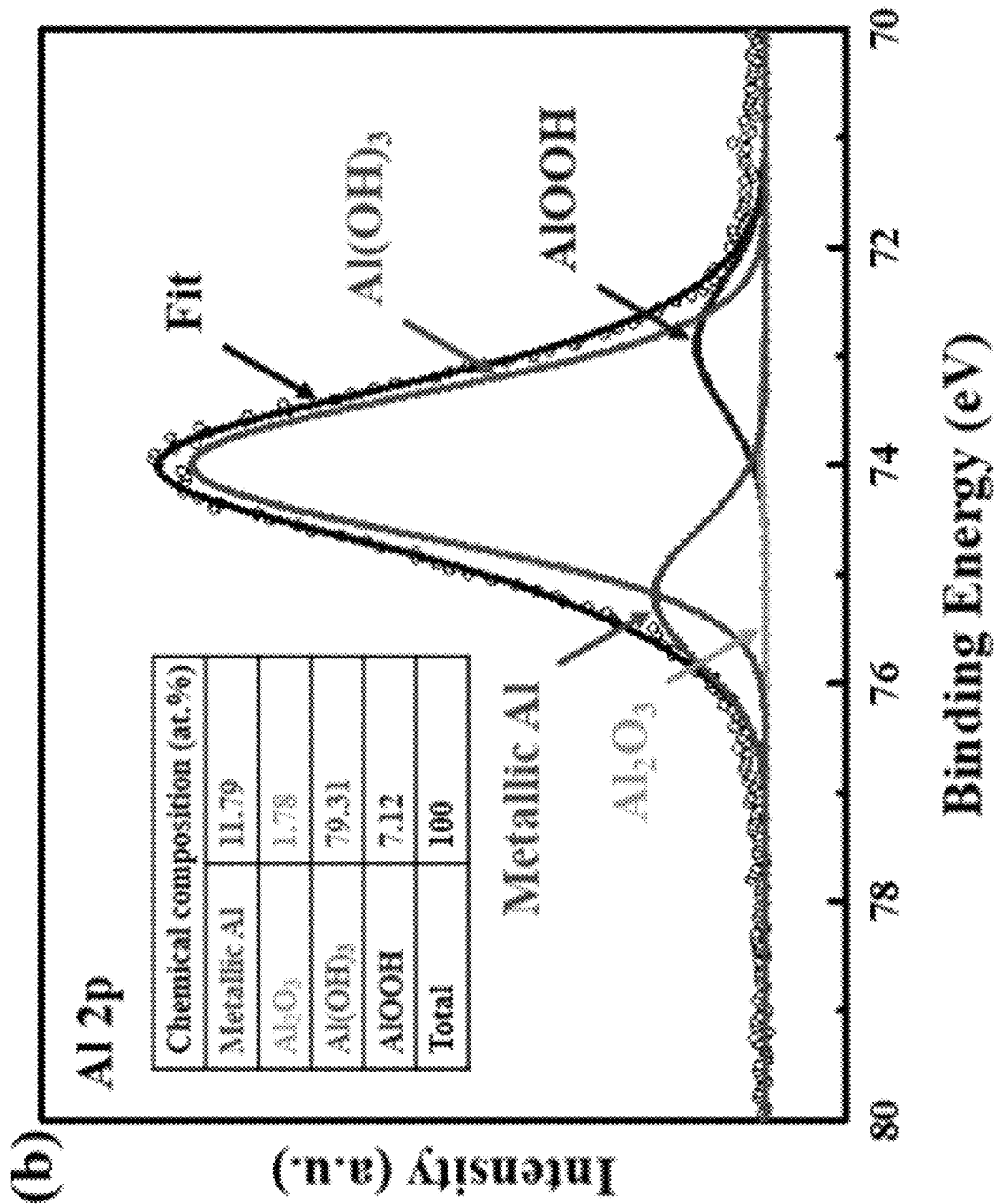

The hydrogen generation yield of ~52% reported above from GC data is an underestimated value because the hydrolysis process was stopped after 22 hours due to a significant drop in hydrogen generation rate. The sample was kept one more day in water to ensure completion of the reaction. XPS characterization was then performed to investigate the oxidation state of Al in the solid $Al(OH)_3$ by-product formed through the reaction of hierarchical nanoporous Al with water. Note that due to the relatively small penetration depth in XPS, the sample was crushed into powder prior to XPS characterization in order to expose the inert parts of the material during XPS. The XPS survey spectrum reveals obvious O and Al peaks, as shown in FIG. 16A. In addition to O and Al, a small amount of Mg (amount: 7.2 at. % compared to 91.8 at. % of Al) was detected, suggesting the presence of a tiny fraction of residual Mg in the dealloyed nanoporous Al in agreement with EDS and ICP data as discussed previously in Table 1. FIG. 16B displays a high-resolution Al 2p core level spectrum. As expected, the deconvolution of this Al 2p reveals the predominance of Al—OH peak at ~74 eV from the Al(OH)$_3$ compound.67 In addition to Al(OH)$_3$, three other Al states were identified: metallic Al peak at ~72.9 eV, Al—O peak at ~73.7 eV from Al$_2$O$_3$, and finally O=Al—OH peak at ~75.2 eV from the AlO(OH) compound.67,68

The atomic fractions of all these compounds are shown in the inset table of FIG. 16B. The fraction of Al in the form Al(OH)$_3$ was found to be 79.31 at. %, suggesting that the reaction yield during hydrolysis of Al to make hydrogen gas and Al(OH)$_3$ through Eq. 1 is at least 79.31%.

It can be seen that 11.79 at. % of metallic Al is present, indicating that the hierarchical nanoporous Al has not fully reacted with water to produce hydrogen. The presence of unreacted aluminum can be rationalized by the 10-20 nm mesoscopic ligament size distribution in this hierarchical nanoporous Al. Without being bound to any particular theory, Al for reaction with water can be sized on the order of ~7 nm. In the 10-20 nm ligament size distribution, ligaments near the lower limit (i.e. 10 nm) are susceptible to fully react with water, while ligaments near the upper limit (i.e. 20 nm) will only partially react with water. Hence the presence of metallic Al in the solid Al(OH)$_3$ by-product formed during hydrogen generation by hydrolysis. Further, a 7.12% fraction of AlO(OH) was detected and can be attributed to the gradual conversion of Al(OH)$_3$ into AlO(OH) when this material dehydrates during vacuum exposure and X-ray irradiation needed in XPS characterization.

It should be emphasized that only traces of Al$_2$O$_3$ were found (1.78 at. %), suggesting that the nanoporous Al had not been exposed to oxygen during the fabrication process. The maximum hydrogen generation yield was deduced from the total fraction of Al(OH)$_3$ and AlO(OH) compounds, assuming that AlO(OH) evolves from Al(OH)$_3$. This gives a total yield of 86.43%.

On-Board Hydrogen Generation and Combustion of Bulk Nanoporous Aluminum in Air

Provided here is on-board hydrogen generation by hydrolysis of hierarchical nanoporous Al in deionized water without incorporation of any catalysts or reaction promoters in the Al-water system. In addition, the combustion of bulk nanoporous aluminum in air is also demonstrated.

A hierarchical bulk nanoporous Al sample was crushed into powder to further enhance its hydrogen generation kinetics when in contact with water. This powder was used to produce hydrogen on-board and feed a fuel cell toy vehicle that normally operates with hydrogen generated off-site by water electrolysis.

Further, although catalysts and high temperatures are usually needed to ignite solid materials in the bulk form, bulk nanoporous aluminum can be ignited in air (i.e. with oxygen is the oxidant) and at room temperature, without the use of any catalysts. Thus, bulk nanoporous aluminum itself can be used as a combustion catalyst, e.g., in solid fuel rocket propulsion applications.

A rocket can be propelled and/or powered by contacting a composition according to the present disclosure with water and/or by combusting a composition according to the present disclosure. As but one example, compositions according to the present disclosure can be frozen together with water to form a so-called ALICE propellant, which can be used to effect rocket propulsion.

Heat generated from aluminum during its combustion is the heat that can be used to make this aluminum during aluminum smelting. Another way to recover this heat is through the exothermic reaction that used in Eq. 1 to produce hydrogen by hydrolysis of aluminum with water (see also FIG. 17).

Figure 17:
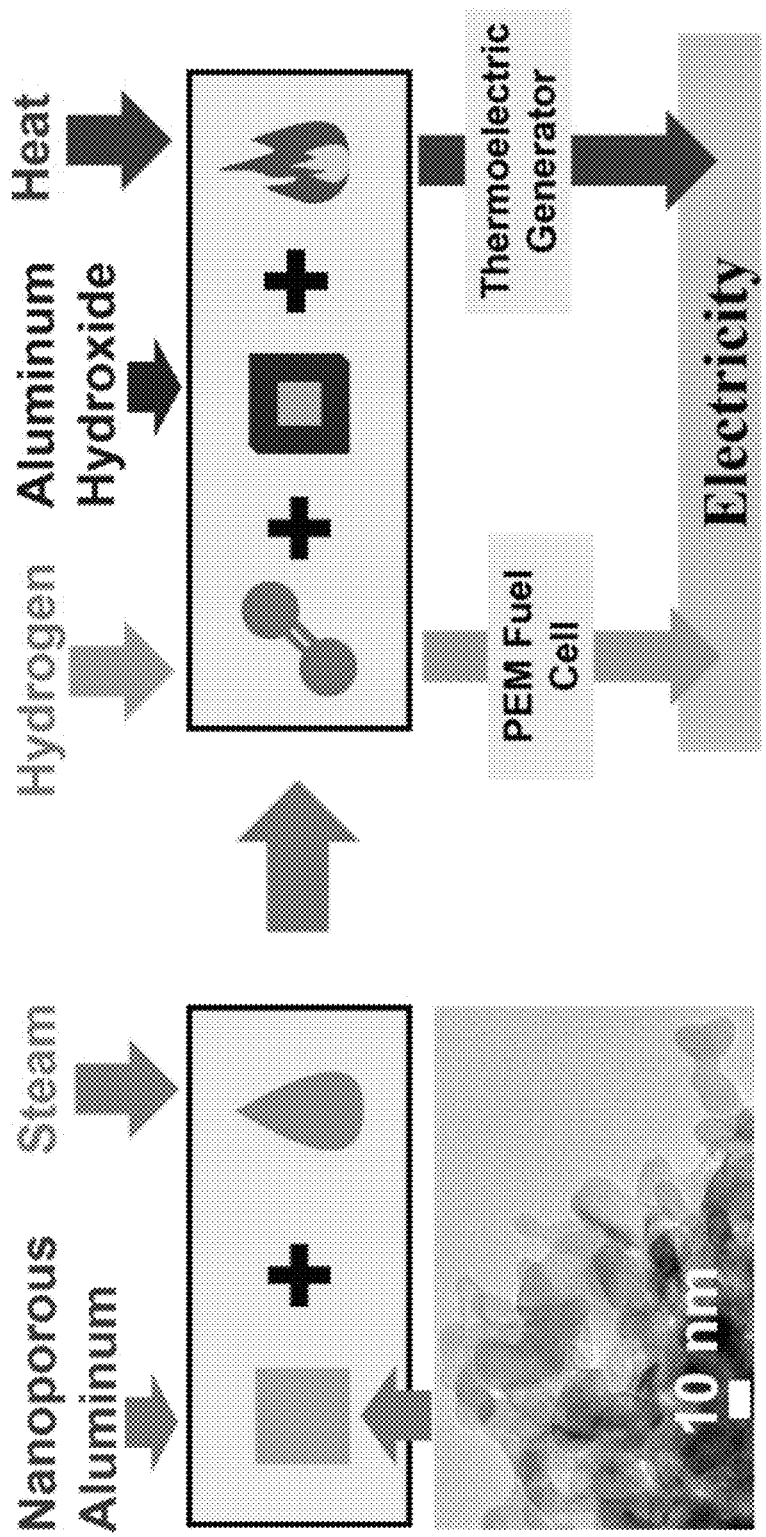
FIG. 17 provides a schematic showing that hydrogen and heat generated from the reaction of bulk nanoporous Al with steam can be used to produce electricity.

The amount of energy stored in 1 kg of energy of hydrogen is approximately 150 MJ. About 150 MJ of heat is also generated when 1 kg of hydrogen is produced through the reaction of aluminum and water as depicted in FIG. 17. Both heat and hydrogen can be converted into electricity using a fuel cell (for hydrogen) and a thermoelectric generator (for the heat) as illustrated in FIG. 17.

Sustainable Recovery of Aluminum

On-board hydrogen production by hydrolysis of hierarchical nanoporous Al can be attractive for large-scale sustainable hydrogen energy applications, with the Al(OH)$_3$ co-produced during hydrogen generation being converted off-site back to metallic Al in a sustainable manner, without any CO$_2$ emissions.

There are many energy intensive processes involved in Al extraction including: Removal of impurity from its bauxite ore to obtain pure Al(OH)$_3$, conversion of this Al(OH)$_3$ to Al$_2$O$_3$ at high temperatures and electrolysis of Al$_2$O$_3$ in molten cryolite at temperatures above 1000° C. to make metallic aluminum and oxygen gas through Eq. 3:

$$2Al_2O_3(l) \rightarrow 4Al(l) + 3O_2(g) \qquad (Eq.\ 3)$$

The required in this process can be recovered during the combustion or hydrolysis of aluminum as shown previously. A smelting process (e.g., a carbon-free process) can be used such that hydrogen can be produced from nanoporous aluminum and water without greenhouse gas emissions at any stage of the process.

Summary

Provided here is synthesis of hierarchical bulk nanoporous material (e.g., metals, such as Al) through a unique non-aqueous electrolytic dealloying process that also allows the recovery of the sacrificial material (metallic Mg) selectively stripped from the parent alloy (Al—Mg alloy).

The fabricated hierarchical nanoporous material comprises macroscopic and mesoscopic ligament/pore structures with, e.g., average characteristic size in the range of 10-20 nm for the mesoscopic ligaments. XPS data reveal that the nanoporous Al was not exposed to oxygen during its processing. This material was used to produce hydrogen on-board with a yield in the range of ~52-85% by hydrolysis with deionized water, and without using any additives in the aluminum-water system to promote the reaction.

The spontaneous combustion of bulk nanoporous aluminum in air and at ambient conditions was also demonstrated in this work. Such materials are desirable as catalysts in solid combustion fuels. In terms of hydrogen generation by hydrolysis in water, a major advantage of the hierarchical porosity corresponds to the fact that the large pores can facilitate the transfer of water through the bulk of aluminum, allowing the mesoscopic ligaments to come in direct contact with water and react to produce hydrogen and heat. The large pores also facilitate the transfer of hydrogen gas out of the bulk of the material. This approach is useful in, e.g., large-scale sustainable hydrogen production using only water and aluminum.

Methods

Example Al—Mg parent alloys with near-eutectic composition were made by homogeneously melting pure Al and pure Mg at 750° C. in a graphite crucible using a quartz tube under argon flow in combination with a tube furnace (OTF-1200X, MTI Corporation).

The nominal composition was taken to be $Al_{30}Mg_{70}$ at. %. Nanoporous Al (NP-Al) was fabricated by selective electrolytic removal of Mg from the above mentioned Al—Mg parent alloys using a Bio-Logic VMP-300 multichannel potentiostat/galvanostat. A JEOL 7500F scanning electron microscope (SEM) equipped with energy dispersive X-ray spectroscopy (EDS) capability was used to characterize the microstructure and elemental composition of the fabricated Al—Mg parent alloy and corresponding dealloyed nanoporous Al. Inductively coupled plasma optical emission spectroscopy (Spectro Genesis ICP-OES device) was also used to further investigate the bulk chemical compositions of these materials.

The X-ray diffraction (XRD) data of these materials was taken with a Rigaku D/Max-B X-ray diffractometer with Bragg—Brentano parafocusing geometry operating with Cu K$\alpha$1 line ($\lambda$=1.5405 Å) and a horizontal goniometer collecting at an angle range of 10-95° with 0.05° step size and 2°/min scanning speed, with a conventional copper target X-ray tube set to 40 kV and 30 mA. A customized gas chromatograph system (GC, Scion 456) equipped with pulsed discharge detector (PDD) with 5 Å molecular sieve packed column, and thermal conductivity detector (TCD) was used to measure the amount and rate of hydrogen produced during the reaction of nanoporous aluminum with water.[22] X-ray photoelectron spectroscopy (XPS) was carried out utilizing a PHI Veraprobe 5000 instrument equipped with a monochromated Al K$\alpha$ radiation source in order to investigate the chemical composition of the solid product formed during the reaction of Al with water.

Further Disclosure

As explained elsewhere herein, the disclosed technology can be used to fabricate nanoporous materials and other type of nanoscale structures from air-sensitive elements. Such elements can be elements with negative standard reduction potential versus the standard hydrogen electrode (SHE), e.g., Al, Zn, Fe, Ti, Ta, Zr, Cr, Ga, Pb, Mo, Nb, and Si.

To form these materials in nanostructured form, one can make a magnesium parent alloy in the form: $(A)_x(Sac)_{1-x}$ where A is chosen from among Al, Zn, Fe, Ti, Ta, Zr, Cr, Ga, Pb, Mo, Nb, Si. The "Sac" in the foregoing formula refers to a sacrificial material, e.g., Mg.

The "x" subscript in the foregoing represents the atomic ratio between A and Sac (e.g., Sac being Mg). X can be greater than 0.05, which would corresponds to $A_5Mg_{95}$. Next, Sac (e.g., Mg) can be selectively removed from the $(A)_x(Sac)_{1-x}$ parent alloy using the same electrochemical dealloying as with the Al30Mg70 reported herein.

Figure 3A:
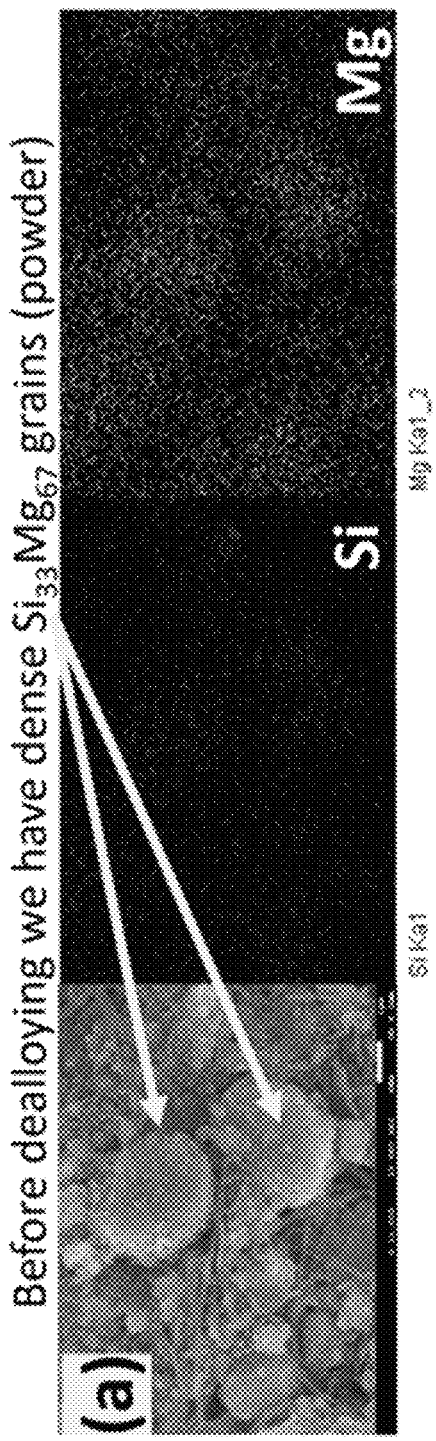
FIG. 3 provides SEM images and EDX mapping showing grains of (panel a) Si—Mg alloys before and (panel b) after air-free dealloying in APC as in the case of nanoporous Al. These data show that Mg has been removed from the starting Si—Mg alloy.
Figure 3B:
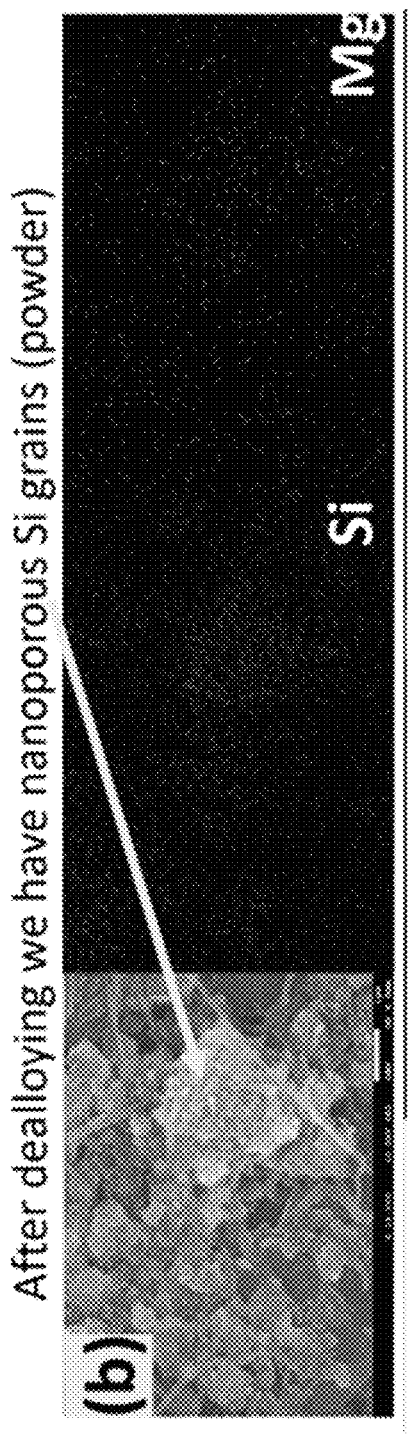
Figure 5:
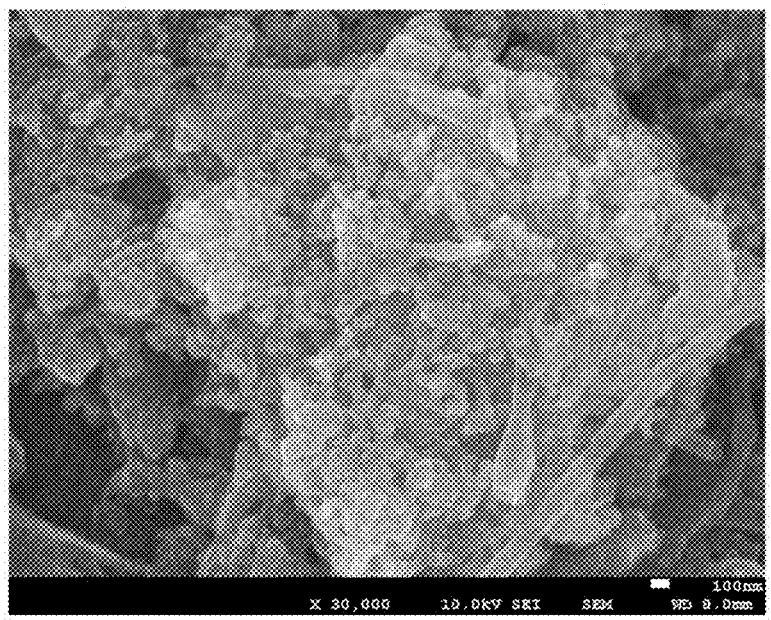
FIG. 5 provides a high magnification SEM image of a nanoporous Si grain after air-free dealloying in APC.

FIG. 3A provides an image of alloyed Si33Mg67; also called Mg2Si. FIG. 3B provides an image of the dealloyed material of FIG. 3A. FIG. 4 provides EDX data before and after dealloying. FIG. 5 provides a SEM image of a nanoporous SI grain after air-free dealloying.

Figure 6:
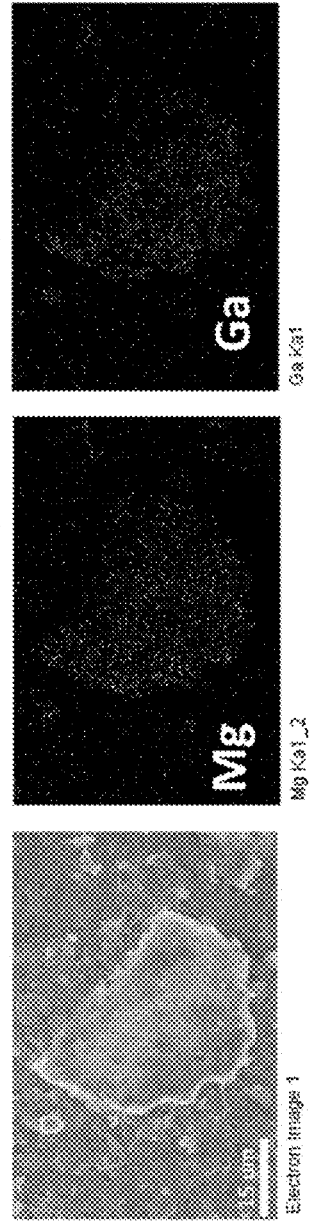
FIG. 6 provides images of a solid $Mg_2Ga_5$ parent alloy that was successfully dealloyed into nearly pure (liquid) Ga in APC.
Figure 6:

FIG. 6 provides images of a solid $Mg_2Ga_5$ parent alloy that was successfully dealloyed into nearly pure (liquid) Ga in APC.

Figure 7:
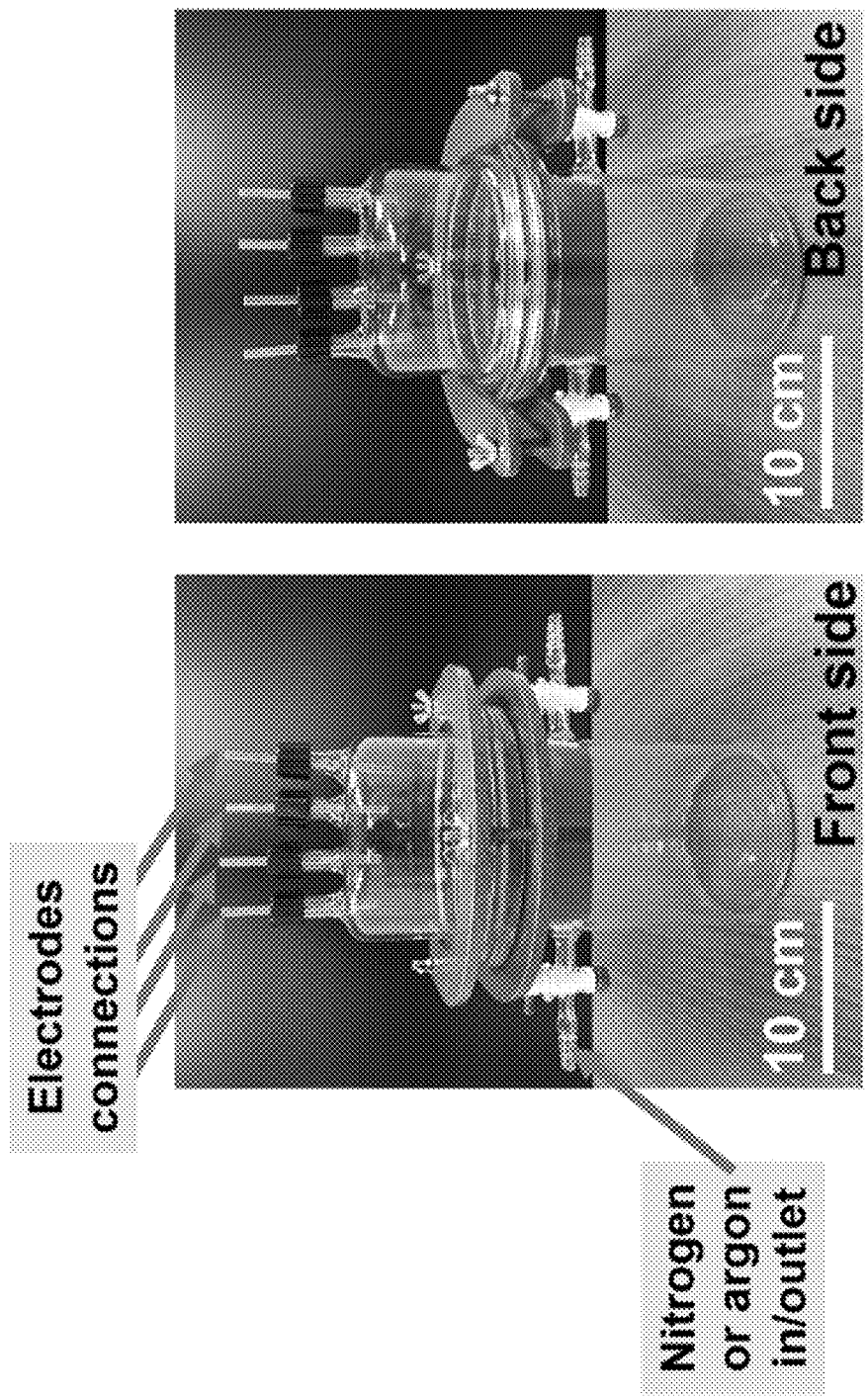
FIG. 7 provides an exemplary, non-limiting setup used to process nanoporous aluminum under an inert environment without the need for a glovebox.

FIG. 7 provides an exemplary dealloying setup. As shown, this setup allows for dealloying without the use of a glove box. Such a cell can comprise, e.g., a container, which container can be filled with inert gas (nitrogen or argon).

Scale-Up of Synthesis

When the starting Al—Mg parent alloy used to make nanoporous Al is a monolithic piece of material with the smallest dimension in the millimeter or centimeter range, the synthesis process can be relatively slow. Without being bound to any particular theory, this is because during dealloying the porosity forms from outside the material inwards. To increase the synthesis rate (i.e., the dealloying rate), one can utilize thinner films or powder grains as alloys.

Thinner electrodes can be used to decrease the dealloying time. This can be seen in FIG. 8A, in which the dealloying process was completed within 45 hours. The lateral dimension dimensions of the sample did not affect the dealloying time, as dealloying time was controlled more strongly by thickness. As one example, the two working electrodes in FIGS. 8B and 8C are dealloyed in about the same time because they have the same thickness, although they do not have the same lateral dimensions.

As shown, one can also utilize materials that are in powder form. This is shown in FIGS. 8D and 8E, which systems can be used to synthesize a comparatively large amount of nanoporous material (e.g., aluminum).

Recovery/Recycling of Sacrificial Material During Dealloying

An advantage (illustrated here by reference to Mg—Al, which is an example material only and is not limiting) of the disclosed dealloying process is the simultaneous synthesis of NP-Al by removing sacrificial Mg from an Al—Mg alloy and recovery of that sacrificial magnesium by electroplating on a Mg foil.

The dealloying process requires that the sacrificial component constitute a portion of the alloy; the sacrificial component can even comprise a majority of the alloy. In most dealloying processes, the majority of the initial alloy mass is lost in solution. Secondary chemical or electrochemical processes can be carried out to recover this material in solid form. The disclosed process allows for NP-Al synthesis and Mg recovery to occur simultaneously. Mg can be recovered with high yield and purity. This in turn allows for Mg to be reused for future dealloying and therefore Mg (i.e., the sacrificial material) is not consumed (or is barely consumed) during the process.

FIG. 8A provides a diagram of the disclosed process. First Al and Mg are melted together to form an alloy. Then, Mg is removed using electrochemical dealloying. The Mg collected can be reused for future dealloying.

The nanoporous material (e.g., NP-Al) can then be hydrated, which in turn evolves hydrogen and heat. Some or all of each of the hydrogen and heat can be collected for other uses. As but some examples, the hydrogen can be used in a hydrogen energy cell and/or combusted. The heat can be used to provide power (e.g., via a steam turbine); the heat can also be used to provide some or all of the energy used in other parts of the process (e.g., smelting).

The product of the metal hydration (e.g., $Al_2O_3$) can then be processed (e.g., smelted) to re-form the metal, which metal is then re-combined with sacrificial material to begin the process anew. (As shown in FIG. 8B, the shiny Al—Mg starting alloy is transformed into dark, brittle bulk NP-Al while the thin, shiny Mg foil is transformed into a thicker and rougher shiny Mg foil.)

Production of Heat and Other Reaction Products (e.g., Nano Nano Aluminum Oxide)

By reference to FIG. 8A, after one produces NP-Al, one can introduce water to produce hydrogen gas. Steam can be used to control the amount of water that reacts with NP-Al. This process in turn creates several valuable products: hydrogen, high purity nano aluminum oxide, and heat.

Heat

Regarding heat, 1 kg of hydrogen gas stores about ~150 MJ of energy. When NP-Al undergoes hydrolysis, hydrogen and heat are coproduced. The heat produced from this reaction has an energy of also about ~150 MJ. Thus, one can capture some of this energy to improve the process efficiency. As but one example, this heat can be used to produce electricity at a stationary plant using a steam engine or on-board at a mobile application using thermoelectric materials. This electricity could be sold or used to power equipment used in this process.

One can also store the heat, e.g., using a medium such as water or molten metals. This heat could be used to reduce the electricity needed to perform some of the thermal processing required in this process such as alloying Al and Mg.

Nano Aluminum Oxide

When aluminum and water react at room temperature, the solid reaction product consists mainly of aluminum hydroxide. Heating this material can convert this aluminum hydroxide into aluminum oxide. However, as mentioned earlier, the use of high temperature steam instead of room temperature water is ideal as it allows us to control the amount of hydrogen process through the controlled flow of steam. When aluminum and water react at room temperature, the solid reaction product consists mainly of aluminum oxide.

One can treat this (hydr)oxide as a reaction product that could be recycled back to aluminum (see FIG. 8A). This (hydr)oxide reaction product, however, can have a high purity and small, nanoscale structure size. Such nanopowders (e.g., aluminum oxide) are a valuable product. Thus, the disclosed technology can be used to produce high purity nano aluminum oxide powder.

Further Disclosure

The following disclosure is exemplary only and does not limit the scope of the present disclosure. An initial step in the disclosed technology is the fabrication of a parent material, e.g., an Al—Mg parent material. The exemplary typical composition used here to demonstrate the disclosed concept is $Al_{30}Mg_{70}$ at. %, but the composition can be varied between a lower limit of about $Al_5Mg_{95}$ and an upper limit of about $Al_{55}Mg_{45}$ at. %. The parent material can be made by homogeneously melting pure Al and pure Mg with appropriate ratio at, e.g., 750 deg. C., either under inert gas (e.g., nitrogen, argon) or under vacuum. The shining silvery bulk metallic piece in FIG. 1b represents a starting Al—Mg parent material with composition $Al_{30}Mg_{70}$ at. % obtained by melting pure Al and pure Mg at 750 deg. C. under nitrogen atmosphere.

A second step is the selective removal of the magnesium from the parent materials. This can be done electrochemically, using an electrochemical cell configuration consisting of the $Al_{30}Mg_{70}$ at. % parent material used as the working electrode, and a piece of magnesium foil use as both counter and reference electrodes. These two electrodes (i.e. working and counter electrodes) are immersed in an electrolyte containing $Mg^{2+}$ ions dissolved in an organic solvent. (In some cases, an organic solvent electrolyte is used instead of an aqueous electrolyte because of the high reactivity of an electrode with an aqueous solution).

The selective leaching process was carried out under an inert environment because of the very high reactivity of Al. During electrochemical dealloying, a bias voltage (typically in the range of 0.45 V versus Mg/Mg2+) was used to selectively strip Mg from the $Al_{30}Mg_{70}$ working electrode and plate this Mg onto the starting Mg metal foil counter electrode.

At the end of the process, the $Al_{30}Mg_{70}$ working electrode was converted into bulk nanoporous Al(BNP-Al), while the Mg metal foil counter electrode becomes fully coated with Mg removed from the working electrode. Mg plated on the counter electrode foil can be collected and re-use to make new $Al_{30}Mg_{70}$ parent alloy. Also, the Mg2+ in the organic solvent electrolyte are not consumed and can be re-used to make new BNP-Al. The fact that several components can be re-used makes the disclosed fabrication process very scalable.

In initial testing, the organic solvent Tetrahydrofuran (THF) was used. Other solvents, e.g., less volatile solvents, can also be used. Some suitable solvents include, e.g., Tetraglyme (TG), triglyme (TG) diglyme (DG), monoglyme (MG), Acetonitrile (ACN), Dimethyl sulfoxide (DMSO), Propylene carbonate (PC), Ethylene carbonate (EC), dimethyl carbonate (DMC), diethyl carbonate (DEC), and combinations thereof.

A typical bulk nanoparous Al fabricated by selective removal of the sacrificial Mg from a $Al_{30}Mg_{70}$ parent alloy is shown by the black piece in FIG. 1b, and FIG. 1c shows the typical nanoporous Al microstructure: the ligament size is in the range of 10-30 nm. This structure size is ideal for optimal and full reactivity of BNP-Al with water according to the reaction in Eq. 1 below:

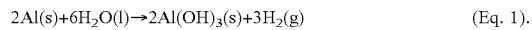

$$2Al(s)+6H_2O(l) \rightarrow 2Al(OH)_3(s)+3H_2(g) \qquad (Eq.\ 1).$$

When the exemplary BNP-Al was put in water, it immediately produced $H_2$. FIG. 1d represents a typical gas chromatograph (GC) recorded during hydrogen production when the disclosed BNP-Al was immersed in water for more than 7 hours. It can be seen from FIG. 1d that hydrogen was continuously produced over seven hours.

The disclosed technology has a variety of applications to hydrogen energy technologies. Hydrogen gas ($H_2$) is very attractive as energy carrier for mobile applications, as it can release energy with zero-emission upon reaction with oxygen, and of all common energy carrier media, it exhibits the highest gravimetric energy density (142 MJ·kg-1 versus 47 MJ·kg-1 for petroleum used in combustion engines).

Despite these remarkable features, however, $H_2$ is not yet widely used as energy carrier. This is because H2 is a gas at room temperature and takes up a lot of space. In fact, H2 exhibits the lowest volumetric energy density of all common energy carriers (0.0108 MJ.L-1 versus 34 MJ·L-1 for petroleum). Consequently, the effective storage of H2 remains a big challenge and the common approach to store H2 for onboard applications is by compression in tanks. Due to safety considerations associated with high-pressure flammable gas, it is anticipated that the storage capacity of compressed hydrogen tanks cannot be further significantly improved.

One promising solution corresponds to the use of water-reactive materials to produce H2 when needed, without prior storage. Several water-reactive materials including Al2 have been proposed for H2 production according to the reaction shown in Eq. 1 herein.

Although though this reaction is thermodynamically favorable, it is self-limiting and do not continually proceed because the hydroxide layer (or "oxide" layer depending on the specific experimental conditions) formed on the metal surface at the beginning of the reaction prevents water from coming into direct contact with the metal underneath, which represents a fundamental issue in such a system.

A common solution to overcome that issue of water-blocking hydroxide layer involves the addition of catalysts in the water/metal system to destroy that hydroxide layer or prevent it from forming. These catalysts are usually referred to as promoters, activators, or modification agents.

Figure 2A:
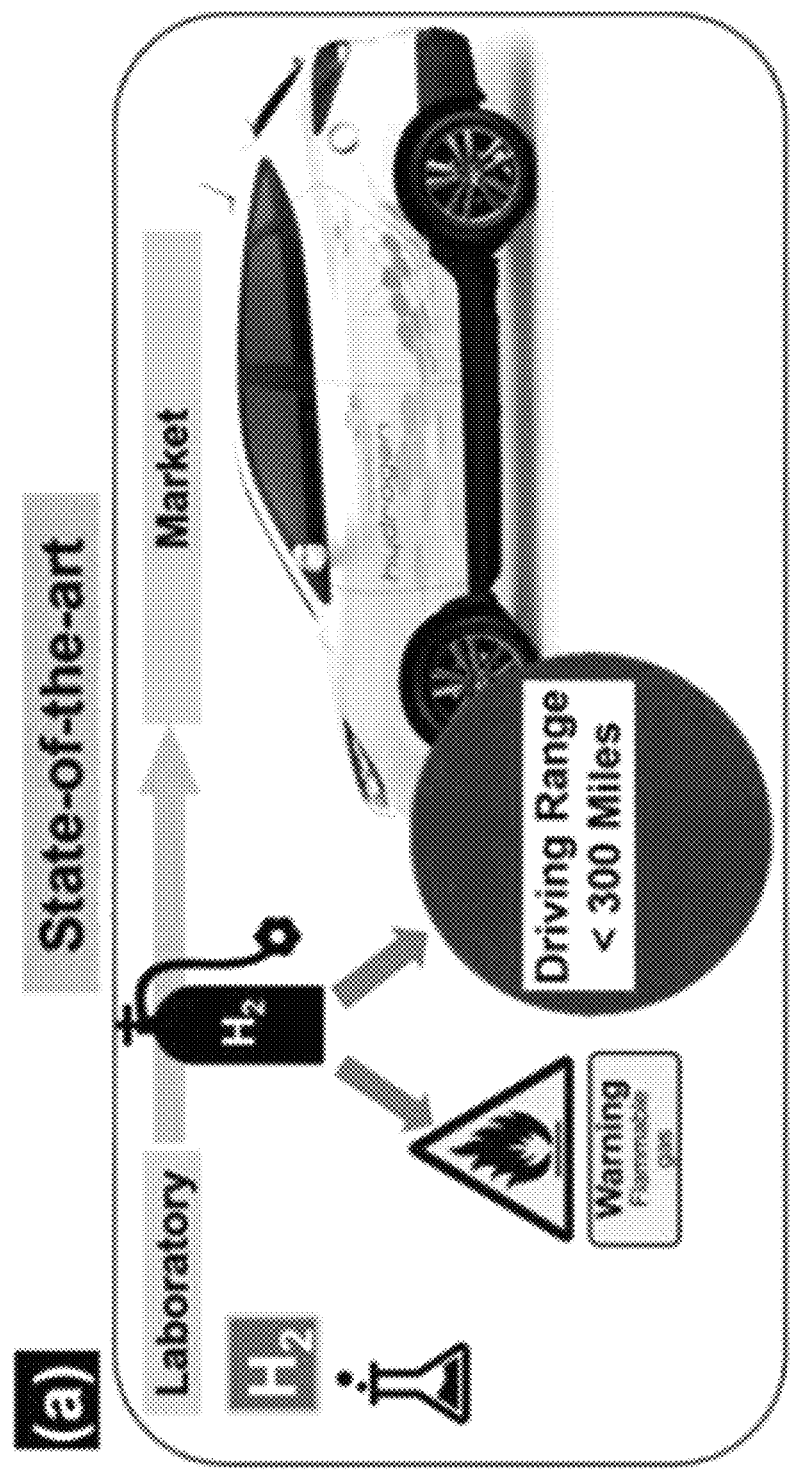
FIG. 2 provides exemplary ways to generate hydrogen for on-board applications; (panel a) shows hydrogen is stored compressed in tanks—as the storage capacity of the tank is limited, so is the driving range in the case of hydrogen-powered vehicles; (panel b) shows hydrogen generated directly from water-reactive materials—this reaction will not proceed unless catalysts are used to activate this reaction; and (panel c) shows disclosed bulk nanoporous Al for hydrogen production from water without the need of any additional catalysts like in (panel b).
Figure 2B:
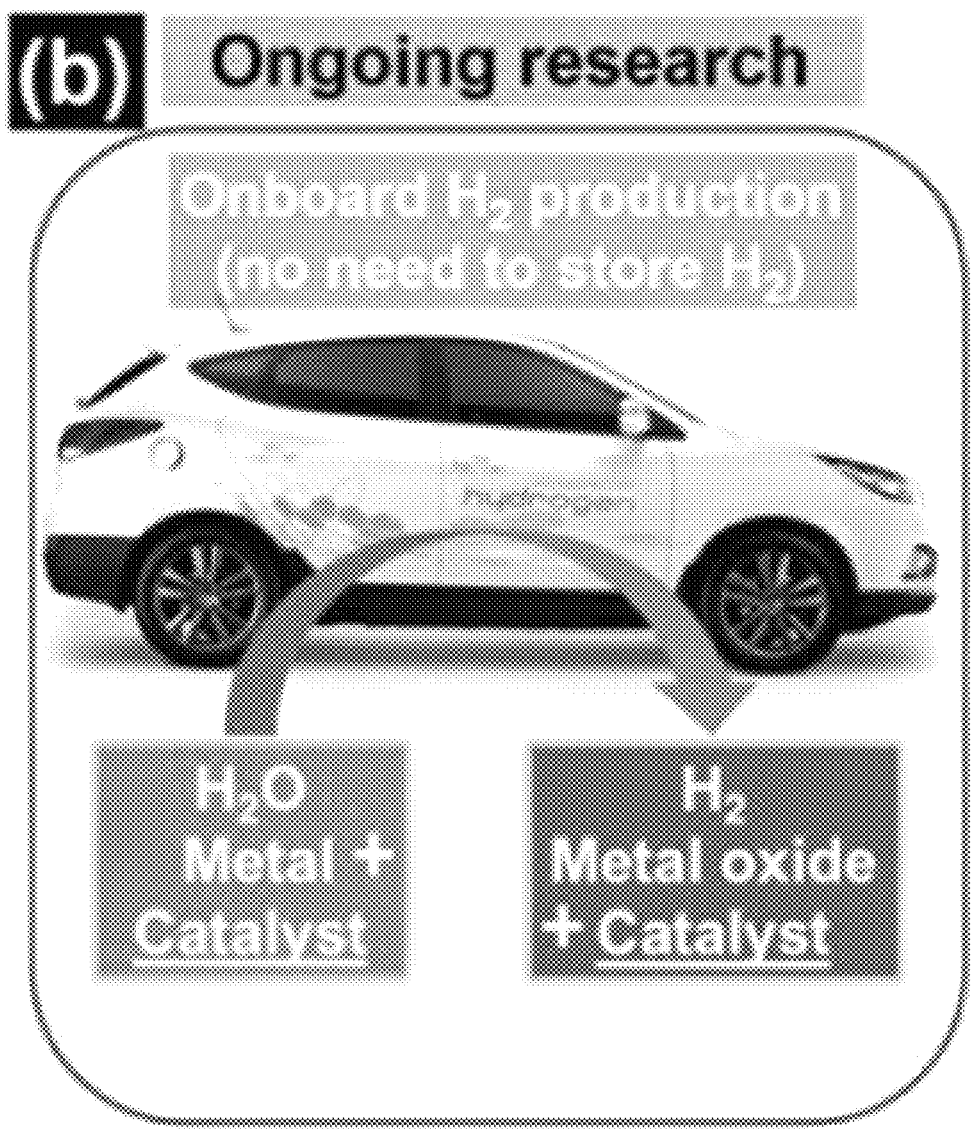
Figure 2C:
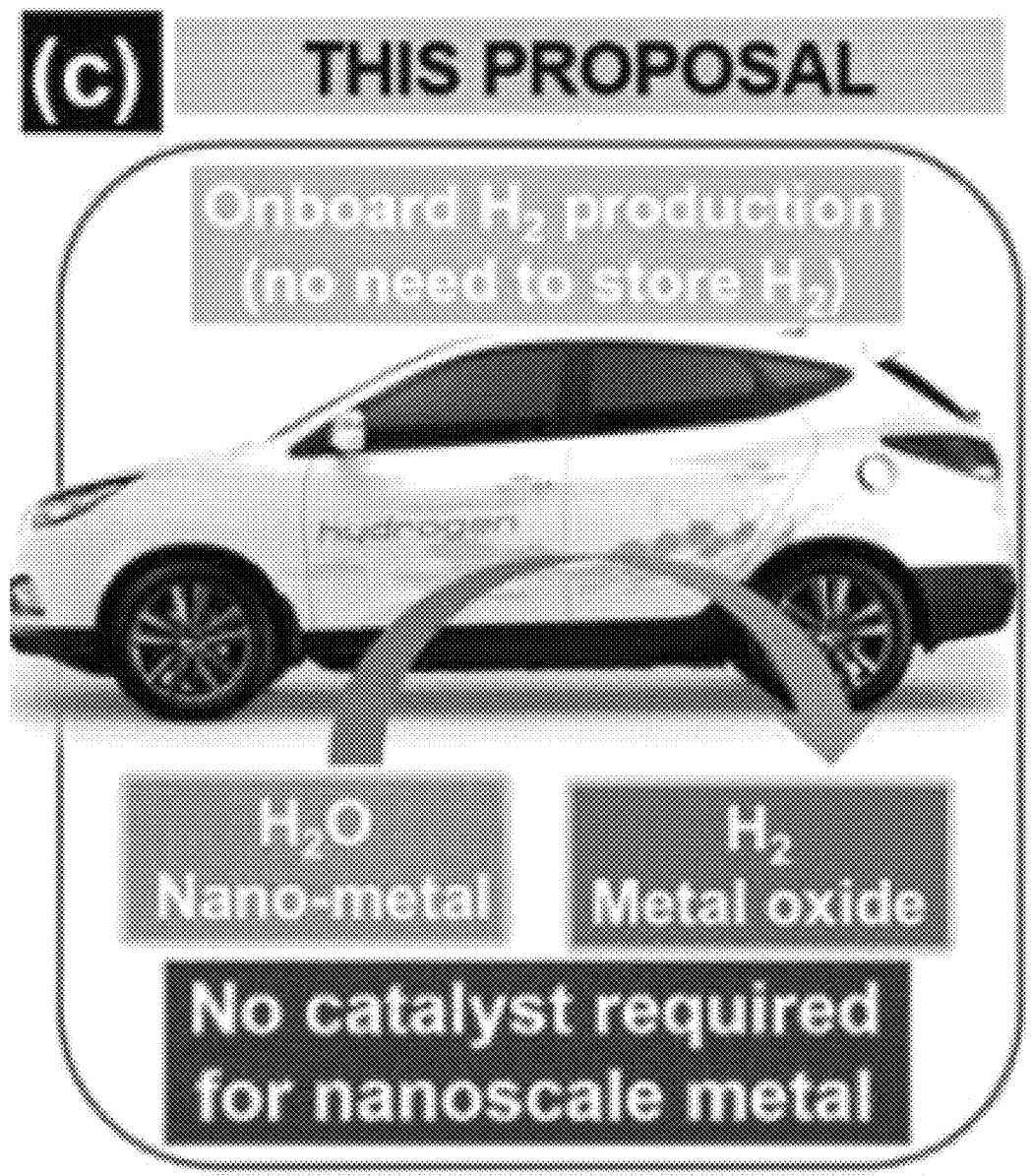

Such an approach is illustrated in FIG. 2b in the case of hydrogen-powered vehicles. The use of catalysts has not yet resulted in breakthrough in the field. In particular, a major problem is the fact that a catalyst is a "non-active mass" in the water/metal system, therefore it lowers the overall theoretical gravimetric hydrogen generation capacity of the water/metal system. Therefore, activating a water-reactive material by adding a non-active mass to the system is undesirable.

Rather than using "catalysts" to activate the water/metal reactivity, proposed here is the use of BNP-Al as a solution (see illustration in FIG. 1c).

One approach is graphically illustrated in FIG. 1a, as follows:
  (i) Making bulk nanoporous Al for large scale H2 production by water hydrolysis.
  (ii) Recycling through extraction pure Al from the Al oxide waste produced during H2 generation from water as shown in Eq. 1.
  (iii) Integration of the fabricated bulk nanoporous Al into on-demand H2 generation applications, with use in "powering of and H2 fuel cell vehicles"

Exemplary Embodiments

The following embodiments are exemplary only and do not serve to limit the scope of the present disclosure or the appended claims.

Embodiment 1. A composition, comprising: a nanoporous material, the nanoporous material portion comprising interconnected ligaments defining pores therebetween, the pores being open to the environment exterior to the nanoporous material, and the pores being characterized as having an average cross-section in the range of from about 5 to about 100 nm.

The nanoporous material can be, e.g., a water-reactive material. The nanoporous material can comprise a metal, e.g., one or more of aluminum, magnesium, silicon, iron, zinc, and or zirconium. The nanoporous material can also comprise a nonmetal, e.g., Si, Ge, Sb, Se, as but some examples. The nanoporous material can also comprise a metal with a standard reduction potential less than the standard hydrogen electrode (SHE) at 0 V vs. SHE. Some such examples include Li, K, Ca, Na, Mg, Al, Zn, Cr, Fe, Cd, Ni, Sn, H, Cu, I, Ag, Hg, Br, Cl, Au, and F. Metals are considered especially suitable.

The composition can be maintained in an inert atmosphere, e.g., argon, helium, nitrogen, and the like. As one non-limiting example, dealloying can be performed in an electrochemical cell that contains an electrolyte (e.g., an organic electrolyte. The dealloying can be performed in an inert gas environment, e.g., argon or nitrogen gas. The inert environment can be contained within the cell. Alternatively, the cell itself can be contained within an inert environment. After nanoporous metal (or other material) is produced as described, the nanoporous metal can be stored under an inert gas environment, e.g., the inert gas environment under which the metal was formed.

It should be understood that any step and any aspect of the disclosed technology can be present and/or performed under an inert atmosphere, e.g., argon, helium, nitrogen, and the like. As an example, a composition according to the present disclosure can be contacted with water under an inert atmosphere. A system, device, or other article according to the present disclosure can include a region (e.g., a chamber, a reactor) that provides an inert atmosphere. A system, device, or other article according to the present disclosure can also be disposed within an inert atmosphere.

Nanoporous metal can be stored under inert gas, e.g., in a container that contains such gas. The nanoporous metal can be contacted with water to produce hydrogen gas on demand. As an example, water can be introduced to the container in which the nanoporous metal is disposed. Alternatively, the nanoporous metal can be introduced to a supply of water.

Pore size can be estimated using electron microscopy (SEM) and transmission electron microscopy (TEM); a standard methodology is nitrogen porosimetry (BET method).

Embodiment 2. The composition of Embodiment 1, wherein the pores are characterized as having an average cross-section in the range of from about 10 to about 30 nm.

Embodiment 3. The composition of any of Embodiments 1-2, wherein the composition consists essentially of aluminum.

Embodiment 4. The composition of any of Embodiments 1-3, wherein the ligaments have an average cross-section of from about 5 to about 80 nm.

Embodiment 5. The composition of any of Embodiments 1-4, wherein the composition is in contact with water. It should be understood that water can be in any form or forms, e.g., liquid water, water vapor and/or steam, or any combination thereof.

Embodiment 6. The composition of any of Embodiments 1-5, wherein the composition is disposed in a vehicle.

Embodiment 7. The composition of any of Embodiments 1-5, wherein the composition is disposed in a stationary power generator or a mobile power generator.

Embodiment 8. The composition of any of Embodiments 1-7, further comprising an amount of water in contact with the composition.

Embodiment 9. A power cell, comprising: the composition of any of Embodiments 1-3, the composition optionally being disposed in a removable cartridge; an amount of water, the power cell being configured to effect contact between the composition and the water; and a collector disposed to collect hydrogen evolved from contact between the water and the composition. As described elsewhere herein, the power cell can be configured so as to effect contact between the composition and the water under an inert atmosphere.

Embodiment 10. The power cell of Embodiment 9, further comprising a fuel cell configured to generate electricity from hydrogen evolved from contact between the water and the composition.

Embodiment 11. The power cell of Embodiment 10, wherein the fuel cell is characterized as a proton exchange membrane fuel cell, an alkaline fuel cell, a phosphoric acid fuel cell, a molten carbonate fuel cell, or a solid oxide fuel cell.

Embodiment 12. The power cell of Embodiment 11, wherein the fuel cell is characterized as a solid oxide fuel cell.

Embodiment 13. The power cell of any of Embodiments 9-12, wherein the power cell is disposed in a vehicle.

Embodiment 14. The power cell of any of Embodiments 9-12, wherein the power cell is disposed in a stationary power generator.

Embodiment 15. A method, comprising: applying a voltage to a first parent mixture (e.g., an alloy) comprising (a) a first material and (b) a second metal, the applying being performed in the presence of a counter electrode that comprises the second metal, the first parent mixture and the counter electrode contacting an electrolyte, the applying being performed under such conditions that the second metal is selectively removed from the first parent mixture so as to leave behind a nanoporous portion of the first material, the nanoporous portion of the first material comprising interconnected ligaments defining pores therebetween, the pores being open to the environment exterior to the nanoporous portion of the first material, and the pores being characterized as having an average cross-section in the range of from about 5 to about 100 nm.

The first material can be, e.g., a metal, e.g., one or more of aluminum, magnesium, silicon, iron, zinc, and or zirconium. The nanoporous material can also comprise Si, Ge, Sb, Se, as examples. The first material can also comprise a metal with a standard reduction potential less than the standard hydrogen electrode (SHE) at 0 V vs. SHE. Some such examples include Li, K, Ca, Na, Mg, Al, Zn, Cr, Fe, Cd, Ni, Sn, H, Cu, I, Ag, Hg, Br, Cl, Au, and F. Metals are considered especially suitable, e.g., Al.

Embodiment 16. The method of Embodiment 15, wherein the second metal comprises one or more of magnesium, lithium, sodium, potassium, or calcium.

Embodiment 17. The method of any of Embodiments 15-16, wherein the first parent mixture comprises from about 5 at % to about 55 at % of the first material.

Embodiment 18. The method of Embodiment 17, wherein the first parent mixture comprises from about 15 at % to about 45 at % of the first material.

Embodiment 19. The method of any of Embodiments 15-18, wherein the second metal of the first parent mixture is selectively plated onto the counter electrode. The selective plating can comprise, e.g., the second metal being selectively leached into the electrolyte and plated onto the counter-electrode.

Embodiment 20. The method of Embodiment 19, further comprising collecting the second metal of the parent mixture and mixing the collected second metal with the first material to form a second parent mixture.

Embodiment 21. The method of any of Embodiments 15-20, wherein the electrolyte is an organic electrolyte.

Embodiment 22. The method of any of Embodiments 15-21, wherein the organic electrolyte comprises THF. As an example, an organic electrolyte can comprise APC ("all-phenyl" complex), e.g., a magnesium-aluminum-chloride-phenyl complex dissolved in THF. The concentration of the APC complex can be, e.g., about 1.0 M (dissolved in THF). Such an APC electrolyte is useful for the synthesis of nanoporous Al from Mg—Al alloy.

Embodiment 23. The method of any of Embodiments 15-22, wherein the electrolyte comprises ions of the second metal. The second metal can be provided by a salt and a complex dissolved in a solvent.

As one example, if the second metal is Mg, the corresponding Mg ion can be provided by a Mg salt and complex dissolved in the an organic solvent. Exemplary, Mg salts and complex include: All phenyl complexes (APC), PhMgCl, $Mg_2(ClO_4)_2$, $Mg(TFSI)_2$, $Mg(BF_4)_2$, $Mg(BPh_2Bu_2)_2$, $Mg(BPhBu_3)_2$, $Mg(BBu_4)_2$, $(Mg(BPh_3Bu))_2$, $Mg(BPh_4)_2$, $Mg(AlCl_2EtBu)_2$, $Mg(BH_4)(NH_2)$, and any combination thereof.

Embodiment 24. A system, comprising: a supply of a first parent mixture comprising a first material and a second metal; a counter electrode that comprises the second metal; an electrolyte contacting the first parent mixture and the counter electrode, the electrode comprising ions of the second metal; and a voltage source configured to apply a voltage under such conditions that the second metal is selectively removed from the first parent mixture so as to leave behind a nanoporous portion of the first material, the nanoporous portion of the first material comprising interconnected ligaments defining pores therebetween, the pores being open to the environment exterior to the nanoporous portion, the pores being characterized as having an average cross-section in the range of from about 5 to about 100 nm.

Suitable first materials are provided elsewhere herein and can include, e.g., metal, e.g., one or more of aluminum, magnesium, silicon, iron, zinc, and or zirconium. The nanoporous material can also comprise Si, Ge, Sb, Se, as examples. The first material can also comprise a metal with a standard reduction potential less than the standard hydrogen electrode (SHE) at 0 V vs. SHE. Some such examples include Li, K, Ca, Na, Mg, Al, Zn, Cr, Fe, Cd, Ni, Sn, H, Cu, I, Ag, Hg, Br, Cl, Au, and F. Metals are considered especially suitable, e.g., one or more of Al, Mg, Si, Fe, Zn, or Zr.

Embodiment 25. A vehicle, the vehicle comprising: a composition according to any of Embodiments 1-4; optionally a supply of water; a fuel cell configured to generate electricity from hydrogen evolved from contact between the composition and the supply of water; and a drive system, the vehicle being configured to communicate electricity from the fuel cell to the drive system so as to propel the vehicle.

Embodiment 26. The vehicle of Embodiment 25, wherein the composition is disposed in a removable container, the removable container being configured to collect metal oxide evolved from contact between the composition and the supply of water.

Embodiment 27. A generator unit, the generator unit comprising: a composition according to any of Embodiments 1-4; a supply of water; a fuel cell configured to generate electricity from hydrogen evolved from contact between the composition and the supply of water; and the generator unit comprising an outlet configured to communicate electricity from the fuel cell to device in electronic communication with the outlet.

Embodiment 28. The generator unit of Embodiment 27, wherein the composition is disposed in a removable container, the removable container being configured to collect metal oxide and/or metal hydroxide evolved from contact between the composition and the supply of water.

Embodiment 29. A vehicle, the vehicle comprising: a composition according to any of Embodiments 1-5, the composition in communication with an amount of water, the vehicle being configured for propulsion by combustion of hydrogen evolved by reaction of the water and the composition.

Without being bound to any particular theory, such an arrangement can translate the heat of combustion (and subsequently condensation) into expansion and thrust. The high density of the water-composition mixture can allow for reduced tankage mass and high thrust.

As one example, the vehicle can be configured to contact liquid water with the composition. The composition and water can be present in frozen form, i.e., wherein the water is in ice form.

Embodiment 30. The vehicle of Embodiment 29, wherein the vehicle is configured for atmospheric transit. Such a vehicle can be manned or unmanned. Planes, missiles, rockets, and the like are all suitable such vehicles. As described elsewhere herein, Embodiment 31. The vehicle of any of Embodiments 29-30, wherein the vehicle is configured for space transit. Planes, missiles, rockets, and the like are all suitable such vehicles.

Embodiment 32. A method, comprising: contacting a composition comprising a water-reactive nanoporous material and water so as to effect evolution of hydrogen, a heat, and one or both of an oxide or a hydroxide of the material.

Suitable water-reactive materials are described elsewhere herein. Some examples are a metal, e.g., one or more of aluminum, magnesium, silicon, iron, zinc, and or zirconium. The material can also comprise Si, Ge, Sb, or Se. The material can also comprise a metal with a standard reduction potential less than the standard hydrogen electrode (SHE) at 0 V vs. SHE. Some such examples includes Li, K, Ca, Na, Mg, Al, Zn, Cr, Fe, Cd, Ni, Sn, H, Cu, I, Ag, Hg, Br, Cl, Au, and F. Metals are considered especially suitable. Some examples of such metals are, without limitation, Al, Zn, Fe, Ti, Ta, Zr, Cr, Ga, Pb, Mo, Nb, and Si.

As described elsewhere herein, in one embodiment, one can store nanoporous metal (e.g., NP-Al) in a vessel, e.g., under an inert atmosphere. Water (e.g., in steam form) can be contacted to the nanoporous metal, and evolved hydrogen can flow out of the vessel. After the nanoporous metal has been reacted, the evolved (hydr)oxide can be removed from the vessel, and the and then the vessel can be reused for new nanoporous metal. The recovered hydr(oxide) can be sold as a commercial product (e.g., high purity aluminum oxide nanopowder). The recovered material can be, e.g., sold to aluminum smelting companies as a high purity feedstock to produce aluminum.

Embodiment 33. The method of Embodiment 32, further comprising recovering at least some of the one or both of an oxide or a hydroxide of the nanoporous material. For example, when aluminum is the water-reactive material, one can recover aluminum oxide and/or aluminum hydroxide that has been evolved. One can then retain that recovered material for further use (as described elsewhere herein) and/or sell the recovered material. Without being bound to any particular theory, selling (or otherwise using) recovered material can reduce the effective cost of hydrogen production.

Embodiment 34. The method of Embodiment 33, further comprising converting the one or both of an oxide or a hydroxide of the material to the material. The conversion can be, e.g., a smelting process, e.g., the conversion of aluminum oxide to aluminum.

Embodiment 35. The method of Embodiment 34, further comprising combining the material with a sacrificial material to form an alloy. A sacrificial material can be, e.g., a metal. Suitable such metals include, for example, magnesium, lithium, sodium, potassium, and/or calcium.

Embodiment 36. The method of Embodiment 35, further comprising dealloying the alloy so as to extract the sacrificial material from the alloy and give rise to nanoporous material. Exemplary dealloying processes are described elsewhere herein and include, e.g., contacting the alloy and a counter electrode (which suitably comprises the sacrificial material) with an electrolyte and applying a current so as to extract the sacrificial material and plate the sacrificial material onto the counter electrode, leaving behind nanoporous metal.

Embodiment 37. The method of Embodiment 36, further comprising recovering the sacrificial material. The recovering can be effected by, e.g., physically removing sacrificial material from the counter electrode onto which it is plated.

Without being bound to any particular theory, as sacrificial material B is removed from an alloy $A_xB_{x-1}$, B becomes B ions. These ions travel through a B ion-conducting electrolyte, and are then plated to form B on the B counter electrode. In this way, B removal from $A_xB_{x-1}$ working electrode and B recovery on B counter electrode happens simultaneously, such that after dealloying is complete, material (e.g., nanoporous metal) A can be collected from the working electrode and metallic B can be collected from the counter electrode. The B collected can be reused (as described elsewhere herein) to produce additional alloy $A_xB_{x-1}$.

Embodiment 38. The method of Embodiment 37, further comprising combining the sacrificial material with the material so as to form an alloy. The combining can be, e.g., melting the material and the sacrificial metal and mixing the melted materials.

Embodiment 39. The method of Embodiment 33, further comprising recovering at least some of the heat and applying the recovered heat to the converting the one or both of an oxide or a hydroxide of the material (e.g., a metal) to the material (e.g., a metal). As one example, heat recovered from the reaction of nanoporous aluminum with water can be used to at least partially support the energy needs of a smelting process that converts aluminum oxide to aluminum.

Recovered heat can be used in a variety of ways. As one example, electricity can be recovered (e.g., in mobile applications) from a thermal gradient using thermoelectric generators via the Seebeck Effect. Electricity can be generated using a steam engine, which engine can be run using recovered heat. (Electricity can be stored on-board or on-site and/or can be sold.) Thermal energy can also be stored, e.g., using sensible heat (heating a medium, such as water, oil or molten metal), phase change materials, or thermochemical conversion. Stored thermal energy can be used on-site for the thermal processing needed (such as the heat needed to form A-B alloys and/or to convert B hydroxide to B oxide), thus allowing for a system that includes heat integration.

Embodiment 40. The method of Embodiment 32, further comprising recovering at least some of the heat and effecting power generation with the recovered heat. Power generation can be effected by, e.g., using the heat to boil water to effect motion of a generator turbine.

Embodiment 41. The method of Embodiment 32, wherein the composition consists essentially of the water-reactive nanoporous material, e.g., nanoporous metal. The composition can consist of the water-reactive nanoporous material. The composition can be essentially or even completely free of oxide forms of the water-reactive material.

Embodiment 42. A system, comprising: a reaction chamber configured to contact water and a water-reactive material under conditions sufficient to effect evolution of (i) hydrogen, (ii) a heat, and (iii) one or both of an oxide of or a hydroxide of the water-reactive material.

The water-reactive material can comprise a metal, e.g., one or more of aluminum, magnesium, silicon, iron, zinc, and or zirconium. The material can also comprise Si, Ge, Sb, Se, as examples. The material can also comprise a metal with a standard reduction potential less than the standard hydrogen electrode (SHE) at 0 V vs. SHE. Some such examples include Li, K, Ca, Na, Mg, Al, Zn, Cr, Fe, Cd, Ni, Sn, H, Cu, I, Ag, Hg, Br, Cl, Au, and F. Metals are considered especially suitable.

The reaction chamber can be configured to provide a non-reactive atmosphere, e.g., argon or nitrogen.

A device can involve steam flowing into a chamber containing NP-Al, with evolved hydrogen flowing out. The amount of hydrogen evolved can be controlled by the amount of steam supplied and the speed of hydrogen evolution can be controlled by steam flow rate. For applications that require hydrogen to be supplied at a particular pressure, a small chamber can be built between the NP-Al containing vessel and the hydrogen supply side. This tank can be filled to maintain a particular pressure at all times.

A system can be present in a stationary location, e.g., a production facility. A system can also be disposed on a vehicle, e.g., a wheeled vehicle, or even a rocket.

Embodiment 43. The system of Embodiment 42, further comprising a hydrogen recovery train configured to recover hydrogen evolved in the chamber.

Embodiment 44. The system of any one of Embodiments 42-43, further comprising a conversion train configured to convert, to the water-reactive metal, a recovered amount of one or both of an oxide or a hydroxide of the water-reactive metal.

Embodiment 45. The system of any one of Embodiments 42-44, further comprising an alloying train configured to combine sacrificial material recovered from dealloyed alloy with the water-reactive metal to form an alloy.

Embodiment 46. The system of any one of Embodiments 42-45, further comprising a dealloying train configured to extract sacrificial material from an alloy that comprises the water-reactive metal so as to give rise to the water-reactive metal in nanoporous form.

Embodiment 47. The system of Embodiment 46, wherein the dealloying train comprises a counter electrode that comprises the sacrificial material.

Embodiment 48. The system of Embodiment 47, wherein the counter electrode encloses the alloy.

Embodiment 49. The system of any one of Embodiments 42-48, further comprising a heat recovery train configured to recover heat evolved at the reaction chamber.

Embodiment 50. A method, comprising contacting a composition according to any one of Embodiments 1-7 with water under conditions sufficient to effect evolution of (i) hydrogen, (ii) heat, and (iii) one or both of an oxide of or a hydroxide of the nanoporous material.

Embodiment 51. A method, comprising combusting a composition according to any one of Embodiments 1-7.

Embodiment 52. The method of Embodiment 51, wherein the combusting is effected so as to effect propulsion of a vehicle.

Propulsion of a vehicle can be effected by combusting hydrogen evolved from a composition, method, or system according to the present disclosure. Propulsion can also be effected by hydrogen (e.g., mass flow) evolved from a composition, method, or system according to the present disclosure.

Embodiment 53. A composition, comprising
(i) an oxide of a material, the oxide of the material being formed by contacting the material with water under conditions sufficient to evolve hydrogen and the oxide of the material; (ii) a hydroxide of a material, the hydroxide of the material being formed by contacting the material with water under conditions sufficient to evolve hydrogen and the hydroxide of the material; or (iii) both (i) and (iii).

REFERENCES

The following references are incorporated herein in their entireties for any and all purposes.
Litvinenko, S. et al. Hydrogen production from nano-porous Si powder formed by stain etching. *Int. J. Hydrogen Energy* 35, 6773-6778 (2010).
Wang, H. Z., Leung, D. Y. C., Leung, M. K. H. & Ni, M. A review on hydrogen production using aluminum and aluminum alloys. *Renew. Sustain. Energy Rev.* 13, 845-853 (2009).
Erogbogbo, F. et al. On-demand hydrogen generation using nanosilicon: Splitting water without light, heat, or electricity. *Nano Lett.* 13, 451-456 (2013).
Sundaram, D. S., Yang, V. & Zarko, V. E. Combustion of nano aluminum particles (Review). *Combust. Explos. Shock Waves* 51, 173-196 (2015).
Miller, T. & Herr, J. Green Rocket Propulsion by Reaction of Al and Mg Powders and Water. *AIAA paper* 1-10 (2004). doi:doi:10.2514/6.2004-4037
Durbin, D. J. & Malardier-Jugroot, C. Review of hydrogen storage techniques for on board vehicle applications. *International Journal of Hydrogen Energy* 38, 14595-14617 (2013).
Mazloomi, K.; Gomes, C. Hydrogen as an Energy Carrier: Prospects and Challenges. Renewable and Sustainable Energy Reviews. 2012, pp 3024-3033.
Züttel, A.; Remhof, A.; Borgschulte, A.; Friedrichs, O. Hydrogen: The Future Energy Carrier. Philos. Trans. A. Math. Phys. Eng. Sci. 2010, 368 (1923), 3329-3342.
Dinga, G. P. Hydrogen: The Ultimate Fuel and Energy Carrier. Int. J. Hydrogen Energy 1989, 14 (11), 777-784.
Petrovic, J.; Thomas, G. Reaction of Aluminum with Water to Produce Hydrogen. US Dep. Energy 2008, 1-26.
Midilli, A.; Ay, M.; Dincer, I.; Rosen, M. A. On Hydrogen and Hydrogen Energy Strategies I : Current Status and Needs. Renew. Sustain. Energy Rev. 2005,9 (3), 255-271.
Durbin, D. J.; Malardier-Jugroot, C. Review of Hydrogen Storage Techniques for on Board Vehicle Applications. International Journal of Hydrogen Energy. 2013, pp 14595-14617.
Nikolaidis, P.; Poullikkas, A. A Comparative Overview of Hydrogen Production Processes. Renewable and Sustainable Energy Reviews. 2017, pp 597-611.
Kothari, R.; Buddhi, D.; Sawhney, R. L. Comparison of Environmental and Economic Aspects of Various Hydrogen Production Methods. Renew. Sustain. Energy Rev. 2008, 12 (2), 553-563.
Bartels, J. R.; Pate, M. B.; Olson, N. K. An Economic Survey of Hydrogen Production from Conventional and Alternative Energy Sources. Int. J. Hydrogen Energy 2010,35 (16), 8371-8384.
Zeng, K.; Zhang, D. Recent Progress in Alkaline Water Electrolysis for Hydrogen Production and Applications. Progress in Energy and Combustion Science. 2010, pp 307-326.
Elam, C. C.; Padró, C. E. G.; Sandrock, G.; Luzzi, A.; Lindblad, P.; Hagen, E. F. Realizing the Hydrogen Future: The International Energy Agency's Efforts to Advance Hydrogen Energy Technologies. Int. J. Hydrogen Energy 2003, 28 (6), 601-607.
David, W. I. F. Effective Hydrogen Storage: A Strategic Chemistry Challenge. Faraday Discussions. 2011, pp 399-414.
Lim, K. L.; Kazemian, H.; Yaakob, Z.; Daud, W. R. W. Solid-State Materials and Methods for Hydrogen Storage: A Critical Review. Chemical Engineering and Technology. 2010, pp 213-226.
Rusman, N. A. A.; Dahari, M. A Review on the Current Progress of Metal Hydrides Material for Solid-State Hydrogen Storage Applications. Int. J. Hydrogen Energy 2016, 41 (28), 12108-12126.
Krishnan, G.; De Graaf, S.; Ten Brink, G. H.; Verheijen, M. A.; Kooi, B. J.; Palasantzas, G. Shape and Structural Motifs Control of MgTi Bimetallic Nanoparticles Using Hydrogen and Methane as Trace Impurities. Nanoscale 2018, 10 (3), 1297-1307.

Krishnan, G.; De Graaf, S.; Ten Brink, G. H.; Persson, P. O. Å.; Kooi, B. J.; Palasantzas, G. Strategies to Initiate and Control the Nucleation Behavior of Bimetallic Nanoparticles. Nanoscale 2017,9 (24), 8149-8156.

Jorgensen, S. W. Hydrogen Storage Tanks for Vehicles: Recent Progress and Current Status. Curr. Opin. Solid State Mater. Sci. 2011, 15 (2), 39-43.

De Miguel, N.; Ortiz Cebolla, R.; Acosta, B.; Moretto, P.; Harskamp, F.; Bonato, C. Compressed Hydrogen Tanks for On-Board Application: Thermal Behaviour during Cycling. Int. J. Hydrogen Energy 2015, 40 (19), 6449-6458.

Utgikar, V. P.; Thiesen, T. Safety of Compressed Hydrogen Fuel Tanks: Leakage from Stationary Vehicles. Technol. Soc. 2005, 27 (3), 315-320.

Hua, T. Q.; Ahluwalia, R. K.; Peng, J.-K.; Kromer, M.; Lasher, S.; McKenney, K.; Law, K.; Sinha, J. Technical Assessment of Compressed Hydrogen Storage Tank Systems for Automotive Applications. Int. J. Hydrogen Energy 2011, 36 (4), 3037-3049.

Erogbogbo, F.; Lin, T.; Tucciarone, P. M.; Lajoie, K. M.; Lai, L.; Patki, G. D.; Prasad, P. N.; Swihart, M. T. On-Demand Hydrogen Generation Using Nanosilicon: Splitting Water without Light, Heat, or Electricity. Nano Lett. 2013, 13 (2), 451-456.

Fu, J.; Deng, Z.; Lee, T.; Zhang, D.; Detsi, E. PH-Controlled Dealloying Route to Hierarchical Bulk Nanoporous Zn Derived from Metastable Alloy Precursors for Hydrogen Generation by Water Hydrolysis. ACS Appl. Energy Mater.

Chen, Y. K.; Teng, H. Te; Lee, T. Y.; Wang, H. W. Rapid Hydrogen Generation from Aluminum-Water System by Adjusting Water Ratio to Various Aluminum/Aluminum Hydroxide. Int. J. Energy Environ. Eng. 2014, 5 (2-3), 1-6.

Soler, L.; Candela, A. M.; Macanãs, J.; Muñoz, M.; Casado, J. Hydrogen Generation from Water and Aluminum Promoted by Sodium Stannate. Int. J. Hydrogen Energy 2010, 35 (3), 1038-1048.

Ilyukhina, A. V.; Ilyukhin, A. S.; Shkolnikov, E. I. Hydrogen Generation from Water by Means of Activated Aluminum. In International Journal of Hydrogen Energy; 2012; Vol. 37, pp 16382-16387.

Rosenband, V.; Gany, A. Application of Activated Aluminum Powder for Generation of Hydrogen from Water. Int. J. Hydrogen Energy 2010, 35 (20), 10898-10904.

Wang, H. Z.; Leung, D. Y. C.; Leung, M. K. H.; Ni, M. A Review on Hydrogen Production Using Aluminum and Aluminum Alloys. Renew. Sustain. Energy Rev. 2009, 13 (4), 845-853.

Huang, X. N.; Lv, C. J.; Huang, Y. X.; Liu, S.; Wang, C.; Chen, D. Effects of Amalgam on Hydrogen Generation by Hydrolysis of Aluminum with Water. Int. J. Hydrogen Energy 2011, 36 (23), 15119-15124.

Zhao, Z.; Chen, X.; Hao, M. Hydrogen Generation by Splitting Water with Al—Ca Alloy. Energy 2011, 36 (5), 2782-2787.

Soler, L.; Candela, A. M.; Macanás, J.; Muñoz, M.; Casado, J. In Situ Generation of Hydrogen from Water by Aluminum Corrosion in Solutions of Sodium Aluminate. J. Power Sources 2009, 192 (1), 21-26.

Ma, G. L.; Dai, H. Bin; Zhuang, D. W.; Xia, H. J.; Wang, P. Controlled Hydrogen Generation by Reaction of Aluminum/Sodium Hydroxide/Sodium Stannate Solid Mixture with Water. Int. J. Hydrogen Energy 2012, 37 (7), 5811-5816.

Habashi, F. A Hundred Years of the Bayer Process for Alumina Production. In Essential Readings in Light Metals; 2017; Vol. 1, pp 85-93.

Misra, C. Aluminum Oxide (Alumina), Hydrated. Kirk-Othmer Encycl. Chem. Technol. 2003, 2, 421-433.

Phambu, N. Characterization of Aluminum Hydroxide Thin Film on Metallic Aluminum Powder. Mater. Lett. 2003, 57 (19), 2907-2913.

Maggi, F.; Dossi, S.; Paravan, C.; DeLuca, L. T.; Liljedahl, M. Activated Aluminum Powders for Space Propulsion. Powder Technol. 2015.

Zhang, Z. M.; Lii, T.; Xu, C. J.; Guo, X. F. Microstructure of Binary Mg—Al Eutectic Alloy Wires Produced by the Ohno Continuous Casting Process. Acta Metall. Sin. (English Lett. 2008, 21 (4), 275-281.

Detsi, E.; Corsi, J. S. Bulk Nanoporous Materials For On-Board Generation Of Hydrogen And Other Products. U.S. Provisional Appl. No. 62/644,972, 2018 2018.

Erlebacher, J.; Aziz, M. J.; Karma, A.; Dimitrov, N.; Sieradzki, K. Evolution of Nanoporosity in Dealloying. Nature 2001, 410 (6827), 450-453.

Detsi, E.; Vuković, Z.; Punzhin, S.; Bronsveld, P. M.; Onck, P. R.; Hosson, J. T. M. D. Fine-Tuning the Feature Size of Nanoporous Silver. CrystEngComm 2012, 14 (17), 5402-5406.

Weissmüller, J.; Sieradzki, K. Dealloyed Nanoporous Materials with Interface-Controlled Behavior. MRS Bull. 2018, 43 (01), 14-19.

Lilleodden, E. T.; Voorhees, P. W. On the Topological, Morphological, and Microstructural Characterization of Nanoporous Metals. MRS Bull. 2018, 43 (01), 20-26.

Chen, Q.; Ding, Y.; Chen, M. Nanoporous Metal by Dealloying for Electrochemical Energy Conversion and Storage. MRS Bull. 2018, 43 (1), 43-48.

Cortie, M. B.; Maaroof, A. I.; Smith, G. B. Electrochemical Capacitance of Mesoporous Gold. Gold Bull. 2005, 38 (1), 14-22.

Tai, M. C.; Gentle, A.; Arnold, M. D.; Cortie, M. B. Optical in Situ Study of De-Alloying Kinetics in Nanoporous Gold Sponges. RSC Adv. 2016, 6 (89), 85773-85778.

Zhang, Z.; Wang, Y.; Qi, Z.; Zhang, W.; Qin, J.; Frenzel, J. Generalized Fabrication of Nanoporous Metals (Au, Pd, Pt, Ag, and Cu) through Chemical Dealloying. J. Phys. Chem. C 2009, 113 (29), 12629-12636.

Hayes, J. R.; Hodge, A. M.; Biener, J.; Hamza, A. V; Sieradzki, K. Monolithic Nanoporous Copper by Dealloying Mn—Cu. J. Mater. Res. 2006, 21 (10), 2611-2616.

Cook, J. B.; Detsi, E.; Liu, Y.; Liang, Y.-L.; Kim, H.-S.; Petrissans, X.; Dunn, B.; Tolbert, S. H. Nanoporous Tin with a Granular Hierarchical Ligament Morphology as a Highly Stable Li-Ion Battery Anode. ACS Appl. Mater. Interfaces 2017, 9 (1), 293-303.

Meng, F.; Ding, Y. Sub-Micrometer-Thick All-Solid-State Supercapacitors with High Power and Energy Densities. Adv. Mater. 2011, 23 (35), 4098-4102.

Lang, X.; Hirata, A.; Fujita, T.; Chen, M. Nanoporous Metal/Oxide Hybrid Electrodes for Electrochemical Supercapacitors. Nat. Nanotechnol. 2011, 6 (4), 232-236.

Hakamada, M.; Mabuchi, M. Fabrication of Nanoporous Palladium by Dealloying and Its Thermal Coarsening. J. Alloys Compd. 2009, 479 (1-2), 326-329.

Dorofeeva, T. S.; Seker, E. Electrically Tunable Pore Morphology in Nanoporous Gold Thin Films. Nano Res. 2015, 8 (7), 2188-2198.

Detsi, E.; Punzhin, S.; Rao, J.; Onck, P. R.; De Hosson, J. T. M. Enhanced Strain in Functional Nanoporous Gold with a Dual Microscopic Length Scale Structure. ACS Nano 2012, 6 (5), 3734-3744.

Wittstock, A.; Zielasek, V.; Biener, J.; Friend, C. M.; Bäumer, M. Nanoporous Gold Catalysts for Selective Gas-Phase Oxidative Coupling of Methanol at Low Temperature. Science (80-.). 2010, 327 (5963), 319-322.

Liu, S.; Feng, J.; Bian, X.; Liu, J.; Xu, H. The Morphology-Controlled Synthesis of a Nanoporous-Antimony Anode for High-Performance Sodium-Ion Batteries. Energy Environ. Sci. 2016, 9 (4), 1229-1236.

Maxwell, T. L.; Balk, T. J. The Fabrication and Characterization of Bimodal Nanoporous Si with Retained Mg through Dealloying. Adv. Eng. Mater. 2017, 1700519, 1-9.

Liu, S.; Feng, J.; Bian, X.; Qian, Y.; Liu, J.; Xu, H. Nanoporous Germanium as High-Capacity Lithium-Ion Battery Anode. Nano Energy 2015, 13, 651-657.

Ma, W.; Wang, J.; Gao, H.; Niu, J.; Luo, F.; Peng, Z.; Zhang, Z. A Mesoporous Antimony.

Based Nanocomposite for Advanced Sodium Ion Batteries. Energy Storage Mater. 2018, 13, 247-256.

Fu, J.; Deng, Z.; Lee, T.; Zhang, D.; Detsi, E. PH-Controlled Dealloying Route to Hierarchical Bulk Nanoporous Zn Derived from Metastable Alloy Precursors for Hydrogen Generation by Water Hydrolysis. Under Rev. ACS Appl. Energy Mater.

Tolbert, S. H.; Detsi, E. Hydrogen Storage in Nanoporous and Nanostructured Hydride Forming Metals. US20180016139A1 US Patent 2013, p US20180016139A1 US Patent.

Yang, W.; Zheng, X.; Wang, S.; Jin, H. Nanoporous Aluminum by Galvanic Replacement : Dealloying and Inward-Growth Plating. 2018, 165 (9), 492-496.

Yaghoobnejad Asl, H.; Fu, J.; Kumar, H.; Welborn, S. S.; Shenoy, V. B.; Detsi, E. In Situ Dealloying of Bulk Mg2Sn in Mg-Ion Half Cell as an Effective Route to Nanostructured Sn for High Performance Mg-Ion Battery Anodes. Chem. Mater. 2018, acs.chemmater.7b04124.

Detsi, E.; Van De Schootbrugge, M.; Punzhin, S.; Onck, P. R.; De Hosson, J. T. M. On Tuning the Morphology of Nanoporous Gold. Scr. Mater. 2011, 64 (4), 319-322.

Ma, K.; Corsi, J. S.; Fu, J.; Detsi, E. Origin of the Volume Contraction during Nanoporous Gold Formation by Dealloying for High-Performance Electrochemical Applications. ACS Appl. Nano Mater. 2018, C, acsanm.7b00055.

Detsi, E.; Sellés, M. S.; Onck, P. R.; De Hosson, J. T. M. Nanoporous Silver as Electrochemical Actuator. Scr. Mater. 2013,69 (2), 195-198.

Alinejad, B.; Mahmoodi, K. A Novel Method for Generating Hydrogen by Hydrolysis of Highly Activated Aluminum Nanoparticles in Pure Water. Int. J. Hydrogen Energy 2009.

Mahmoodi, K.; Alinejad, B. Enhancement of Hydrogen Generation Rate in Reaction of Aluminum with Water. Int. J. Hydrogen Energy 2010, 35 (11), 5227-5232.

Seo, Y. I.; Lee, Y. J.; Kim, D.-G.; Lee, K. H.; Kim, Y. Do. Mechanism of Aluminum Hydroxide Layer Formation by Surface Modification of Aluminum. Appl. Surf. Sci. 2010.

Andreeva, R.; Stoyanova, E.; Tsanev, A.; Stoychev, D. Influence of the Surface Pre-Treatment of Aluminum on the Processes of Formation of Cerium Oxides Protective Films. In Journal of Physics: Conference Series; 2016.

Shkolnikov, E. I.; Zhuk, A. Z.; Vlaskin, M. S. Aluminum as Energy Carrier: Feasibility Analysis and Current Technologies Overview. Renewable and Sustainable Energy Reviews. 2011.

Tabereaux, A. T.; Peterson, R. D. Aluminum Production. In Treatise on Process Metallurgy; 2014; Vol. 3, pp 839-917.

Detsi, E.; Petrissans, X.; Yan, Y.; Cook, J. B.; Liang, Y.-L.; Dunn, B.; Tolbert, S. H. Tuning Ligament Shape in Dealloyed Nanoporous Tin and the Impact of Nanoscale Morphology on Its Applications in Na-Ion Alloy Battery Anodes. Under-Review Phys. Rev. Mater.

What is claimed:

1. A composition, comprising:
a hierarchical nanoporous material,
the hierarchical nanoporous material comprising macroligaments comprising a metal, the macroligaments comprising interconnected mesoligaments defining nanopores therebetween, the nanopores being open to the environment exterior to the nanoporous material,
the macroligaments having an average feature size of from about 0.5 μm to about 1 μm,
the mesoligaments having an average cross-section in the range of from about 10 nm to about 20 nm
the nanoporous material optionally comprising a metal having a standard reduction potential less than the standard hydrogen electrode (SHE) at 0 V vs SHE,
the nanopores being characterized as having an average cross-section in the range of from about 3 to about 100 nm.

2. The composition of claim 1, wherein the nanopores are characterized as having an average cross-section in the range of from about 10 to about 30 nm.

3. The composition of claim 1, wherein the composition consists essentially of aluminum.

4. The composition of claim 1, wherein the nanoporous material is in contact with water.

5. The composition of claim 1, wherein the hierarchical nanoporous material is free of the oxide form of the metal.

* * * * *